March 19, 1963 H. T. AVERY 3,081,966
ROTATING WING AIRCRAFT
Original Filed May 15, 1946 12 Sheets-Sheet 8

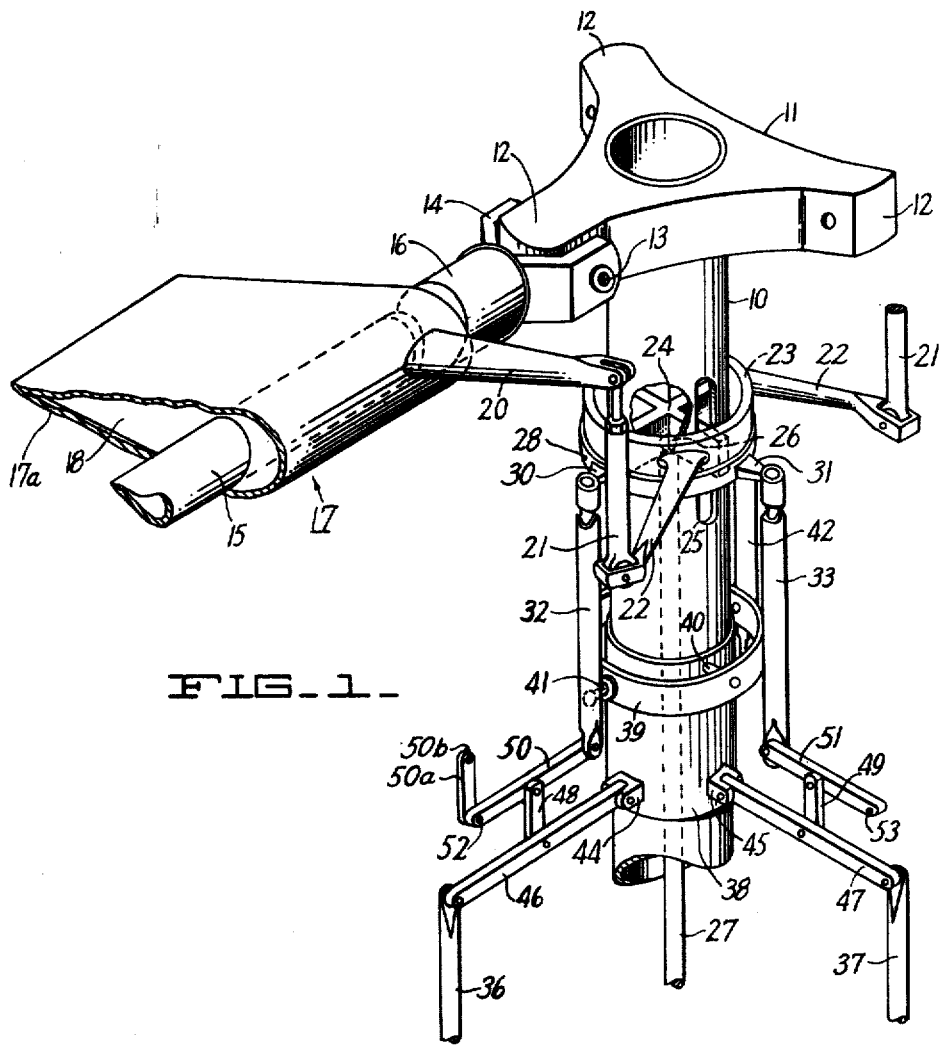
FIG_1_
INVENTOR.
Harold T. Avery

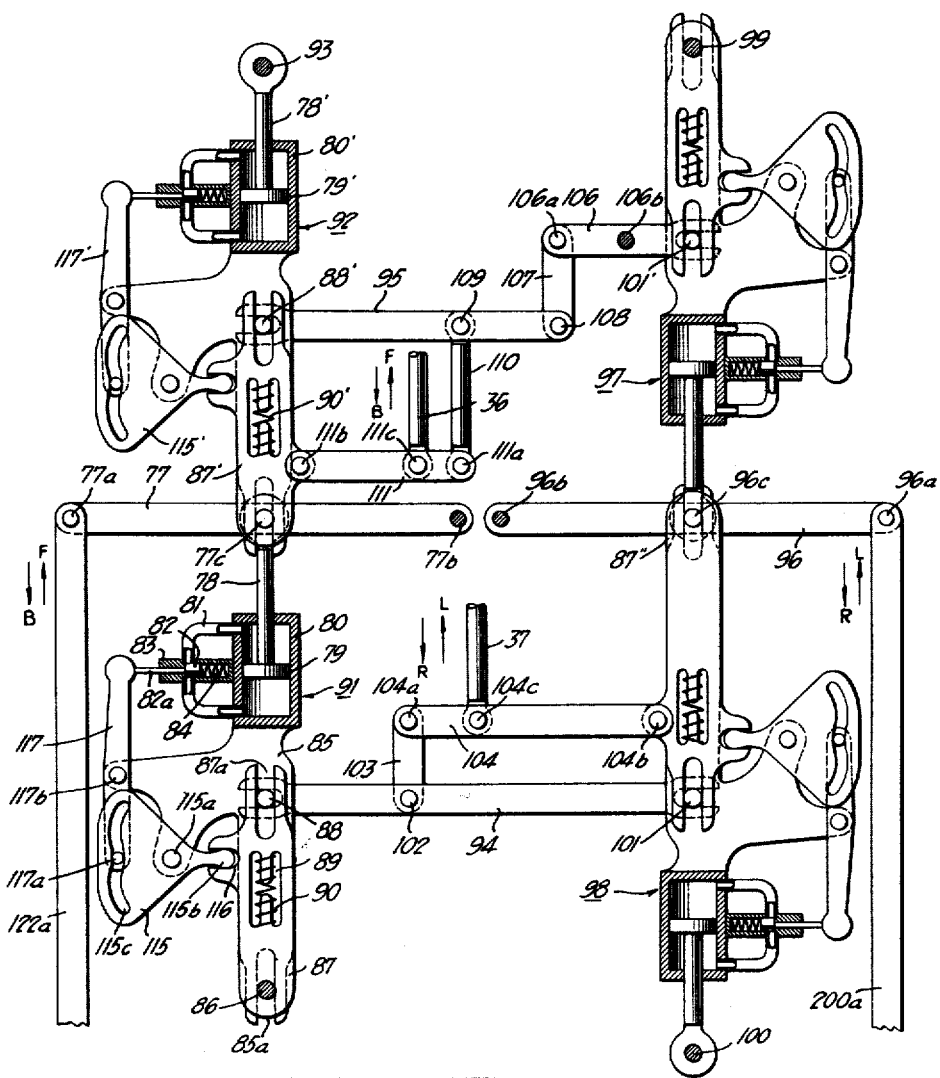
FIG_2_

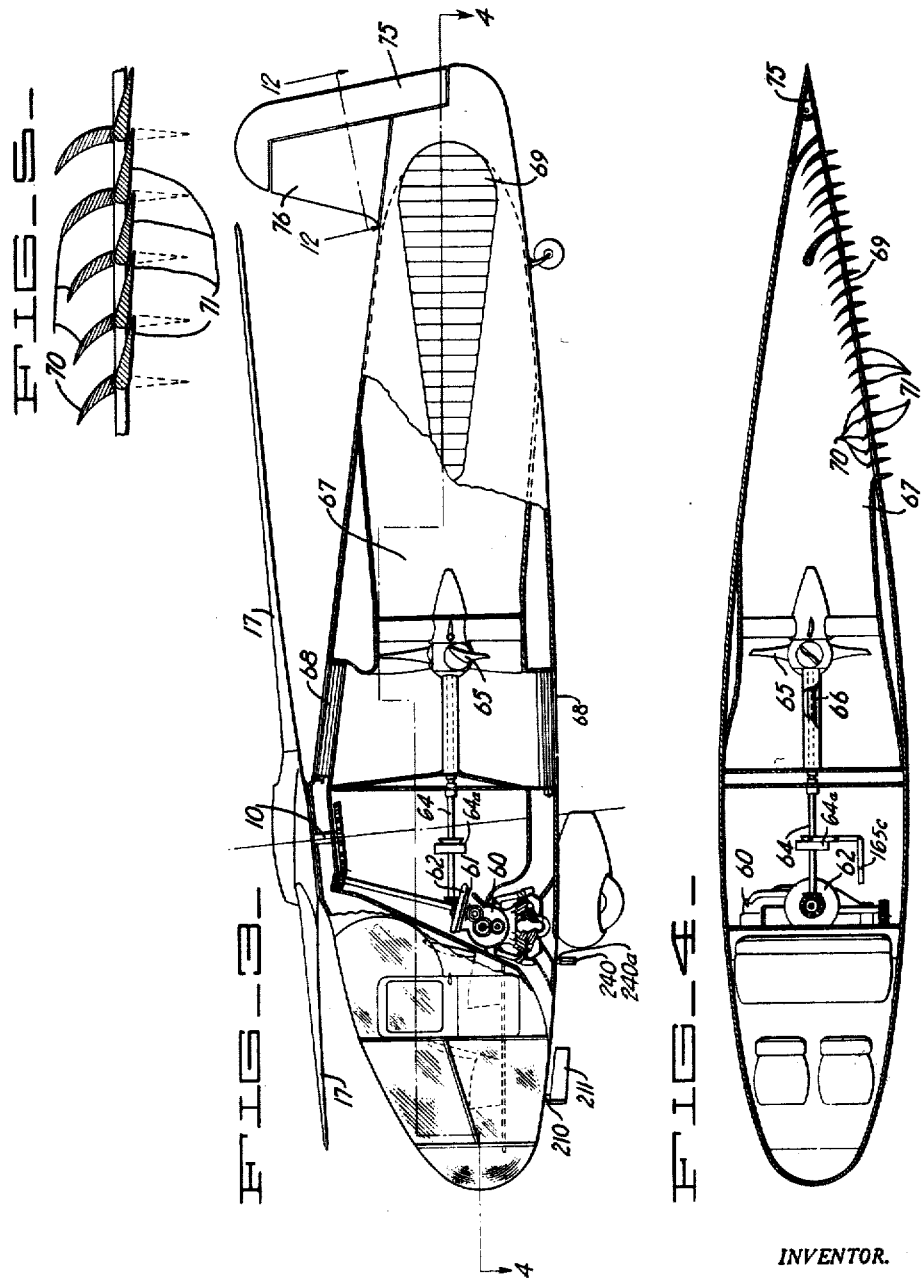

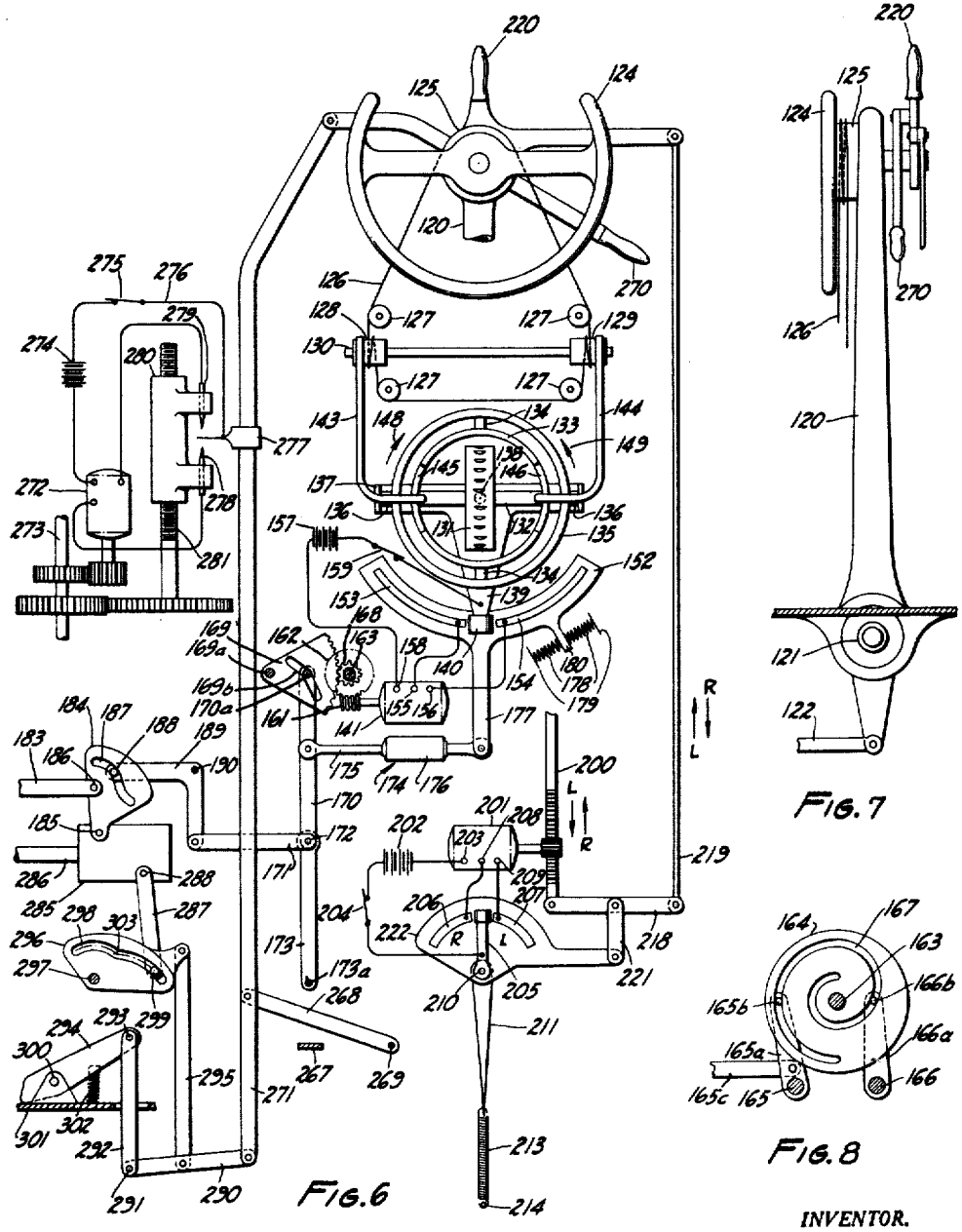

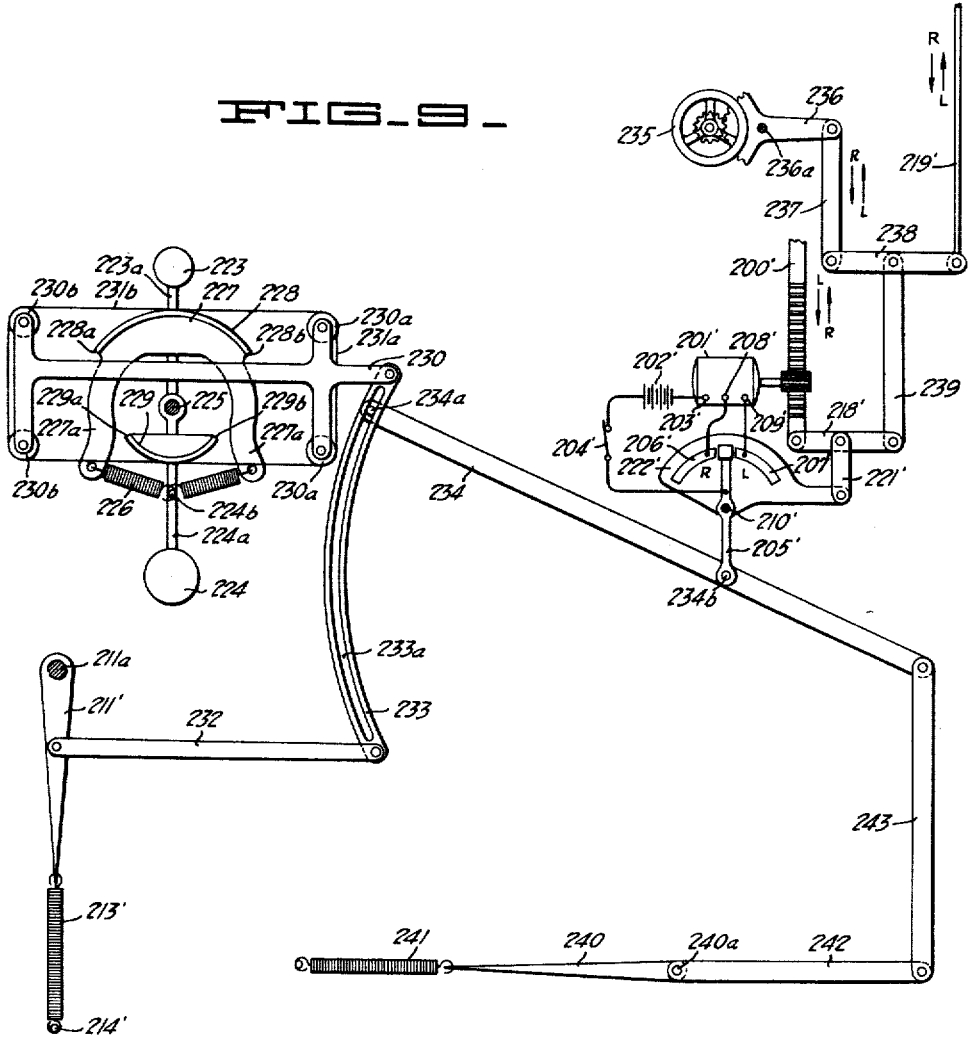

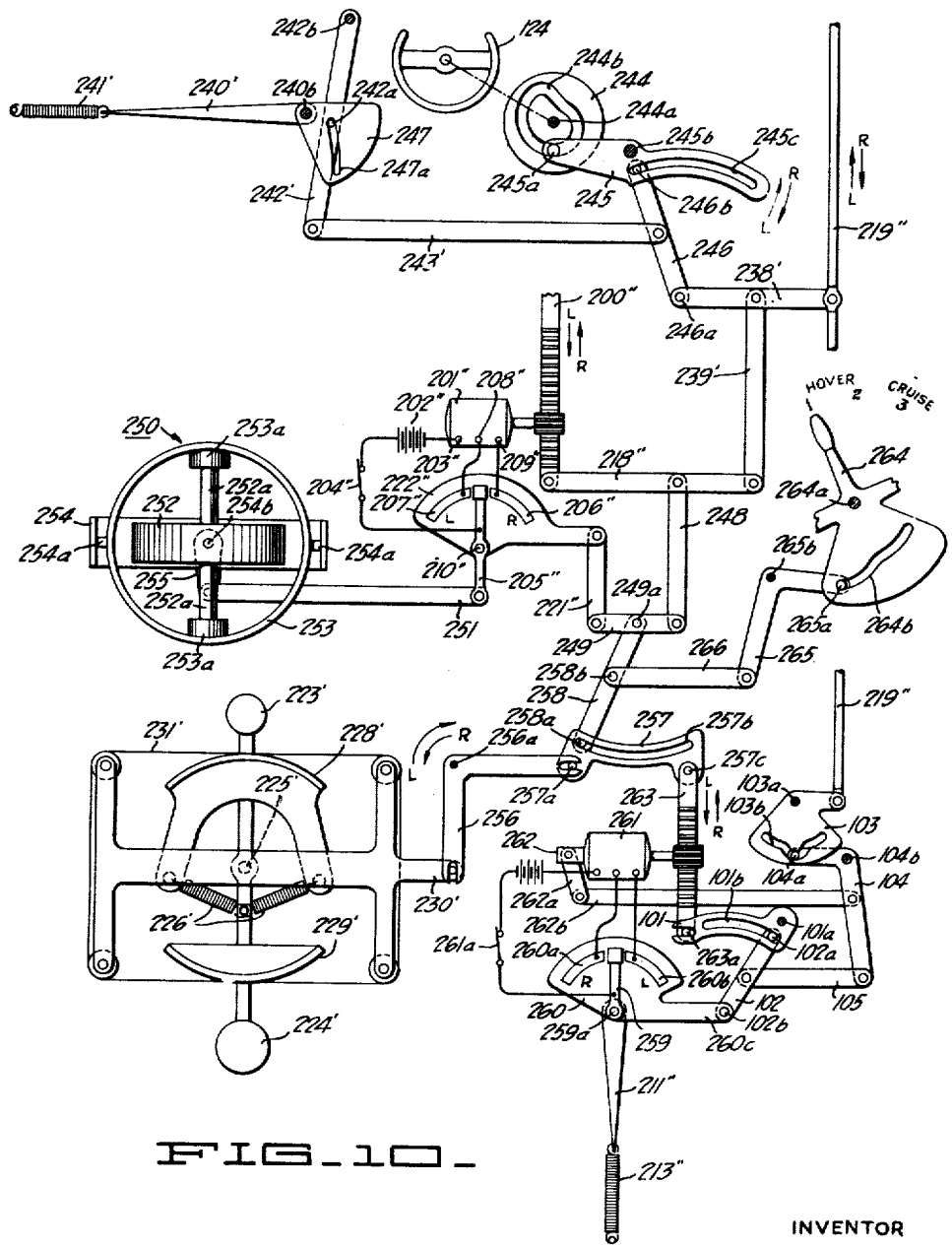

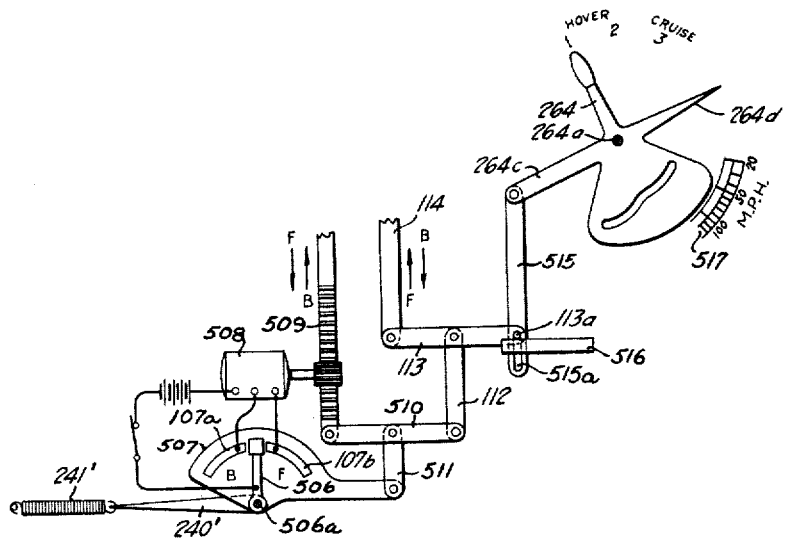
FIG_11_

INVENTOR:

Harold T. Avery

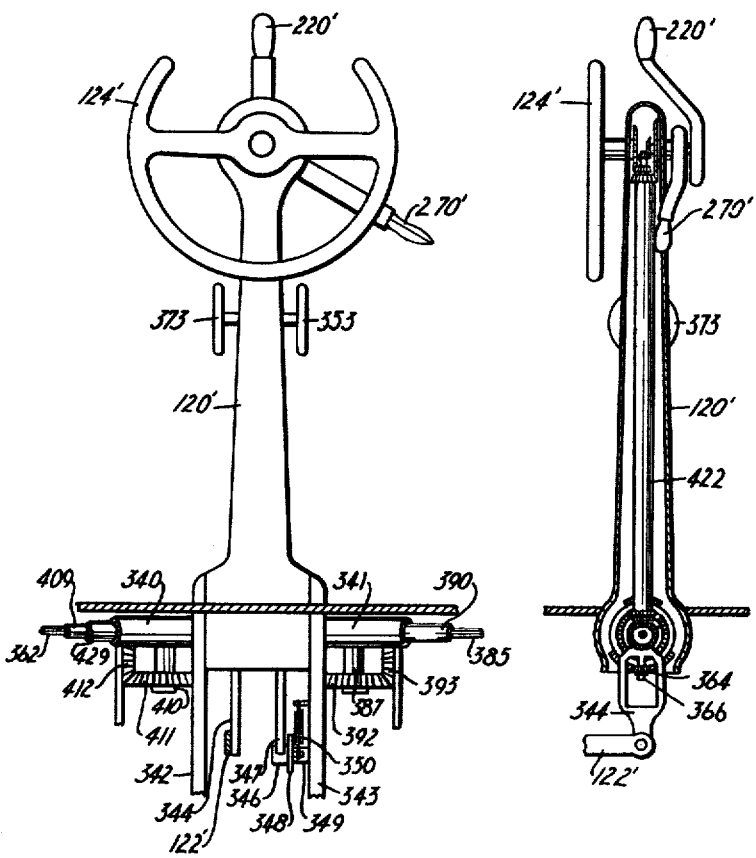

March 19, 1963 H. T. AVERY 3,081,966
ROTATING WING AIRCRAFT
Original Filed May 15, 1946 12 Sheets—Sheet 10
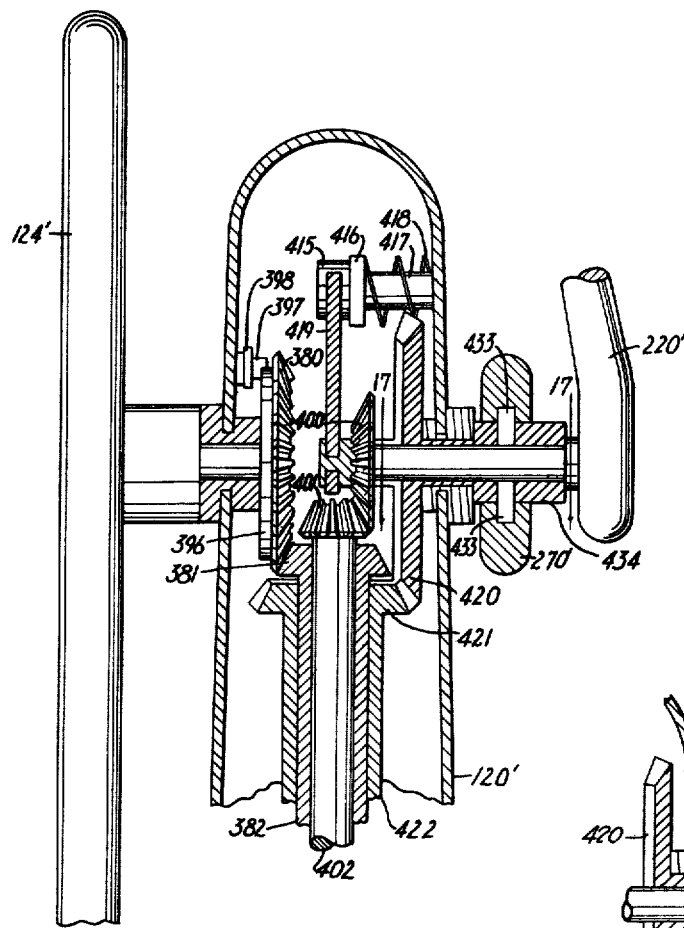
FIG_16_
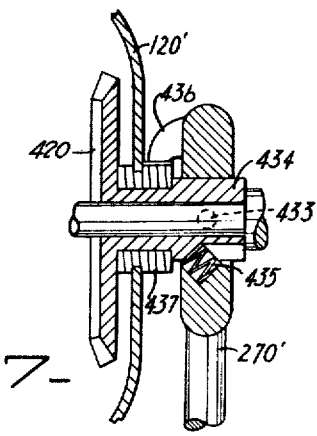
FIG_17_
INVENTOR:
Harold T. Avery

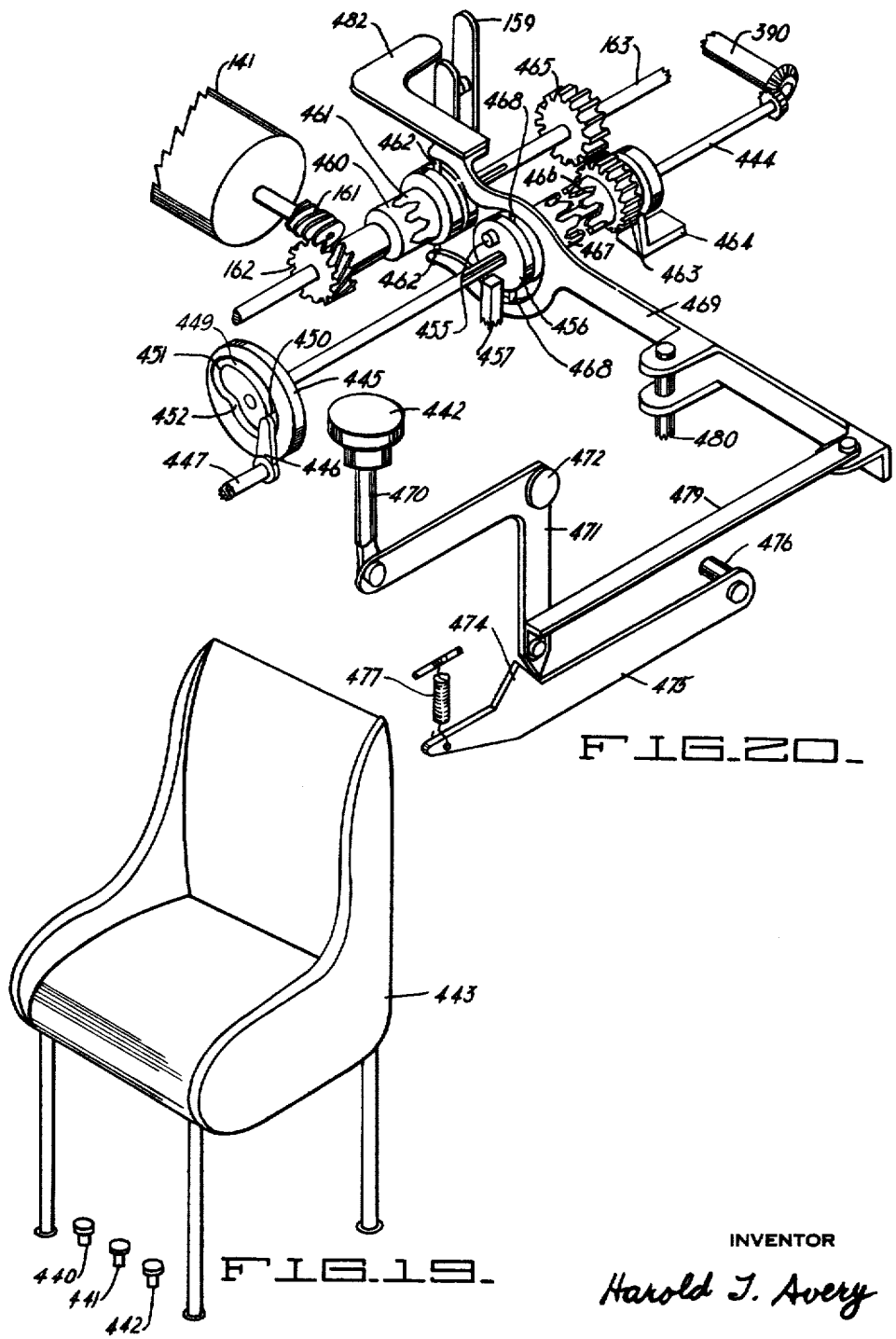

United States Patent Office

3,081,966
Patented Mar. 19, 1963

3,081,966
ROTATING WING AIRCRAFT
Harold T. Avery, Oakland, Calif., assignor to Minneapolis-Honeywell Regulator Company, Minneapolis, Minn., a corporation of Delaware
Continuation of application Ser. No. 569,954, Feb. 20, 1956, which is a division of application Ser. No. 314,389, Sept. 22, 1952, now Patent No. 2,784,792, dated Mar. 12, 1957, which in turn is a division of application Ser. No. 669,790, May 15, 1946. This application Mar. 23, 1961, Ser. No. 99,008
53 Claims. (Cl. 244—17.13)

The present invention relates to helicopters, and particularly to the controls which serve to keep the operation of the craft in accord with the performance desired by the operator of the craft. This application is a continuation of my prior application Serial No. 569,954 filed February 20, 1956 and now abandoned, which is a division of my prior application Serial No. 314,389 filed September 22, 1952 and now Patent No. 2,784,792, which in turn is a division of my earlier application Serial No. 669,790 filed May 15, 1946 and now abandoned.

Up to the present time all aircraft have required a relatively high degree of training and/or skill to operate. With the airplane this has been primarily due to the relatively high craft speed required to maintain control of the craft. The helicopter entirely gets away from this necessity of thus maintaining air speed, and therefore would be one of the easiest of all vehicles to operate were it not for the fact that as so far known and operated the helicopter has peculiar operational difficulties of its own. These difficulties are primarily traceable to the fact that the helicopter is capable of a greater variety of kinds of movement than the airplane, and it has been customary to provide separate manual control for each of these various kinds of movements in the helicopter to an extent which increases the number of various control devices with which the operator must continuously be concerned distinctly above that customary in the airplane. Combined with the extent to which these various movements and control functions are inextricably inter-related in the helicopter, this has rendered the controlling of a helicopter equipped with conventional controls as known in the art, more difficult than the controlling of the airplane in spite of the fact that the most serious airplane control difficulties are eliminated.

For instance, if it is desired to increase forward speed on a typical prior art helicopter it is ordinarily necessary for the operator to (1) readjust a pitch control lever to increase the pitch of the rotor blades, (2) readjust the setting of the engine throttle to secure proper engine and rotor speeds, (3) readjust steering pedals to accurately counteract the rotor torque which has thus been increased, (4) readjust the lateral position of the control stick first to balance the increase in counter-torque, and then as the speed of the craft increases to compensate for the greater differential between the lift exerted by the advancing and the receding blades, and (5) rock the control stick forward to increase forward tilt of the craft so as to convert the additional power into forward movement rather than upward movement, and return the stick to its normal position again when the tilt of the craft has been sufficiently increased. If all five of these controls are not readjusted in exactly the right amounts and the right synchronism and/or sequence the craft will commence to perform one or more unwanted movements or gyrations. Obviously this number of control movements is too many to properly co-ordinate without a high degree of skill and training. This is particularly unfortunate in view of the fact that the helicopter seems to otherwise have very promising potentialities for becoming the widely used personal craft of the air.

It is an object of this invention to simplify the control arrangements for helicopters and to render it easier to properly manipulate them.

It is also an object to provide such a grouping and arrangement of the various manual control members as will not only result in an unprecedented degree of convenience in controlling the craft, but will be so simple and logical in arrangement as to render the operator's control of the craft inherently correct with little or no training required.

It is an object of the invention to eliminate the need for the operator of a helicopter to pay any attention to the steering of the craft except when a change of course is desired, and to correct occasional slight departures from course not greater in amount of frequency than the corresponding corrections normally incident to the steering of an automobile, and it is a further object to accomplish this without requiring the expensive type of automatic equipment customarily associated with automatic steering devices.

It is a further object of the invention to automatically anticipate turning effects exerted on the craft due to changes in engine torque and to bring means for counteracting such effects into operation before they cause angular displacements of the craft instead of afterwards as in the case with most automatic steering devices.

It is an object of the invention to render it unnecessary to supply any power from the engine directly to the counter-torque means during normal cruising. More specifically it is proposed to provide a power driven counter-torque means which is selectively adjusted at lower craft speeds and another counter-torque means which is not power driven and which is selectively adjusted at higher craft speeds, and it is an object of the invention to automatically disconnect the power driven counter-torque means from the engine at craft speeds adequately above those at which it is required and to automatically reconnect it again as craft speed falls off sufficiently to approach the speeds at which it is required.

It is an object of the invention to automatically substantially prevent sideward movement of a helicopter relative to the air during forward flight except in measured response to the operator's setting of a lateral control member, which however, is so arranged that the operator does not need to position it in normal flight.

It is a further object of the invention to automatically resist displacement of the craft by gusts, particularly under hovering conditions.

It is also an object to render it particularly easy for the operator to hold the craft stationary relative to the ground under all air conditions.

It is an object of the invention to provide automatic lateral control of the craft with means for automatically altering that control to better adapt it to different flight conditions, and particularly to changes in the longitudinal movement of the craft.

It is also an object to provide means selectively available to the operator for automatically steadying the craft relative to the ground, or relative to the surrounding air, or both.

It is an object to provide a means for automatically resisting accelerations of the craft from any source including changes in the velocity of the sustaining air relative to the ground, and other means for automatically controlling movement of the craft relative to the air. It is a further object to provide a unitary manual means for selectively bringing either one or both of these means into operation, and it is alternatively an object to automatically bring one or the other into operation in response to changes in the flight condition of the craft. This may, for instance, take the form in which the forward speed of the craft automatically determines whether the lateral control mechanisms will act to automatically resist lateral accelerations of the craft or to automatically eliminate lateral movement of the craft relative to the air.

It is a further object to automatically compensate for tilting of the craft fuselage from such sources as eccentric loading. More specifically it is an object to control rotor tilting with respect to the true vertical rather than with respect to the fuselage of the craft.

It is an object to automatically control the craft to move laterally at a preselected speed.

It is a further object to automatically bank a helicopter properly for each turn.

It is an object of the invention to automatically maintain forward flight at preselected speeds.

It is a further object to readjust under a unitary control both the automatic lateral controls and the automatic longitudinal controls from conditions controlling for one flight condition to those controlling for another, for instance from controlling for hovering to controlling for cruising.

It is still a further object to provide means for automatically maintaining flight at any preselected speed, in conjunction with a normal manual control member the displacement of which forward or backward from neutral will always cause corresponding forward or backward increments of controlling effect, respectively, including the increase or decrease of craft speed from the preselected speed. That is, it is an object to maintain the normal functioning of the regular manual longitudinal control means in spite of the setting of the automatic longitudinal control means to a preselected speed, which speed will be automatically maintained if the manual means is not displaced from neutral but will be altered selectively by any such displacement.

It is an object of the invention to so improve the arrangement of longitudinal and lateral controls that the response of the craft thereto will be substantially instantaneous and more perfectly uniform in amount than has heretofore been attainable with articulated sustaining rotors.

It is a further object to provide automatic control mechanism which, acting through the cyclic pitch controls of an articulated rotor, will promptly produce corresponding response of the craft.

It is an object of the invention to automatically maintain the engine and rotor at proper operating speeds.

It is also an object to automatically readjust these speeds to meet various operating conditions.

It is a further object to provide in conjunction with an engine and rotor so controlled, means by which the operator may conveniently, if and when he so desires, bring the engine and rotor to speeds higher than the automatically controlled speeds above mentioned.

It is also an object to prevent the engine and rotor from ever being brought to dangerously high rotational speeds.

It is an object of the invention to provide improved means for adjusting the various manual control members to suit the size and convenience of different operators.

It is an object of the invention to provide a control member with an adjustable neutral position so arranged that the controlling effect will be determined by the displacement of the member from its adjusted neutral position instead of by its displacement from any fixed position of the member.

It is an object to provide improved means for readjusting the controls for different locations of the center of gravity of the craft, and to thereby avoid the necessity for the operator to hold any of the normal flight control members in a displaced position to correct for such shifts in the center of gravity.

It is an object to so stabilize the direction of travel of a helicopter relative to its longitudinal axis as to make it possible to satisfactorily navigate the craft by compass.

It is a further object to provide such stability of the direction of travel relative to the longitudinal axis of the craft in conjunction with means whereby the operator may, at will, change the direction of craft travel relative to the longitudinal axis.

It is an object of the invention to conveniently group a plurality of controls on a rockable column, and to render said controls immune to the effect of rocking of the column.

It is an object of the invention to make it readily possible for the operator to supersede the automatic control of a given craft function by manual control thereof.

It is an object of the invention to so arrange the means for converting the various functions from automatic to manual control that they will always be conveniently available to the operator yet never in danger of being accidentally so set as to unintentionally terminate automatic control.

It is a further object of the invention to make it possible for the operator to exercise emergency manual control of a function through the same member which he normally utilizes for effecting desired alteration of the automatic control thereof.

It is an object of the invention to automatically increase the usable stroke of a manual controlling member upon converting from automatic to manual control of the function controlled by said member.

It is an object of the invention to automatically reestablish the automatic controlling functions in proper relation to the positioning of the manual controlling member upon converting back from manual to automatic control.

It is an object of the invention to automatically cut off the supply of power to the automatic control means upon converting from automatic to manual control.

It is an object of the invention to so arrange it that the operator may by a single manual stroke mechanically disconnect from a control means the power operated motor which normally positions it, connect a manual control member to the control means, and cut off the supply of power to the motor.

It is an object of the invention to provide a helicopter which can be safely flown for limited but reasonably extensive periods of time with hands off of all controls, and it is a further object to provide such a craft with a maximum of simplicity and at a minimum of cost.

It is an object of the invention to provide fully automatic means for continuously readjusting an adjustable trim surface so as to maintain it at all times in substantially the best average position for the current conditions of craft operation.

It is a further object to render it exceptionally easy to smoothly adjust rotor pitch. More specifically it is proposed to do this by employing a servo-motor, and it is a further object to insure against stalling of the rotor even though the pitch controlling servo-motor should fail simultaneously with failure of the main engine and while the rotor blades are operating at pitch angles greater than those capable of producing autorotation of the rotor.

It is particularly an object to provide such automatic safety against stalling the rotor in such a manner that the operator may still retain manual control of pitch and may even increase pitch above the auto-rotational range of pitches for short periods, as for instance in easing the contact of the craft with the ground.

It is an object to render control of the craft especially easy under cruising conditions, and more specifically it is an object to do this by minimizing the number of control members that need be operated under cruising conditions and the frequency with which any such members need be operated. It is a further object to accomplish this without locking or disabling any of the normal manual control members.

The manner in which the foregoing, together with additional objects and advantages of the invention, are attained will be made apparent in the course of the following description of the preferred embodiments thereof which is to be read with reference to the accompanying drawings, in which:

FIGURE 1 is a schematic view in perspective showing a portion of the rotor of a craft embodying my invention, particularly the rotor hub and driving shaft, a portion of a tyical blade and the means for controlling the pitch of the blades, several of the parts being partially broken away in order to better expose other parts to view.

FIGURE 2 is a drawing showing schematically the novel means for transmitting the cyclic pitch control movements to the rotor.

FIGURE 3 is a side elevation of the form of helicopter in which I prefer to incorporate my invention.

FIGURE 4 is a horizontal section of the same craft taken substantially on line 4—4 of FIGURE 3.

FIGURE 5 shows a portion of the louver mechanism illustrated in FIGURE 4, but on a larger scale and with the louvers occupying a setting different from that illustrated in FIGURE 4.

FIGURE 6 is a drawing showing schematically the principal automatic controlling mechanisms of the craft, the principal manually movable members for exercising control of the craft, and the general nature of the relationship of these to each other.

FIGURE 7 is a side view of a control column carrying control members arranged as schematically indicated in FIGURE 6.

FIGURE 8 illustrates schematically a mechanism intended to be operated by the automatic steering control mechanism of FIGURE 6 to control the amount of torque set up by each of the two counter-torque mechanisms with which the craft is preferably equipped.

FIGURE 9 is a schematic showing of a second embodiment of the mechanism for automatically exercising lateral control of the craft.

FIGURE 10 schematically illustrates a third embodiment of the lateral control mechanism.

FIGURE 11 schematically illustrates a second embodiment of the longitudinal control mechanism.

Figure 12:
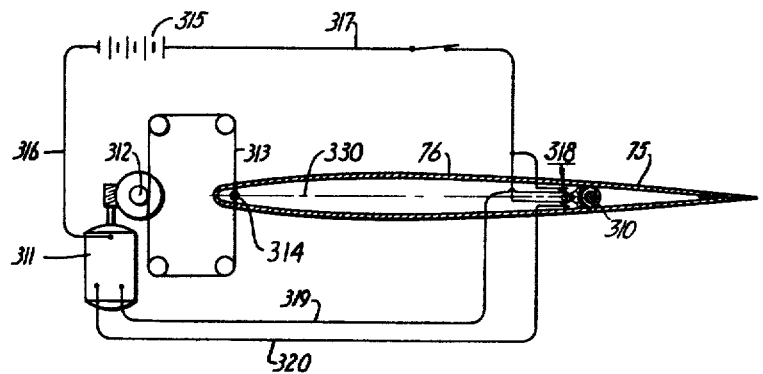

FIGURE 12 is a schematic view of the mechanism for automatically adjusting the vertical tail fin, which fin is shown as sectioned substantially on the line 12—12 of FIGURE 3.

Figure 13:
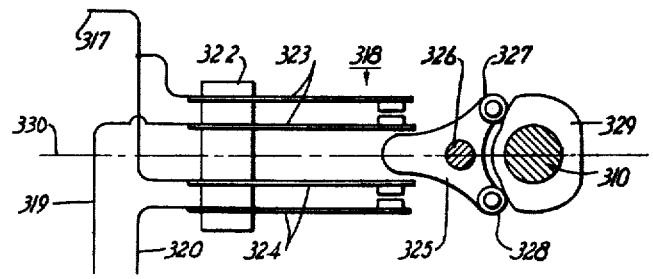

FIGURE 13 is an enlarged detailed view of a portion of the mechanism illustrated in FIGURE 12.

FIGURE 14 is an elevation (looking forward) of the preferred embodiment of the primary means through which the operator controls the craft.

FIGURE 15 is a right side view of the same mechanism with the control column cut in section to expose certain of the mechanism within it.

FIGURE 16 is a view corresponding to the upper part of FIGURE 15, but on a larger scale and showing additional mechanism not included in FIGURE 15, and also showing the pitch control lever in section instead of complete, as in FIGURE 15.

FIGURE 17 is a section taken substantially on line 17—17 of FIGURE 16.

Figure 18:
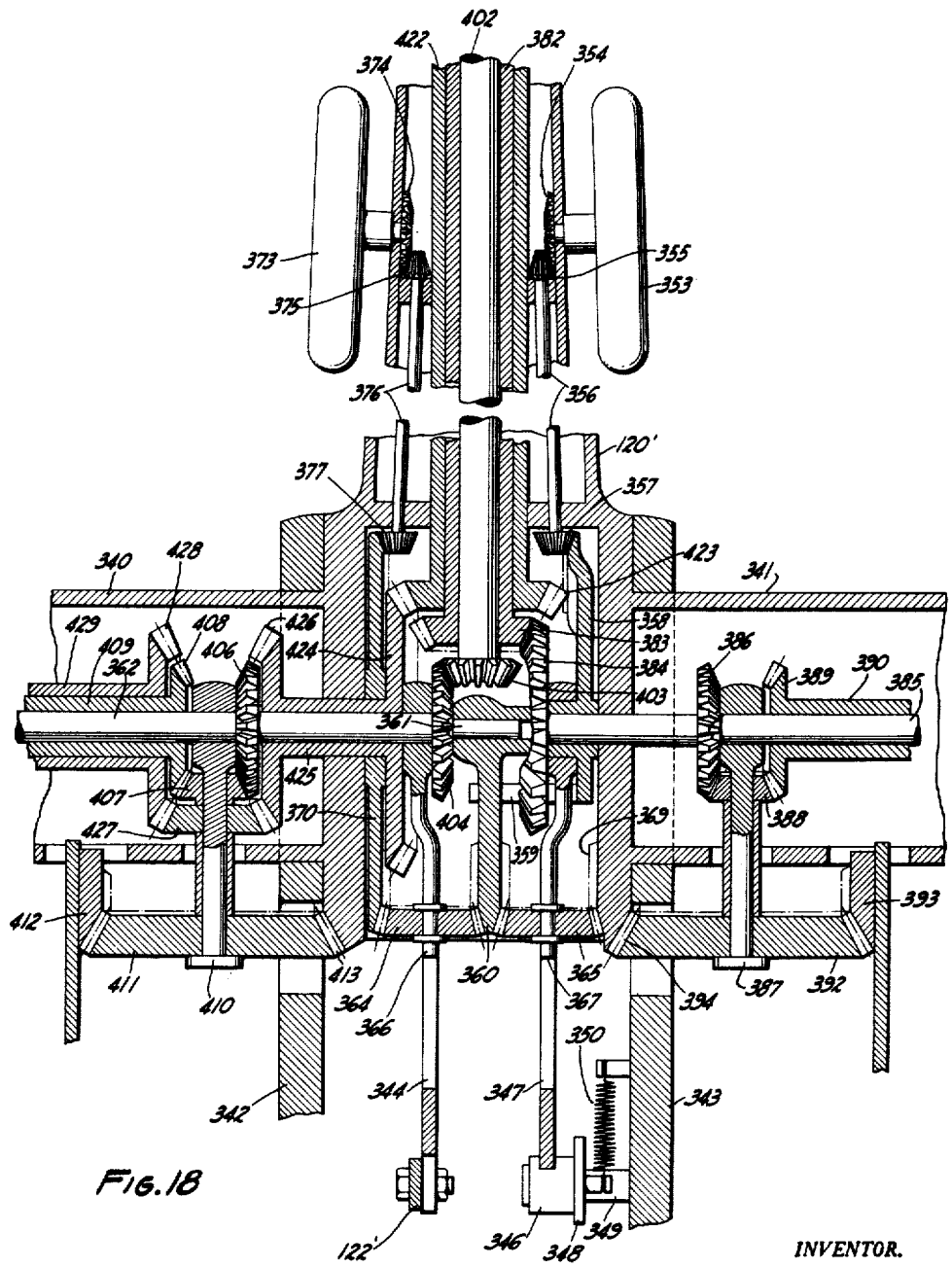

FIGURE 18 is a view corresponding to the lower part of FIGURE 14, but with the control column and most of the mechanism sectioned in the mid-plane of the column.

FIGURE 19 is a perspective view showing the emergency means operable by the operator to convert any or all of the automatic control functions to direct manual control.

FIGURE 20 is a perspective view of the mechanism operated by a typical one of these emergency means, and showing additional details of the manual and automatic control mechanisms.

A. ROTOR CONSTRUCTION

(FIG. 1)

FIGURE 1 illustrates schematically a typical rotor such as may be used for sustaining a craft embodying my invention, which rotor is in turn controlled by certain of the novel mechanisms of my invention.

The arrangement shown in FIGURE 1 for transmitting the drive and pitch control movements to the rotor blades corresponds in general to that of the NX-1272 helicopter illustrated and described in an article in "Aviation" for June, 1945 at pages 122 to 130, to which article reference may be had for details of construction previously known in the art and therefore not disclosed herein. A rotor drive tube 10 is adapted to be driven in a counterclockwise direction by an engine mounted in the fuselage of the craft. Integrally attached to the upper end of the shaft 10 is a hub member 11 which, in the particular form illustrated, has three arms 12 to each of which a blade such as the blade 17 is pivotally attached by a substantially horizontal hinge 13, only one of the three hinges and blades being shown in the drawing, however.

Control means are provided as more fully shown in my U.S. Patent 2,731,215 which, by selective adjustment, may cause either simultaneous and equal change of pitch of all blades or may cause the pitch of each blade to be cyclically increased and decreased as the rotor rotates, the angular location and magnitude of such cyclic changes being dependent upon the direction and magnitude of movement, respectively, of elements of the control means.

This control means comprises a pitch control arm 20 integral with each blade 17 and pivotally connected for universal movement to the upper end of a pitch control link 21. The lower end of each link 21 is pivotally connected for universal movement to one of three arms 22 of a pitch control spider 23. Through a thrust bearing mounting of the general character disclosed in the article previously referred to, spider 23 is connected to a non-rotating ring 28; the arrangement being such that spider 23 and ring 28 may be tipped as a unit in any direction by control movements imparted to ring 28.

Spider 23 and ring 28 also may be raised or lowered as a whole, without altering their tilt, by raising or lowering the pitch control rod 27 upon which they are universally mounted by means of the ball 26, and means to be hereinafter described, are provided for vertically positioning rod 27. Such raising or lowering will correspondingly increase or decrease the pitch of all blades; the movement of the pitch control rod 27 introducing a simultaneous and substantially identical change of pitch to all blades; and links 32 and 33 being constrained to move up and down in unison with rod 27 by mechanism which will be described presently.

Any vertical movement of either or both of the control rods 32 and 33 relative to the pitch control rod 27 will, however, cause a change in the tilt of spider 23 and ring 28 and hence a change in the cyclic pattern of pitch distribution, for if the spider and ring are not perpendicular to shaft 10, they will cause the pitch of each blade to be cyclically increased and decreased as the rotor rotates, the angular location of these cyclic changes depending upon the direction of tilt of the spider and ring and the amount of the cyclic changes depending upon the amount of tilt of the spider and ring.

Control rods 32 and 33 are constrained to move vertically in synchronism with the pitch control 27 whenever a general increase or decrease of pitch is to be effected by the latter without changing the tilt of the pitch control spider 23; the arrangement being such as will nevertheless permit independent movement of the control rods 32 and 33 with respect to the pitch control rod 27 for the purpose of changing the tilt of the pitch control spider 23. To provide for this, rod 32 is connected to a tilt-control rod 36, as well as to rod 27, in such a manner that the vertical displacements of rod 32 will be equal to those of rod 27, plus displacements equal or proportional to those of the tilt control rod 36. Rod 33 is similarly connected to rod 27 and a second tilt control rod 37.

B. MECHANISM FOR TRANSMITTING CYCLIC PITCH CONTROL TO THE ROTOR
(FIG. 2)

In an articulated rotor however, the imparting of a given tilt to pitch control ring 28 does not immediately produce a corresponding and constant effect on the craft. The response will, in general, vary markedly with time, particularly if a marked change of tilt is suddenly imparted to pitch control ring 28, and in such case the initial response will ordinarily be predominantly at right angles to the final and intended response.

The above-mentioned Patent 2,731,215 discloses means for avoiding the delay which this normally causes in securing the desired response from the craft, and also avoiding the false response at right angles to the desired response, which false response usually appears immediately upon the imparting of any sudden change of tilt to pitch control ring 28, but gradually dies away.

FIGURE 2 schematically illustrates an arrangement corresponding to that disclosed in the above-mentioned Patent 2,731,215 for thus temporarily altering the direction of tilt of pitch control ring 28, so that craft response will be immediately and continuously in substantially the direction corresponding to the originating control movement, and in addition comprises means for temporarily altering the amount of tilt of the ring 28 so that the craft response to a given control movement will be continuously more uniform in amount than would ordinarily be possible with the arrangement previously disclosed in said above-mentioned Patent 2,731,215.

FIGURE 2 schematically illustrates mechanism which it is proposed to interpose between the primary control members and the rotor to cause the pitch control mechanism of the rotor to respond in the manner above described. Movement is transmitted to the mechanism illustrated in FIGURE 2 by means of links 122a and 200a. Link 122a (FIG. 2) is connected by linkage, not shown, to link 122 (FIG. 7) to move in unison with it. Therefore when control column 120 is rocked forward on its pivot 121 (to the right in FIGURE 7) to cause a forward moment to be exerted on the craft it operates through link 122 to move line 122a upwardly in FIGURE 2 as indicated by the arrow labeled "F." Similarly when column 120 is rocked rearwardly to cause a backward moment to be exerted on the craft it moves link 122a downwardly in FIGURE 2 as indicated by the arrow labeled "B." Link 200a of FIGURE 2 is connected by linkage not shown to rack 200 of FIGURE 6, which as hereinafter described is automatically reciprocated to control the craft laterally. As hereinafter described rack 200 is displaced downwardly in FIGURE 6 to produce a leftward moment on the craft, which through the connecting linkage mentioned causes upward movement of link 200a (FIG. 2) as indicated by the arrow labeled "L," while for a rightward moment these movements are the opposite and link 200a is displaced downwardly in FIGURE 2 as indicated by the arrow labeled "R."

The movements thus transmitted to the mechanism illustrated in FIGURE 2 by links 122a and 200a is transmitted to tilt control rods 36 and 37 which are shown in FIGURE 2 and also in FIGURE 1 wherein is shown the previously described mechanism through which they act to cyclically adjust the pitch of the rotor blades, rod 36 being moved upwardly in both FIGURES 1 and 2 for tilting pitch control ring 28 in the direction normally associated with a forward moment on the craft and downwardly for a backward moment, while rod 37 is moved upwardly in both figures for tilting pitch control ring 28 in the direction normally associated with a leftward moment on the craft and downwardly for a rightward moment. It is the conventional practice in helicopters to provide a construction which is the equivalent of connecting link 122a directly to rod 36 and link 200a directly to rod 37, but in order to eliminate or minimize the effects of the abnormal transient response of the rotor to sudden movements of the primary control members and to overcome the adverse effects due to the slowness in its normal response thereto, I prefer to connect both of the links 122a and 200a to both the rods 36 and 37 by means of the novel mechanism illustrated in FIGURE 2.

As illustrated in FIGURE 2, and in Patent 2,731,215 in detail, lateral control link 200a is connected to lateral tilt control rod 37 through unit 98 in a manner which exactly corresponds to the manner in which longitudinal control link 122a is connected to longitudinal tilt control rod 36 through unit 92. Also this lateral control link 200a is connected to the longitudinal control rod 36 through unit 97 in a manner which corresponds to that in which longitudinal control link 122a is connected through unit 91 to lateral control rod 37.

C. GENERAL ARRANGEMENT OF CRAFT AND COUNTER-TORQUE MEANS
(FIGS. 3, 4 and 5)

FIGURES 3 and 4 illustrate the general form and arrangement of the craft in which my invention is preferably embodied, though it is to be understood that the invention is by no means limited to use in the type of craft here illustrated, nor in conjunction with the particular rotor arrangement illustrated in FIGURE 1. As shown in FIGURES 3 and 4 the engine 60 is connected, through a train comprising appropriate shafts and gearing and including over-running clutch 61 and hydraulic clutch 62, to the rotor shaft 10 to drive same at a suitable reduction ratio from the engine.

Driven by this train is a rearwardly extending shaft 64 carrying at its rear end the adjustable pitch, axial flow fan 65, which fan is employed for counter-torque purposes. Optionally the clutch 64a may be located on shaft 64 for selectively declutching the fan from the engine. Control rod 66 may be selectively positioned to bring the pitch of the blades of fan 65 to any desired pitch angle throughout a range including substantially a zero pitch angle at which no air is delivered by the fan, and a high pitch angle at which the fan will force a large volume of air rearwardly through the duct 67 in which the fan is located. The air so delivered may be drawn in through louvers 68 located on the top and bottom of the fuselage and discharged through a large opening 69 on one side of the fuselage near the tail.

As shown in FIGURE 4 duct 67 is provided with turning vanes 70 immediately inside the opening 69, and as also shown in FIGURE 5 a rotatably adjustable louver slat 71 is located immediately down stream of each turning vane 70. As will be later described, as soon as the craft attains any considerable forward speed (for instance a speed greater than half of normal cruising speed) fan 65 is no longer required for counter-torque purposes and its blades are automatically brought to substantially zero pitch simultaneously with which slats 71 are brought to the positions shown in solid lines in FIGURE 5, in which condition they substantially seal off the opening 69 and minimize the drag of the craft. This positioning of the slats may be effected by springs which automatically become effective to so position the slats upon cessation of airflow from the fan or they may be mechanically positioned by mechanism connected with the pitch control mechanism of the fan. However, when the speed of the craft is low enough to require the use of the fan to supply the proper counter-torque effect for counter-balancing the torque exerted on the craft by the driving of the rotor, then as the pitch of the fan blades is increased above zero pitch (in a manner to be more fully described hereinafter) the slats 71 are automatically swung into the positions in which they are shown in FIGURE 4 and indicated by dotted lines in FIGURE 5. When slats 71 are so adjusted the turning vanes 70 and the slats 71 cooperate to turn the air stream from the fan so that it will be smoothly ejected in a direction generally perpendicular to the craft, thereby exerting a strong torque effect on the craft about the rotor axis.

By controlling the pitch of the blades of fan 65 very much as the pitch of the blades of the conventional helicopter tail rotor are controlled essentially the same sort of adjustment of counter-torque can be effected, but my new location of the counter-torque airscrew eliminates the danger to nearby personnel and property and the danger to the airscrew and craft itself which is inherent with the conventional exposed tail rotor.

As is particularly evident in FIGURE 3 the craft is provided with a rudder 75 and a vertical fin 76, corresponding essentially to the rudder and vertical fin of a conventional airplane except that the vertical fin as well as the rudder is angularly adjustable. As long as the speed of the craft is low and the fan 65 is used for counter-torque as previously described, rudder 75 and fin 76 are maintained at a considerable angle clockwise from the longiutdinal axis of the craft, for instance an angle of about 15°. As the craft gains forward speed the fin and rudder will exert a continually greater counter-torque effect requiring a continual readjustment of the steering controls to reduce counter-torque so as to prevent the increasing counter-torque from the rudder and fin from turning the craft toward the left. As will be hereinafter described I prefer to arrange for automatic effecting of this readjustment. As long as the fan is delivering any air the readjustment will act to decrease the pitch of the fan blades and will not alter the setting of the rudder and fin. However, as soon as the increasing of craft speed and consequent decreasing of counter-torque setting has proceeded to the point where fan pitch is reduced to zero, which is the speed at which the rudder and fin in their hard over position will supply all the counter-torque required, then any further decrease in counter-torque setting, such as would be brought about by further increase in craft speed will cause decrease in the angularity of the rudder and fin, and may also cause declutching of the fan from the engine. The mechanism whereby these adjustments are automatically effected in this manner will be described hereinafter.

D. SCHEMATIC OUTLINE OF PRINCIPAL CONTROL MEANS (FIGS. 6 to 13 inc.)

1. Steering Control

FIGURE 6 is a purely schematic drawing showing the general nature of the principal automatic, semi-automatic, and servo mechanisms which I prefer to employ to improve the control of my helicopter, and showing the manner in which these mechanisms are related to each other and to the principal manual control members which are operable by the operator of the craft. These manual control members include the control column 120 (FIGS. 6 and 7) which as later described is rockable fore and aft on the transverse pivot 121 to control the longitudinal attitude of the craft. Pivotally mounted on a generally longitudinal axis, fixed in and perpendicular to column 120 near the top thereof, is steering wheel 124, integral with drum 125 to which is attached flexible cord 126, which passes around pulleys 127 and is attached to drums 128 and 129 so as to rotate these drums oppositely on shaft 130 on which they are pivotally mounted. This mechanism is provided for effecting and controlling the precessing of the gyroscope, comprising wheel 131 integral with shaft 132 and rotatably mounted in supporting ring 133, which ring is pivotally mounted by means of pins 134 on ring 135, which in turn is pivotally supported by means of pins 136 in the work 137, which fork is pivotally mounted on pin 138 fixed in the frame of the craft. In order to more clearly show the schematic relationships, steering wheel 124 and also the gyroscope supporting rings 133 and 135 are shown in FIGURE 6 as substantially parallel to the plane of the drawing, but it is to be understood that steering wheel 124 normally stands in substantially a vertical plane and rings 133 and 135 in substantially a horizontal plane, the pivotal mounting pin 138 upon which the whole gyroscopic assembly is free to turn in azimuth being normally substantially vertical. Integral with the fork 137 is a forwardly extending arm 139 carrying a normally horizontal pin upon which is pivotally mounted the roller 140, which as hereinafter described acts as an electrical trolley for controlling the operation of the steering motor 141.

It was previously mentioned that drums 128 and 129 are rotated oppositely on shaft 130 by angular displacements of steering wheel 124. In order that such rotation may be utilized to cause precession of the gyroscope a yieldable arm 143 made of spring material is integrally attached to drum 128, and a similar arm 144 integrally attached to drum 129. When steering wheel 124 stands in its central, neutral position the tips of arms 143 and 144 stand a short distance above the upwardly extending projections 145 and 146, respectively, on ring 133. If, however, steering wheel 124 is turned an appreciable distance toward the right arm 144 will be raised and arm 143 lowered into contact with projection 145, thus exerting a leftward torque on the gyroscope about pins 134. Throughout operation of the craft the gyroscopic wheel 131 is spun, near side downwardly in FIGURE 6, and therefore the downward pressure of arm 143 on projection 145 will cause the gyroscope to precess in a clockwise direction as indicated by arrow 148. Similarly rotation of steering wheel 124 to the left of its neutral position will cause arm 144 to press down on projection 146 and cause counter-clockwise precession of the gyroscope as indicated by arrow 149. In each instance the amount of deflection of the spring arm 143 or 144 and consequently the amount of pressure exerted by it will be approximately proportional to the amount of displacement of the steering wheel 124 from neutral, and therefore the angular rate of precession of the gyroscope will be substantially proportional to such displacement. The specific means described above, whereby the steering wheel 124 causes the gyroscope 131 to precess, has been chosen for convenience of schematic showing, and it will be understood that other means well known in the art for applying to a gyroscope a torque to cause it to precess may be utilized in place of the specific mechanism illustrated for the purpose in FIGURE 6.

Cooperating with trolley 140 in controlling steering motor 141 is contact plate 152 carrying two contact strips 153 and 154 arcuate in shape and concentric with pin 138. Strip 153 is electrically connected to terminal 155 of motor 141, and strip 154 similarly connected to terminal 156 thereof. One side (for instance the negative side) of the electrical power source 157 is connected to terminal 158 of motor 141, while the other side thereof is connected through switch 159 to trolley 140, which is electrically insulated from arm 139 just as strips 153 and 154 are electrically insulated from plate 152. Motor 141 is a reversible electric motor so constructed that is, with the negative side of the power source connected to terminal 158, the positive side be connected to terminal 155 the motor will run in one direction, while if the positive side be connected to terminal 156 it will run in the other direction. Therefore, if as illustrated, trolley 140 stands intermediate between strips 153 and 154, without contacting either strip, motor 141 will not operate, but if due to angular displacement of trolley 140 and plate 152 relative to each other trolley 140 is brought into contact with strip 153 or strip 154 motor 141 will be operated in one direction or the other, which through mechanism to be hereinafter dsecribed will effect decrease or increase in compensating torque set up by the counter-torque mechanisms of the craft, such change in counter-torque always being in such a direction as to tend to cause an angular displacement of the craft in azimuth in the proper direction to bring the gap between strip 153 and 154 back under the trolley 140 once again. Gyroscope 131 tends to maintain a fixed azimuth regardless of yawing displacements of the craft, thereby holding trolley 140 at a relatively fixed azimuth. Therefore yawing displacements of the craft in one direction or the other from a constant heading will bring strip 153 or strip 154 under trolley 140 which as previously mentioned, will cause a change in counter-torque adapted to restore the craft to its original heading. If, due to gradual departure of the gyroscope from a constant heading, or due to the desire to change course, the operator desires to alter the heading on which the gyroscope thus acts to maintain the craft, he may displace the steering wheel 124 to precess the gyroscope in the manner previously described, which will alter the azimuth position of trolley 140 in the desired direction, causing it to contact strip 153 or 154 and cause the craft to turn to coincide with the new heading of the gyroscope following such precession.

Since gyropilots, as known at present, ordinarily aim at holding course automatically accurate for long periods of time, a great deal of expense is incurred in finishing the gyroscopes to extremely fine tolerances, in comparison with which a commercially obtainable tolerance of ±0.0005 inch, for instance, would represent a very crude and relatively inexpensive type of workmanship. However, a gyroscope finished to ordinary commercial production accuracy would hold a given course with a degree of constancy at least equal to that characteristic of the ordinary automobile if driven without any corrective movement of the steering wheel, and the attainment of that degree of constancy in steering control would make helicopter operation immensely easier than it is at present. The normal operation of an automobile requires rather frequent corrective movements of the steering wheel, but such movements are easily made, practically unconsciously, by the operator. In operating a helicopter as heretofore known in the art, however, the steering control has to be skillfully readjusted to accurately balance each change in engine torque and/or of craft speed and flight path. A very low cost, commercial tolerance, gyroscope utilized substantially as schematically indicated in FIGURE 6 will reduce the steering of a helicopter to an operation at least as easy as that of steering an automobile, and the gyroscope illustrated in FIGURE 6 is intended to be such a commercial tolerance unit.

As was previously described my preferred form of helicopter is preferably provided with two counter-torque mechanisms one primarily utilized at higher craft speeds and the other at lower speeds. As schematically indicated the steering motor 141 serves to adjust the torque output of these two counter-torque mechanisms by means of a worm 161 integral with the motor shaft and meshing with work wheel 162 integral with shaft 163 with which there is also integral the box cam disc 164 (FIG. 8), the rotation of which angularly adjusts the two shafts 165 and 166 which control the amount of counter-torque effect exercised by the respective counter-torque mechanisms. Shaft 166 is connected to fan pitch control rod 66 (FIG. 4) in such a manner that clockwise rocking of shaft 166 increases fan pitch and counterclockwise rocking thereof decreases it. Shaft 165 is connected to the rudder 75 in such a manner that when arm 165a integral with shaft 165 stands in the position illustrated in FIGURE 8 the rudder is hard over (for instance at 15° angularity) for exerting its maximum counter-torque, whereas when it is rocked as far clockwise therefrom as the cam slot 167 is capable of rocking it the rudder is brought almost parallel to the longitudinal axis of the craft. When disc 164 is rocked approximately 90° clockwise from the position illustrated it brings both the counter-torque mechanisms to their maximum counter-torque settings, since cam slot 167 will have guided pin 166b (integrally mounted in arm 166a integral with shaft 166) into its rightmost position thereby positioning shaft 166 in its furthest clockwise position, and will have guided pin 165b (integrally mounted in arm 165a which is integral with shaft 165) into its leftmost position thereby positioning shaft 165 in its furthest counter-clockwise position. As disc 164 is rocked counterclockwise from this extreme position, as will for instance automatically occur as the craft gains forward speed, the first half turn will not affect the position of shaft 165 since the portion of slot 167 which will be traversed by pin 165b is concentric with shaft 163, and therefore the rudder will remain in its hard over position, but this half turn will rock shaft 166 from its furthest clockwise position to its furthest counter-clockwise position, thereby reducing the fan blade pitch to zero. During the next counter-clockwise half turn of disc 164 pin 166b will traverse an inner portion of the slot concentric with shaft 163 and will therefore continue to hold fan blade pitch unchanged at zero, but the same spiral portion of the slot 165 which during the first half turn served to move pin 166b inwardly of the disc will during the second half turn similarly move pin 165b inwardly thereby rocking shaft 165 clockwise and thus progressively decreasing the angularity of the rudder. This same movement of pin 165b may be arranged, through link 165c which is pivotally connected to lever 165a to operate clutch 64a (FIGS. 3 and 4) and thereby disconnect the fan from the motor. This arrangement is preferably such that as the rudder is eased back quite appreciably from its hard over position the clutch is disconnected, but when the rudder again approaches similarly close to the hard over position the clutch is once again connected preparatory for possible effective operation of the fan. While, for simplicity, a single slot 167 is shown in FIGURE 6 for controlling both of the shafts 165 and 166; it would be possible, if desired, to provide two separate slots in the same disc, each for rocking one of said shafts, in which case there would be greater opportunity for shaping the slots to provide any desired variations in the rate of adjustment of each counter-torque means.

In order to provide the type of follow-up action necessary for effecting smooth steering there is provided, integral with shaft 163 the spur gear 168 (FIG. 6) meshing with segment 169 which is pivotally mounted on the frame of the machine at 169a and contains the slot 169b which serves to guide the pin 170a integrally mounted in the upper end of lever 170. The slot 169b is so shaped that the amount of rocking of segment 169 caused by any given rotation of shaft 163 will displace pin 170a by an amount proportional to the change in counter-torque produced by that same given rotation of shaft 163. Hence pin 170a will move to the right or left of FIGURE 6 in proportion to the change of counter-torque. Near its opposite end lever 170 is pivotally attached by means of pin 172 to links 171 and 173. Link 173 being pivotally mounted on the frame of the machine at 173a constrains pin 172 to move substantially horizontally, and it is positioned horizontally by link 171, the operation of which will be hereinafter described. For the present purpose pin 172 may be considered as a fixed pin on which lever 170 is pivotally mounted.

Pivotally attached to lever 170 near its mid-point is an automatically adjustable link 174 comprising piston rod 175 integral with a piston reciprocable in hydraulic cylinder 176, which cylinder is, in turn, pivotally attached to arm 177 integral with contact plate 152. Plate 152 is mounted so that it may be angularly displaced through a small angular range concentrically with pin 138, and it is normally yieldably held in the middle of this range by two springs 178 each of which abuts at one end one of the two fixed ears 179 and abuts at the other end the nose 180 integral with plate 152. The piston in cylinder 176 is arranged to have a small definite amount of leakage so that the hydraulic fluid with which cylinder 176 is filled may gradually pass from one side of the piston to the other and hence gradually permit displacement of the piston in the cylinder. Hence link 174 offers no effective resistance to changing its length if pressure or tension is maintained on the link in a single direction for any considerable period of time, but so far as any movements of short duration are concerned it acts as a link of substantially fixed length. Therefore, whenever motor 141 rotates shaft 163 in one direction or the other it displaces segment 169, rocks lever 170 on pivot 172 correspondingly displacing link 174 and contact plate 152, thereby limiting the rotation of shaft 163 to an amount dependent upon the angular displacement of trolley 140 which originally caused the rotation of shaft 163, and acting to return shaft 163 substantially in proportion to the return of trolley 140 to its normal position relative to the craft, all of which is the normal function of a follow-up mechanism as known in the art.

There is, however, one important difference between the steering control of a single rotor helicopter and that of an airplane. For instance, namely in an airplane there is a single definite rudder position that corresponds to normal undisturbed straight forward flight under all normal flight conditions while in a single rotor helicopter the amount of counter-torque necessary to effect straight forward flight depends upon current engine output and other factors, including particularly craft speed in the case of my prefered form of helicopter. Hence shaft 163 may have to occupy any of a large range of positions in order to set up the proper amount of counter-torque for straight forward flight. If link 174 were a link of fixed length it would cause plate 152 to occupy a different angular position for each such different angular position of shaft 163, thus causing each change in engine torque and craft speed to produce an angular change in the course on which the gyroscope tends to maintain the craft. However, with link 174 capable of gradually adjusting the length in the manner described, and with plate 152 controlled by springs 178, as described, any tendency for plate 152 to remain to either side of center will cause that one of the springs 178 which resists that displacement to continuously or predominantly exert a force in one direction on link 174 causing it to so readjust its length that plate 152 will remain on the average substantially central. Therefore, if pin 172 were to remain stationary as thus far supposed, a sudden marked change in engine torque or craft speed would tend to angularly alter the steering by temporarily displacing plate 152, but as soon as link 174 would readjust its length to accord with such a change plate 152 would return to an average neutral position and the angular alteration of steering would be wiped out. Since, the changes in craft speed are necessarily relatively gradual it is feasible to have the rate of leakage in cylinder 176 great enough so that no appreciable angular alterations in steering need be introduced from this source.

Changes in engine torque may be more rapid than changes in craft speed, but I provide special means to eliminate or at least minimize any angular effect on steering from this source. As will be later described in more detail, the engine throttle is directly connected to link 183 (FIG. 6) and is adjusted by the rocking of segment 184 integrally with its pivot shaft 185, segment 184 being pivotally attached to link 183 at 186. Therefore the angular position of segment 184 about its pivot 185 is indicative of current engine torque, and in general each change in engine torque is brought about by a change in the angular position of segment 184. By providing segment 184 with a slot 187 cooperating with the roller 188 mounted on bell-crank 189 that bell crank 189 may be rocked on its fixed pivot 190 by each change in engine torque. Slot 187 may be so shaped as to accord with the response of any given type of engine to its throttle adjustment so that link 171 will be displaced longitudinally in direct proportion to the change in engine torque at all parts of its range of movement. Assuming that, as illustrated in FIGURE 4, the counter-torque is applied in a counter-clockwise direction, then energization of strip 154 causes increase in such counter-torque and energization of strip 153 decrease thereof, and shaft 163 is rotated clockwise, as viewed in FIGURES 6 and 8, to increase counter-torque and counter-clockwise to decrease it. Correspondingly segment 184 is rocked clockwise to open the engine throttle and increase engine torque, causing clockwise rocking of bell crank 189 and leftward movement of link 171.

When engine torque is changed this mechanism will function as follows. For instance, if with all steering apparatus in a normal and balanced condition segment 184 be given a quick clockwise displacement to increase engine torque, without the operation provided through bell crank 189 and link 171 the craft would be displaced clockwise by the resulting increase in the torque set up between the craft and the rotor and would move strip 154 under trolley 140 before increase in counter-torque would be commenced. The clockwise rotation of shaft 163 incident to increasing of counter-torque would cause rightward movement of link 174 and counter-clockwise rocking of plate 152 which would serve to perpetuate this clockwise displacement of the craft until the lapse of sufficient time for link 174 to readjust its length to the new condition and the consequent return of plate 152 to its normal centralized position. However, with the provision of bell crank 189 and link 171 the leftward movement of link 171 simultaneously with the movement of segment 184 which causes the change in torque will cause lever 170 to rock clockwise about pin 170a, carrying link 174 leftward and rocking plate 152 clockwise, thereby bringing strip 154 under trolley 140 and commencing to increase counter-torque simultaneously with the increase of torque and before the craft has been angularly displaced by the change in torque. This increase in counter-torque will be accomplished by clockwise rotation of shaft 163, causing counter-clockwise rocking of segment 169 and rightward movement of pin 170a by slot 169b, thus cancelling the effect of the leftward movement of link 171 and restoring link 174 and plate 152 to their normal positions as soon as the torque and counter-torque have reached their new values, and without any angular displacement of the craft required to accomplish the readjustment. If the shape of slot 187 is such that the amount of movement imparted to link 174 in one direction by link 171 as an incident to any given increase in the torque exerted by the craft upon the rotor equals the amount of movement imparted to it in the opposite direction by segment 169 as an incident to an equal increase in counter-torque, and if the motor 141 is arranged to increase counter-torque substantially as rapidly as the engine increases torque, the steering adjustment may be effected as outlined with no angular displacement of the craft even in case of large and sudden changes in torque. To any extent that such equality may, for any reason be lacking in any given instance, craft displacement will occur and produce the necessary residual readjustment of the counter-torque, but such craft displacements will be slight and of short duration as compared with those which would occur if plate 152 were not connected to the engine throttle through link 171 and bell-crank 189.

The relation of engine power to the torque set up between the craft and the rotor is, however, not a constant relationship, being particularly varied by the amount of power required to drive the counter-torque means. For instance, with the counter-torque arrangement illustrated in FIGS. 3 and 4 more than ten percent of the engine power may go into driving the counter-torque means when the blades of the counter-torque fan are set to a high pitch setting, and this may be reduced to little or no power as the blade pitch is reduced to zero and the fan declutched. However, in view of the fact that the amount of power delivered to the counter-torque means and consequently the proportion of power going to produce torque at the main rotor is largely controlled by the position of counter torque control shaft 163 (FIGS. 6 and 8) the differences in this proportion may be largely compensated for and eliminated as a source of disturbance to automatic steering by so shaping slot 169b (FIG. 6) that the amount of movement imparted to pin 170a as the result of a given amount of change in counter-torque will vary for different portions of the rotational range of shaft 163 substantially in proportion to the reciprocal of the proportion of engine power going to the main rotor in each portion of said range.

For instance, when shaft 163 is so positioned that approximately 10% of the engine power will normally go to the counter-torque means and 90% to the main rotor, it will require about the reciprocal of 90% times as much increase in engine power and corresponding displacement of link 171, to produce a given amount of change in rotor torque, as would be required when 100% of the engine power goes to the main rotor. Therefore, if slot 169b is so shaped that displacement of shaft 163 in this part of its range will cause the reciprocal of 90% times as much displacement of pin 170a as does corresponding displacement of shaft 163 in the portion of its range of movement wherein the engine power is transmitted directly to the counter-torque means, the contribution of the rotor torque and of the counter-torque to the displacement of adjustable link 174 will remain in proper balance.

Slot 169b is therefore preferably so shaped that, instead of displacing pin 170a in constant direct proportion to counter-torque, which was above suggested as a first approximation to its pattern of displacement, it will in each portion of its length displace pin 170a substantially in that proportion divided by the complement of the approximate percentage of engine power going to the counter-torque means when shaft 163 is positioned to bring pin 170a into that portion of the length of slot 169b. As previously mentioned, any final imperfection in ideally attaining the relationship above outlined in any given instance will be corrected through angular displacement of the craft and operation of the steering gyro, but constructing the mechanism as above outlined will minimize such angular departures and make for steadier and more perfect automatic steering.

2. *Lateral Control*

As is customary in helicopters lateral control of the craft is exercised by effecting appropriate cyclic pitch changes of the rotor blades. As previously described rack 200 (FIG. 6) is connected to link 200a (FIG. 2) in such a manner that its reciprocation up or down from its neutral position as illustrated in FIGURE 6 will produce the appropriate cyclic changes in rotor blade pitch to exercise lateral control on the craft in the one or the other direction, respectively. The reversible electric motor 201 is connected to rack 200 to reciprocate it so as to bring about the proper lateral control of the craft. To this end the negative side of electrical power source 202 is connected to terminal 203 of motor 201, and the positive side thereof connected through switch 204 to trolley 205, and thence selectively through either contact strip 206 or 207 to either terminal 208 or terminal 209 to cause operation of the motor in the one or the other direction, respectively.

According to the schematic showing of FIGURE 6, trolley 205 is integrally mounted on the normally vertical shaft 210 on which there is also integrally mounted outside the craft the vane 211, this vane preferably being located beneath the nose of the craft as indicated in FIGURE 3. As indicated in FIGURE 6, a spring 213, tensioned between the vane and a fixed stud 214 serves to lightly centralize the vane. However, if there exists any lateral component of movement of the craft relative to the surrounding air, the resulting lateral movement of the air relative to the craft will exert a lateral force on vane 211 causing it to rock about the pivotal mountings of shaft 210. If this lateral movement is accompanied by little or no longitudinal movement of the craft, vane 211 will rotate until spring 213 sets up a moment about shaft 210 equal and opposite to that exerted by the air pressure on the vane 211. However, if the craft has much forward speed the moment exerted by spring 213 will be so small in comparison with the aerodynamic forces which would be exerted on vane 211 if it made much of an angle to the airstream that the vane substantially aligns itself with the airstream and its angular position is not affected in any very appreciable degree by spring 213. Since trolley 205 and vane 211 are schematically assumed to both be integral with shaft 210, in the arrangement illustrated in FIGURE 6, trolley 205 will at all times be angularly displaced in unison with vane 211 by an amount indicative of the lateral movement of the craft.

Such angular displacement of trolley 205 will bring it into contact with either the contact strip 206 or the contact strip 207, depending upon the direction of the sideward movement which has caused displacement of vane 211. This will start motor 201 operating in one or the other direction, to displace rack 200 in the proper direction to cause the rotor to exert on the craft a lateral force opposing the lateral motion. A follow up linkage is provided, however, which serves to limit the displacement of rack 200 from neutral to an amount substantially proportional to the displacement of the vane, which in turn is indicative of the amount of lateral movement to be corrected. This follow up linkage includes lever 218, which is pivotally connected at one end to rack 200, and at the other end to link 219, which in turn is pivotally connected to the normally centralized control lever 220. The mid-point of lever 218 is connected by link 221 to segment 222, which carries the contact strips 206 and 207. Means not shown in this schematic arrangement but corresponding to that shown for the same purpose in connection with centralizing lever 220′ in the embodiment illustrated in FIGURE 16, normally serves to yieldably hold lateral control lever 220 (FIG. 6) centralized in its neutral position, and as long as it is so held lever 218 and link 221 comprises a follow-up mechanism for rocking segment 222 substantially in proportion to the movement of rack 200 thereby limiting the displacement of rack 200 to an amount substantially proportional to the displacement of vane 211, and returning rack 200 to its neutral position simultaneously with the return of vane 211 to neutral and hence simultaneously with the checking of the lateral movement that was to be eliminated.

This lateral control mechanism therefore normally serves to prevent lateral movement of the craft relative to the air, quickly and smoothly checking any slight amounts of lateral movement that may for any reason develop. Since any such slight amounts of lateral movement will normally occur more or less equally in the two opposite directions, the lateral control mechanism enables the craft to proceed with no appreciable net lateral movement whatever. Thus its progress through the air will be parallel to the longitudinal axis of the craft, thereby making it possible for the helicopter to fly a compass course just as an airplane does. Heretofore, this has not been possible in helicopters because as previously constructed there was no fixed relationship maintained between the direction in which the craft faced and the direction in which it proceeded through the air.

By employing a counter-torque mechanism such as illustrated in FIGURES 3 and 4 comprising a vertical fin 76 and a rudder 75, the craft attains a degree of weathercock stability comparable to that of an airplane which, combined with lateral control mechanism such as above described, insures that the craft will dependably and smoothly progress through the air in a direction parallel to the longitudinal axis of the craft, whereas a craft which lacks either such weathercock stability or such lateral control will be more subject either to yawing displacements or to sideslipping movements which will render the following of a compass course more difficult and/or less exact.

In aircraft as heretofore constructed it has not proved feasible to apply automatic control mechanism to the cyclic pitch controls of the rotor because of the sluggishness and so called "gyroscopic effects" which appear in the responses of the craft to any such control when applied at all quickly. However, by interposing between the primary lateral control member (rack 200, FIG. 6) and the cyclic pitch control rods (rods 36 and 37, FIGS. 1 and 2) the mechanism schematically illustrated in FIGURE 2 and described hereinabove, the craft response becomes substantially instantaneous and proportional to the displacement of rack 200, thus rendering the use of such automatic control mechanism feasible and highly satisfactory.

As thus far described the lateral control mechanism serves merely to prevent lateral movement of the craft relative to the air. However, such lateral movement is sometimes desired in a helicopter, particularly in executing sidewind take-offs or landings. Lateral control lever 220 is provided in order to permit the operator to cause the craft, at will, to execute any desired amount of sideslip. For instance, if the operator desires leftward movement of the craft relative to the air he rocks lever 220 to the left. As may be observed in FIGURE 6 this will raise link 219, thereby raising the position of link 221 for any given position of rack 200. Thus if rack 200 is in its neutral position this raising of link 221 will cause segment 222 to be angularly displaced counterclockwise from its normal neutral position as illustrated in FIGURE 6 by an angle proportional to the angle through which lateral control lever 220 has been rocked leftward. Under these conditions the lateral controls of the craft will be automatically operated to maintain whatever amount of leftward sideslip is necessary to maintain vane 211, and trolley 205 displaced counterclockwise from their normal central positions through the same angle that segment 222 is angularly displaced, for if the trolley departs in either direction from that amount of angular displacement it will contact strip 206 or strip 207 and cause operation of the lateral rotor controls in the proper direction to bring vane 211 back into normal angular alignment with segment 222 in its angularly displaced position.

The schematic showing the FIGURE 6 upon which the foregoing description of the lateral control of the craft has been based is a simplified schematic arrangement, which under forward flight conditions is substantially equivalent to my preferred arrangements, schematically illustrated in FIGURES 9 and 10. These preferred arrangements, however, are provided with additional mechanism which serves to improve the performance of the craft particularly under hovering conditions. For instance when hovering close to the ground it is ordinarily desired that the craft shall as nearly as possible remain stationary with respect to the ground, and said preferred arrangements aid in accomplishing this.

First, let us consider the performance of a craft which is manually or automatically controlled to minimize or prevent lateral tilting of the craft and of the rotor. If such a craft is exposed to a lateral gust, for instance a sudden gust from the right, the leftward movement of the air relative to the craft will exert a leftward drag on the fuselage and other parts of the craft tending to make it gradually accelerate toward the left during the duration of the gust unless the operator of the craft tilts the rotor toward the right to resist such a leftward acceleration and movement, which movement is generally undesirable.

With an arrangement such as that schematically shown in FIGURE 6, and above described, for automatically minimizing lateral movement of the craft relative to the air, the effect of such a gust on the craft will be further increased, for when the leftward gust hits the craft vane 211 is displaced thereby just as by any other rightward movement of the craft relative to the air, and it causes the rotor to be tilted leftward to eliminate the lateral relative movement of the craft and the air by causing the craft to move leftward with the air. Since in this case the drag forces which in the first mentioned case caused leftward acceleration, are augmented by leftward tilt of the rotor, the leftward acceleration and movement of the craft will be much greater than in the first case. Therefore the control which would be exercised by utilizing vane 211 in the simple manner schematically indicated in FIGURE 6, while giving highly desirable results in forward flight, will give results which are undesirable under hovering conditions because it serves to increase whatever tendency already exists for the craft to be carried about by gusts.

I therefore prefer to supplement the lateral control exercised by vane 211 by means sensitive to lateral accelerations of the craft and operative to exert a tendency to stop such accelerations. One form of this means is schematically illustrated in FIGURE 9, wherein it is shown as comprising two weights 223 and 224 which weights are integrally supported on arms 223a and 224a, respectively, and constitute an inverted pendulum and a normal pendulum, respectively, pivotally mounted independently of each other on the pivot 225 fixed in the craft. Weight 223 is yieldably held diametrically opposite weight 224 by two springs 226 tensioned between a pin 224b integrally mounted in the arm 224a and two respective arms 227a which form integral parts of a plate 227 integrally mounted on arm 223a. The weight 224 is heavier than the weight 223 and/or located further from the center 225, so that the entire assembly always tends to come to rest with weight 224 directly beneath pivot 225 and weight 223 directly above it.

Plate 227 is provided with the arcuate rim 228 concentric with center 225. A somewhat similar arcuate rim 229 is provided integral with arm 224a. Rim 220 is also concentric with center 225, but in the embodiment shown in FIGURE 9 rim 229 is of smaller radius than rim 228.

The mechanism just described serves to selectively position a slide 230, which is constrained by guideways (not shown) to move only in a straight line parallel to its own length. Rotatably mounted on two arms of slide 230 near its right end are two pulleys 230a and on two arms near its left end two pulleys 230b. A flexible cord 231, fastened to rims 228 and 229 passes around these four pulleys. Preferably this cord is made up of two parts, part 231a commencing at the left end 228a of rim 228, at which point it is fastened to the rim, and thence passing over the rim, around pulleys 230a, over the surface of rim 229 to the left end 229a thereof where it terminates and is fastened to the rim 229; while part 231b of the cord originates at the right end 228b of the rim 228, at which point it is fastened to the rim, and thence passes over the rim around pulleys 230b, over the outer surface of rim 229 to the right end 229b thereof, where it terminates and is fastened to rim 229.

If a lateral acceleration, toward the left for instance, is imparted to the craft the inertia of the weights 223 and 224 causes them to tend to move rightwardly relative to the craft, thereby bringing the two pendulums out of alignment with each other, thus increasing the length of cord 231a that is free of the rims 228 and 229 and correspondingly shortening the free portion of cord 231b thus shifting slide 230 toward the right. Similarly a rightward acceleration of the craft will cause slide 230 to shift toward the left. If the craft tilts toward either side slide 230 is also shifted, for while under this circumstance the two pendulums remain in line with each other the difference of radius of rims 228 and 229 will cause unequal feeding of the two parts of the flexible cord. For instance, if the craft tilts toward the left both pendulums are displaced clockwise through equal angles. This will cause rim 229 to pay out a certain amount of cord 231b and to take in an equal amount of cord 231a, while rim 228 pays out a greater amount of cord 231a and takes in that same greater amount of cord 231b. Hence there is a net lengthening of the free portion of cord 231a and an equal shortening of cord 231b causing slide 230 to shift toward the right as though it were attached to the combination pendulum at a point located in the direction from center of the larger radius rim. Similarly, if the craft tilts toward the right, slide 230 will shift toward the left.

Vane 211' is a wind vane normally aligned parallel to the longitudinal axis of the craft by spring 213' attached to fixed stud 214', these parts corresponding to vane 211, spring 213, and stud 214, respectively, of FIGURE 6, and just as with that vane, vane 211' is rotatably displaced on its pivot pin 211a by any lateral movement of the craft relative to the air. Vane 211' is connected by means of link 232 to the lower end of an arcuate lever 233, the upper end of which is pivotally attached to slide 230. Running longitudinally of lever 233 is a slot 233a which embraces a pin 234a integrally mounted on the lever 234, which lever is pivotally attached at 234b to the downwardly extending arm of an electrical trolley 205' corresponding to trolley 205 of the FIGURE 6 showing and selectively co-operating with contact members 206' and 207' to selectively operate reversible motor 201' and raise or lower rack 200' to produce a rightward or leftward controlling effect, respectively, upon the craft. The mechanisms employed in connection with this part of the operation correspond exactly to those shown in FIGURE 6 and previously described, and the corresponding parts in this embodiment are identified by the same numerals as in FIGURE 6 but followed by a prime mark (').

Link 219' which corresponds to link 219 of FIGURE 6 is moved upwardly by manual control lever 220 of FIGURE 6 to cause the craft to move leftward with respect to the air, and downwardly for rightward movement, just as with link 219 of FIGURE 6. However, instead of transmitting its movement directly to lever 218' (as link 219 of FIGURE 6 transmits its movement to lever 218) the movement is first combined with that originating from the manually positionable lateral trim wheel 235. This wheel is provided with adequate friction or special retaining means (not shown) to retain it wherever it is positioned. It is geared to segment 236, which is pivotally mounted on the fixed pin 236a and arranged so that its rocking will raise or lower link 237. Lever 238 serves to combine this movement with that from link 219' and transmit movement proportional to the resultant to link 239 and thence to the right end of lever 218', which end is therefore positioned just like the right end of lever 218, FIGURE 6, except that the right end of lever 218' is subject to adjustment by trim wheel 235 as well as by link 219'.

In addition to the vane 211', above described, is a second vane 240 which is also exposed to the airstream as indicated in FIGURE 3 and is integral with vertical shaft 240a rotatable in journals fixed in the craft. Vane 240 is normally held transversely of the craft by centralizing spring 241. Also integral with shaft 240a is arm 242 which is connected to lever 234 by link 243. When vane 240 is in its normal lateral positions pin 234a stands near the upper end of slot 233a so that lever 234 is primarily positioned by slide 230 and not appreciably affected by vane 211'. However, as the craft develops forward speed, vane 240 rocks rearwardly on its pivot shaft 240a, thus raising link 243, rocking lever 234 counterclockwise on pivot 234b, and lowering pin 234a until as the forward speed becomes quite appreciable pin 234a reaches the bottom of slot 233a, under which conditions lever 234 receives its movement substantially solely from vane 211'. Slot 233a is constructed on an arc which, when all parts are normally positioned is concentrically located with respect to the pin 234b, so that the rocking of lever 234 by vane 240 will not alter the position of trolley 205' except in response to displacements of slide 230 or vane 211'.

The operation of the mechanism shown in FIGURE 9 will now be briefly described. If the craft is hovering all parts stand normally substantially as shown in FIGURE 9. If now the craft should tilt toward the left, slide 230 will be displaced rightwardly, bringing trolley 205' onto contact 206' and operating motor 201' to raise rack 200' to produce a rightward controlling moment on the craft. Since a leftward tilting of the craft is ordinarily associated with a leftward acceleration this will produce a tendency for both pendulums to move rightwardly relative to the craft, thus further increasing the rightward displacement of slide 230 and proportionate upward movement of rack 200'. If instead of there being any craft tilt the craft is carried bodily leftward by a gust, slide 230 receives at least the last mentioned component of its rightward movement and causes a corresponding rightward control to be exerted on the craft. Thus during hovering the controls automatically act to resist any lateral tilting of the craft and/or any lateral acceleration thereof from any source whatever. To any extent that these may fail to perfectly balance, the craft may tend to gradually develop a lateral movement but this may be counteracted by manipulation of lateral control lever 220 (FIG. 6) and/or trim whele 235, and in any case the automatic mechanism will smooth out the effect of gusts and other irregularities and make it much easier than it would otherwise be to control the craft to hover substantially stationary with respect to the ground.

In case the craft is moved sideward or rearward, (neither of which maneuvers are executed at much speed) vane 240 continues to hold pin 234a in the upper end of slot 233a so that the control remains substantially as above described. In the case of sideward movement, however, the rate of movement permitted will be limited and controlled by the above described mechanism. A leftward movement for instance would be instituted by raising link 219' and thereby rocking segment 222' leftwardly, bringing contact 207' under trolley 205' and starting a leftward tilt of the rotor. The leftward movement of the craft by the rotor will cause the craft to tilt leftward moving slide 230 toward the right. This movement, slightly augmented by the rightward swinging of vane 211' will cause counterclockwise rocking of trolley 205' which will thereby limit the leftward movement to a speed related to the amount of displacement of link 219'. During the time that the craft is developing its leftward velocity excessive leftward tilting of the rotor will be avoided by the additional rightward displacement of slide 230 contributed on account of the leftward acceleration. Since the acceleration falls off as the lateral velocity increases the displacement of slide 230 and the consequent limitation of rotor tilt is fairly constant, and the over-controlling that would tend to be present without the acceleration-sensitive feature of the mechanism is avoided.

As the craft attains forward speed, however, the airstream rocks vane 240 rearwardly on its pivot 240a, thereby raising link 243 (FIG. 9) and rocking lever 234 counter-clockwise on pivot 243b, thus gradually decreasing the controlling effect of slide 230 and increasing the controlling effect of vane 211'. As soon as the craft has attained even a reasonably small fraction of its normal forward cruising speed pin 234a has been brought to the lower end slot 233a, thereby substantially terminating the control from slide 230 and establishing vane 211' as substantially the sole source of automatic control. The mechanism will then operate to automatically eliminate all lateral movement of the craft relative to the air in a manner exactly corresponding to that previously described in connection with the lateral control mechanism shown in FIGURE 6. Link 219' is normally held fixed in its neutral position by the centralizing of lever 220 in the manner mentioned hereinabove, and it is intended that the operator shall not have to operate lever 220 to manually exercise lateral control of the craft during cruising. However, if for any reason the craft shows a continuing tendency to veer off to one side, the lateral trim wheel 235 may be employed to eliminate such tendency and keep the craft travelling in a direction relative to the air which, on the average, coincides with its own longitudinal axis. To aid in such lateral trimming of the craft to avoid sideslip vane 211' may be connected to operate a conveniently located indicator so that any departure of vane 211' from parallelism with the axis of the craft can be easily noted by the operator.

It is to be noted that the word "trim" as used herein refers to the effecting of auxiliary settable adjustments for the purpose of altering the neutral or average effect of a controlling member, and to this extent it corresponds to the usage of the word as applied to airplanes, but whereas in the airplane such "trimming" usually involves the exerting of forces tending to change the attitude of the fuselage and the craft as a whole, as applied herein to the helicopter it usually involves only the exerting of forces for changing the attitude of the rotor and not, as a rule, any tendency to appreciably change the attitude of the fuselage or of the craft as a whole.

When the craft is moving forward at sufficient speed so that the lateral control is primarily exercised by vane 211' proper banking for the turns is automatically effected, for the craft will sideslip on a turn unless properly banked and the lateral control mechanism responds to vane 211' in a manner effective to eliminate sideslip. Therefore the strength of spring 241 and the area of vane 240 should be such that the counterclockwise rocking of lever 234 should not take place to any very appreciable extent until the craft has gained more forward air speed than it would be apt to acquire while the operator is interested in holding the craft substantially stationary relative to the ground, but the rocking should be very nearly complete before the craft exceeds the forward air speed at which unbanked turns are acceptable.

FIGURE 10 shows schematically a form of mechanism alternative to that shown in FIGURE 9 for exercising lateral control of the craft automatically. As in the arrangements shown in FIGURES 6 and 9 the control is finally effected by vertical displacement of a rack 200", which is connected to link 200a of FIGURE 2, and corresponds to racks 200 and 200' of FIGURES 6 and 9, respectively. This rack is selectively displaced by operation of a reversible electric motor 201" under control of a trolley 205", which motor, trolley, and related parts including electrical contacts, leads, terminals, switch, source of power and the like correspond exactly to those shown in FIGURES 6 and 9 as previously described, and the corresponding parts in this embodiment are identified by the same numerals as in those figures but followed by a double prime mark (").

Corresponding to the FIGURE 9 embodiment, link 219" is subject to vertical displacement by the lateral control lever 220 (FIG. 6), and is pivotally connected to lever 238' for combining its movement with that from another source, but the second source in this case is the steering wheel 124 (FIG. 6). This steering wheel is also shown at the top of FIGURE 10 to schematically indicate its relationship to the mechanism shown in that figure, and it is connected by a broken line to cam disc 244 to indicate that said disc is connected to the steering wheel to be always rotated by it. This disc 244 is provided with a box cam groove 244b formed in the face of the disc, which groove embraces roller 245a on lever 245. As disc 244 is rocked on its fixed pivot 244a in synchronism with steering wheel 124 it repositions roller 245a thereby rocking lever 245 on its fixed pivot 245b. Groove 244b is so shaped that angular displacement of wheel 124 within its normal range of angular positions in either direction from neutral will cause lever 245 to be rocked in the same direction as the wheel is rocked.

This rocking of lever 245 by wheel 124 is utilized to automatically bank the craft at the proper angle for the particular sharpness of turn corresponding to the current setting of steering wheel 124. As previously described this steering wheel controls the rate of precession of the steering gyroscope and hence the rate at which the craft changes direction in effecting a turn. However, since the required angle of bank depends upon the forward speed of the craft as well as upon the position of the steering wheel a means is provided which is selectively responsive to the forward speed of the craft and is effective to alter the amount of movement transmitted by any given angle of rock of lever 245, thereby altering the amount of tilt of the craft caused by any given angular displacement of steering wheel 124. This means comprises a vane 240' similar to the previously described vane 240, and like it located in the airstream and normally held transversely of the craft by spring 241'. Through a lever 242' and a link 243' it serves to reposition a link 246 on its pivot pin 246a, but since vane 240' will be rocked in accordance with one function of craft speed while it is desired to rock link 246 in accordance with another function thereof a segment 247 is provided integral with vane 240' and its vertical pivot shaft 240b, which segment is provided with a slot 247a embracing a roller 242a on lever 242', which lever is pivotally mounted on the frame of the craft at 242b. Slot 247a is so shaped that the counterclockwise displacement of vane 240' on its pivotal center 240b by each given amount of forward speed of the craft will bring link 246 into a position to transmit just the amount of movement from lever 245 which corresponds to the amount of banking required at that speed.

Movement originating from the angular displacement of steering wheel 124 and consequent rocking of lever 245 is transmitted to the lateral control mechanism through this link 246, the lower end of which is pivotally attached to lever 248' at 246a, and the upper end of which carries a roller 246b which is embraced by the slot 245c of lever 245. When the craft has no forward speed no banking is required in connection with turning the craft and therefore under these circumstances roller 246b stands directly on the line joining pins 246a and 245b as illustrated, so that the rocking of lever 245 will not displace lever 238'. However, as the craft gains forward speed vane 240' is rocked increasingly in a counter-clockwise direction, rocking lever 246 so as to bring roller 246b further and further to the right so that increasing movement will be imparted to lever 238' by any given rock of lever 245.

Thus a leftward movement of the steering wheel 124 will raise the left end of lever 238' by an amount dependent upon the amount of that movement and upon the forward speed of the craft, while a leftward movement of lateral control lever 220 (FIG. 6) will raise link 219" (FIG. 10), and raise the right end of lever 238', and a rightward movement of either of these members will cause just the opposite movements. Link 239' which is connected to a mid-point of lever 238' will therefore be displaced up or down in proportion to the amount of leftward or rightward control respectively introduced from either or both of these sources. This vertical displacement of link 239' will rock lever 218" on its pivotal attachment to rack 200", thereby correspondingly raising or lowering link 248, rocking lever 249 on its normally fixed pivot 249a, and correspondingly lowering or raising link 221" and thus correspondingly rocking segment 222" on its pivotal center 210". If pivot 249a, which is positioned in a manner to be hereinafter described, is in its neutral position, and steering wheel 124 and lateral control lever 220 are in the neutral positions in which they are normally centralized, segment 222" stands in its normal central position as illustrated in FIGURE 10.

The trolley 205" is angularly positioned about this same pivotal center 210" by a vertical gyro 250, to which it is connected by a link 251. This vertical gyro may be of any of the several well known constructions which serve to maintain the spin axis of a gyro wheel substantially vertical in spite of the displacements of the craft in which the gyro is mounted. This gyro is schematically indicated in FIGURE 10 as comprising a gyro wheel 252 integral with an axle 252a, rotatably mounted in bearings 253a integral with support ring 253, which ring is pivotally mounted by means of pins 254a in fork 254, which fork is integral with axle 254b jounraled so as to maintain the axle parallel to the longitudinal axis of the craft (perpendicular to the plane of FIGURE 10). This gyro is equipped with means, not shown but well known in the art, for continuously spinning the gyro wheel 252, and also with other means, which are also not shown but well known in the art, for maintaining the axle 252a of the gyro wheel substantially vertical, and hence the maintaining the pivotal axis established by pins 254a substantially horizontal. Integrally attached to fork 254 is a downwardly extending arm 255 pivotally attached at its lower end to link 251. Arm 255 will therefore displace link 251 substantially in proportion to any lateral departure of the craft from a level attitude and will rock trolley 205" on its pivot 210" accordingly.

A leftward tilt of the craft will normally bring trolley 205" onto contact 206" which will cause motor 201" to be operated to produce a rightward rotor force on the craft, while a rightward tilt will normally bring it onto contact 207" to produce a leftward rotor force. The normal type of follow-up action from rack 200" to contact segment 222" is provided through lever 218" which is displaced by rack 200" about its pivotal connection to link 239' thus displacing link 248, rocking lever 249 on pivot 249a and displacing link 221" to rock segment 222" in proportion to the displacement of rack 200".

The following considerations relate to the ideal proportioning of the above described mechanism.

Let

A=any given angle of lateral tilt of the craft relative to the vertical.

B=the angular displacement of trolley 205" relative to the craft as a consequence of tilting the craft through the angle A from the vertical.

c=the linear displacement of rack 200" which will result in finally effecting the angle "A" of tilt of the rotor relative to the craft.

D=the angle through which segment 222" is rocked relative to the craft by the displacement of rack 200" through the distance c.

I have discovered that the best lateral control will be effected if the linkage connecting gyro 250 to trolley 205", the follow-up mechanism connecting rack 200" with segment 222", and the mechanism through which rack 200" controls the rotor are proportioned so that $$B=D$$

If these mechanisms are so proportioned that this relationship exists, their resultant tendency will be to hold the rotor horizontal regardless of the amount of lateral tilt of the craft, while if it does not exist any eccentric loading which tends to give a continued tilt of the craft to one side will tend to result in the craft maintaining a lateral component of velocity in one direction or the other.

The FIGURE 10 embodiment also includes an acceleration-sensitive means very similar to that of FIGURE 9 embodiment. This means comprises a pendulum 224' and a smaller inverted pendulum 223', both pivotally mounted at 225' and yieldably held in opposing alignment by springs 226', all as previously described in connection with the parts of the FIGURE 9 embodiment which are similarly numbered but which in that embodiment do not carry the prime mark (') characteristic of the corresponding parts of this means in this embodiment. Also, as in that previous embodiment, a rim 228' is integral with pendulum 223' and a rim 229' with pendulum 224', and these rims are attached to a cord 231', which cord passes around pulleys mounted on a horizontal guided slide 230', corresponding to slide 230 of that previous embodiment, and the cord 231' is preferably made up of two parts and attached to the rims in the manner previously described in connection with that embodiment. The only important difference between this embodiment and that of FIGURE 9 is that rims 228' and 229' are of equal radius, and therefore slide 230' is displaced solely in accordance with lateral accelerations instead of being displaced by both lateral accelerations and tilts, as was true of slide 230 of the FIGURE 9 embodiment. In case of a lateral tilt exclusive of acceleration the upper part of cord 231' will be displaced in one direction by rim 228' through just the same distance that the lower part of the cord is displaced in the other direction by rim 229' and hence there will be no displacement of slide 230'. Slide 230' is, however, displaced rightwardly by leftward accelerations and leftwardly by rightward accelerations, just as was true of slide 230. These displacements serve to rock bell crank 256 on its pivot 256a, thereby imparting vertical displacement to pin 257a which is integrally mounted in lever 257. With the link 258 angularly positioned as illustrated in FIGURE 10, this vertical movement will be transmitted to roller 258a, which is mounted on link 258 and embraced by slot 257b in lever 257, thence through link 258 to pin 249a which pivotally connects link 258 to lever 249. Lever 249 will thus be rocked about its pivotal connection to link 248, which through link 221" will rock segment 222" and cause a tilt of the rotor adapted to resist the acceleration which caused the displacement of slide 230'.

The FIGURE 10 embodiment also includes a means for automatically effecting lateral trim of the craft instead of having a manual trim means such as shown in FIGURE 9. This means for automatically trimming the craft laterally is controlled by vane 211" which corresponds to vanes 211 and 211' of the FIGURE 6 and FIGURE 9 embodiments, respectively, and is normally yieldably held parallel to the longitudinal axis of the craft by spring 213", but is exposed to the airstream and is displaced about the vertical axis of shaft 259a by any lateral movement of the craft relative to the surrounding air.

The vane 211" is integral with shaft 259a and trolley 259, and therefore said trolley is displaced angularly in unison with the vane and thus brought selectively onto contacts 260a and 260b, which contacts are mounted on the segment 260. This serves to selectively operate the reversible electric motor 261 through electrical circuits and related mechanism which correspond exactly to those by which trolley 205 (FIG. 6) controls motor 201, except that as disclosed the follow-up mechanism from rack 263 to the segment 260 is different from that which in FIGURE 6 connects rack 200 to segment 222, and the motor 261 is preferably provided with an adjustable speed governor 262, the speed setting of which is controlled as hereafter described, so that the displacement of the rack will normally take place relatively slowly in response to displacements of vane 211".

In order for the movement that is thus imparted to rack 263 to affect the operation of the craft it is necessary for the operator to rock the handle of a lever 264 clockwise from the position labeled "1" wherein it is shown in FIGURE 10, to either the position labeled "2" or that labeled "3." Lever 264 is provided with either sufficient friction, or with retaining means (not shown) to retain the lever in any position in which the operator may place it. The rocking of this lever 264 from position "1" to position "2" or "3" will cause slot 264b in a segment portion of the lever to cam upwardly the roller 265a on bell crank 265, thereby rocking that bell crank counter-clockwise on its fixed pivot 265b and, through link 266, causing link 258 to rock counter-clockwise on its pivot 249a, thus bringing roller 258a into the center or right end of slot 257b. When link 258 is so positioned the vertical movement of rack 263, which is transmitted to lever 257 through pin 257c by which it is pivoted to lever 257, will be transmitted on through roller 258a and link 258 to pin 249a and thence to segment 222" to rock that segment just as previously described in connection with the movement from slide 230'.

The above mentioned follow-up mechanism by which rack 263 is connected to segment 260 comprises a lever 101, pivotally mounted on the frame of the craft at 101a, and a link 102. The lever 101 includes a fork which embraces pin 263a on rack 263 so that lever 101 is always rocked in unison with the reciprocation of rack 263. It also includes an arcuate slot 101b which embraces roller 102a on link 102. Link 102 is pivotally connected at 102b to arm 260c of segment 260. Roller 102a normally rests in the right end of slot 101b, as illustrated, under which condition the rocking of lever 101 imparts no movement to link 102 but serves to hold it fixed and thereby hold segment 260 fixed in its neutral position. However, if lateral control lever 220 (FIG. 6) is displaced in either direction from the middle neutral position in which it is normally yieldably centralized, the consequent raising or lowering of link 219" (FIG. 10) rocks segment 103 in one direction or the other on its fixed pivot 103a, thereby camming upwardly the roller 104a of bell crank 104, which roller is embraced by slot 103b of segment 103, thus rocking bell crank 104 clockwise on its fixed pivot 104b which through link 105 causes counterclockwise rocking of link 102 on its pivot pin 102b and brings roller 102a into the left part of slot 101b. Under such conditions the rocking of lever 101 by rack 263 will impart vertical movement to link 102 and thereby rock segment 260 to produce a follow-up action similar to that previously described in connection with rack 200 and segment 222 (FIGURE 6), thereby limiting the displacement of rack 263 to an amount proportional to the angular displacement of vane 211" and returning it toward neutral in proportion to the return of vane 211".

For reasons that will appear hereinafter it is desirable that motor 261 shall displace rack 263 very slowly when the follow-up action is disabled but displace it with a rapidity comparable to that characteristic of the other racks when the follow-up action is operative. In order to provide for this, bell crank 104 is connected by link 262b to the speed control lever 262a of the adjustable speed motor governor 262, which controls the speed of motor 261 in the manner of adjustable speed motor governors known in the art. When bell crank 104 stands in the position shown, lever 262a is positioned by it to a position which conditions the governor for slow speed motor operation, but when bell crank 104 is rocked clockwise by the displacement of segment 103, as previously described, it positions lever 262a for normally rapid operation of the motor.

As will be more fully apparent from the operational description hereinafter, the reason that link 102 is made adjustable, so that it may either provide follow-up action or alternatively lock the segment 260 in its neutral position, is because under normal circumstances this mechanism will best fulfill its desired function if it has no follow-up action, but when it is desired to fly the craft laterally relative to the air a follow-up action is required. As previously mentioned the primary purpose of the mechanism controlled by vane 211" is to effect lateral trimming of the rotor. If for any cause the remaining mechanisms do not result in entirely eliminating net lateral movement of the craft relative to the air while lateral control lever 220 is left in neutral, the mechanism controlled by vane 211" will operate to eliminate any net remainder. For instance, as in effect resulting from turns made by the craft or otherwise the gyro 250 may drift slightly off the vertical. While such departures are present in the lateral controlling gyros of airplanes they are not of nearly as much consequence there for a slight lateral departure of an airplane from true vertical does not produce sideslip nearly as rapidly as does the corresponding amount of lateral tilt of a helicopter rotor. However, if due to this cause or any other the craft has any continuing net lateral velocity in either direction relative to the air, the lateral movement of the air relative to the craft will deflect vane 211" and bring motor 261 into operation to displace rack 263 in a direction which, if lever 264, is in either the position labelled "2" or that labelled "3," will act through link 258 to rock segment 222" and control the displacement of rack 200" in a manner adapted to counteract and stop the lateral movement of the craft relative to the air.

For instance assume that gyro 250 has tilted to the left of true vertical thus holding trolley 205" to the left of its neutral position which causes a lowering of rack 200" and link 248 and a raising of link 221" and leftward rocking of segment 222" until the neutral point of the segment stands under trolley 205", in which condition rack 200" remains below neutral and tends to keep the craft moving leftwardly. This leftward movement however, will cause counterclockwise rocking of vane 211" and trolley 259 and a raising of rack 263 and link 258 which will cause further counterclockwise rocking of segment 222" and energizing of contact 206" which results in the raising of rack 200" and stopping of the leftward movement of the craft. Even though the gyro 250 shall continue to remain off vertical to the same extent, or some other source of lateral movement continue to assert itself, rack 263 may remain in a raised position to compensate and maintain the craft without lateral movement. However, if a follow-up mechanism is operative from rack 263 to segment 260, segment 260 will remain angularly displaced as long as rack 263 remains displaced, which will cause vane 211" to control in a manner tending to maintain it at the same angle as segment 260, instead of controlling with respect to its normal neutral position, thereby tending to maintain a lateral component of craft velocity rather than eliminating it. However, if segment to 260 is locked in its central position, vane 211" will always control toward elimination of lateral movement of the craft relative to the air even though rack 263 remains in a displaced position to compensate for a condition that would otherwise tend to produce continuing sideward movement. Since without a follow-up a control of this kind tends to "over-shoot" and "hunt" the motor governor 262 is normally set for quite a slow speed of motor operation thus minimizing any tendency to these faults. The displacement of rack 263, instead of being limited to an amount proportional to vane displacement as it is by a follow-up mechanism will continue to increase until the lateral movement which its displacement is correcting ceases, thereby restoring vane 211" to neutral. Rack 263 will remain in the position to which it has thus been brought until some further lateral movement develops. For instance, if the source which originally caused the lateral movement corrects itself, the displacement which has been imparted to rack 263 will then cause lateral movement to commence in the opposite direction which will cause return of rack 263 until a condition of no lateral movement is again restored. If the craft is to fly a dependable compass course it is important that under cruising conditions vane 211″ be always operative to act toward complete elimination of lateral movement, which requires that there be no follow-up mechanism connected with its operation under these circumstances.

Whenever the operator moves lateral control lever 220 (FIG. 6) from its neutral position to cause the craft to move laterally relative to the air it becomes necessary, however, to have a follow-up connection from rack 263 to segment 260. Otherwise the mechanism controlled by vane 211″ would continuously act to counteract and stop the lateral movement the operator was endeavoring to secure. For instance if the operator raises link 219″ (FIG. 10) to secure leftward craft movement, this results in the raising of link 248 and lowering of link 221″ to cause leftward tilt of the rotor. The resulting leftward movement of the craft would, however, cause counter-clockwise rocking of vane 211″ and trolley 259, thus causing raising of rack 263 and link 258, restoring link 221″ to its neutral position, and cancelling the effect of the operator's setting of link 219″ for leftward movement. Furthermore if the operator moves lever 264 to position "1" to avoid this effect, rack 263 will continue to be displaced further and further as long as the sideward movement continues until it is stopped by limit switches (not shown). Unless the craft is flown approximately equally long to the other side before lever 264 is moved out of position "1", rack 263 will remain thus displaced until the operator returns lever 264 to position "2" or "3," at which time it would cause extensive sideward movement of the craft before rack 263 was restored to its neutral position.

However, if as is actually the case, a follow-up linkage from rack 263 to segment 260 is operative when the operator displaces link 219″ to secure sideward movement of the craft, the raising of rack 263, which takes place as a consequence of the resulting leftward movement of the craft as above described, rocks segment 260 counterclockwise thus altering the control exercised by vane 211″ so that it will control for a corresponding rate of leftward movement. Thus instead of cancelling the effect the operator was seeking to attain in displacing link 219″ vane 211″ acts, in case lever 264 is in position "2" or "3," to regulate and control the movement, maintaining an amount of such movement definitely related to the amount of displacement of link 219″. If lever 264 is in position "1" the extreme displacement of rack 263 previously described will not take place, for the follow-up mechanism limits its displacement to an amount proportional to that of vane 211″ and returns the rack to neutral as the vane returns to its neutral position.

By shaping slot 103b (FIG. 10) so that the follow-up mechanism is brought into operation whenever link 219″ is displaced from neutral but is inoperative so long as the link is at neutral, vane 211″ is operative to eliminate lateral movement of the craft relative to the air (providing lever 264 is at position "2" or "3") so long as the operator indicates by the position of lateral control lever 220 that he desires no sideward movement, but to permit and regulate such movement if he indicates by the position of lever 220 that he desires such movement. Therefore so long as no sideward movement is sought the mechanism controlled by vane 211″ acts as an automatic lateral trimming device which trimming may advantageously be introduced relatively slowly and, as previously noted, must be introduced rather slowly if "overshooting" and "hunting" due to lack of a follow-up action is to be avoided. However, when the operator positions lever 220 to call for sideward movement, and brings into operation the follow-up mechanism, the necessity for such slow operation disappears, in addition to which this mechanism now acts as a device for automatically regulating primary movements of the craft instead of merely as a trimming device, under which circumstances much more rapid movement then becomes desirable due to the more rapid changes in conditions affecting sideward movement, these more rapid changes being due both to the rapidity with which the operator may displace the previously stationary lateral control lever 220 and to the effect of the lateral accelerations which result from the newly introduced controls.

The operation of the mechanism shown in FIGURE 10 will now be briefly described. If the craft is hovering, all parts stand normally substantially as shown in FIGURE 10. If now the craft should tilt toward the left, the resulting rightward angular displacement of gyro 250 relative to the craft about its pivot axis 254b will rock trolley 205″ onto contact 206″ and cause motor 201″ to raise rack 200′₂ to produce a rightward rotor force on the craft. The follow-up linkage from rack 200″ to segment 222″ serves to limit the displacement of rack 200″ to an amount proportional to the lateral tilt of the craft and to return it to neutral simultaneously with return of the craft to vertical. If the leftward tilt is accompanied by a leftward acceleration, slide 230′ will be displaced rightward, resulting in a counter-clockwise rocking of segment 222″, thereby increasing the relative displacement of trolley 205″ with respect to contact 206″ and consequently increasing the corresponding displacement of rack 200″, for more displacement of that rack will now be required to rock contact 206″ out from under trolley 205″.

Similarly, if under these same hovering conditions a lateral acceleration is imparted to the craft without any lateral tilt of the craft, as might be done by a lateral gust, slide 230′ will be displaced rightwardly in case the acceleration is toward the left rocking segment 222″ counter-clockwise, energizing contact 206″ and raising rack 200″ to bring into operation forces resisting the leftward acceleration. As with the FIGURE 9 embodiment any remaining tendency for the craft to move laterally may be counteracted by appropriate rocking of lateral control lever 220 and consequent vertical displacement of link 219″ and such control will be made particularly easy to effect owing to the fact that slide 230′ and its related mechanism will smooth out all sharply irregular movements and the operator will only need to manually exercise control to oppose any lateral movement of a continuing nature. The manual control will therefore constitute essentially what I have previously referred to as laterally trimming the rotor.

By moving lever 264 from position "1" to position "2" vane 211″ and its related mechanism may be employed to automatically effect a lateral trimming of the rotor, but since it will normally operate to eliminate lateral movement of the craft relative to the air, it will not act to hold the craft stationary relative to the ground if there is any side wind blowing, unless the operator displaces lateral control lever 220 to control for a lateral movement of the craft relative to the air equal and opposite to the side wind. However, by thus displacing lever 220 the operator can quite easily bring the craft stationary, relative to the ground, for slide 230′ and its related mechanism acts to compensate for all gusts and sudden irregularities in the side wind, while vane 211″ acts to compensate for any irregularities in the tilt of the rotor and/or craft so as to maintain the average lateral velocity of the craft relative to the air at the value corresponding to the current position of lever 220, so all that the operator has to do is to find the position of lever 220 which eliminates any tendency for the craft to creep in either direction relative to the ground.

For hovering and making a landing if there is much side wind, and particularly if the side wind has considerable variation in its average strength, it will ordinarily prove most advantageous to place lever 264 at position "1," for then lateral control lever 220 does not need to be adjusted to counteract the wind but only to wipe out any lateral velocity which the craft may for any reason acquire. However, if there is substantially no lateral wind, as for instance if the craft is headed directly into a fairly steady wind at time of take-off or landing, lever 264 may advantageously be shifted to position "2," wherein the acceleration-sensitive mechanism including slide 230', which is particularly effective in smoothing out sharp irregularities of short duration, is supplemented by the mechanism controlled by vane 211'', which is particularly effective in smoothing out the slower irregularities which tend to appear over longer periods and in maintaining the craft laterally fixed relative to its surrounding air. Since positions "1" and "2" of lever 264 are each useful in helping the operator to maintain the craft hovering stationary relative to the ground the word "Hover" is placed above the figures designating these two positions.

When the craft starts to move forward at any appreciable speed a different control condition is required, however, for the acceleration-sensitive mechanism including pendulums 223' and 224' and slide 230' tends to exercise lateral control to stop any lateral acceleration of the craft, which directly conflicts with the proper banking of the craft on turns. For instance, if while the craft is proceeding forward it is turned toward the left, that leftward turning of the craft constitutes a leftward acceleration of the craft, and if the acceleration-sensitive mechanism is in operation it will operate to tilt the craft toward the right to resist the leftward turning and acceleration of the craft. The mechanism previously described for banking the craft under control of steering wheel 124 will tend to impart to the craft a definite amount of leftward tilt for a given forward airspeed and leftward setting of wheel 124, but this leftward tilt which would constitute the proper amount of banking for the turn will be cancelled in whole or in part by the operation of the acceleration-sensitive means if lever 264 is in position "1" or "2." To avoid this, lever 264 should be shifted to position "3," which is labelled "Cruise" as soon as the operator prepares to move the craft forward at any appreciable speed. This will result in shifting pin 258a to the right end of slot 257b, thereby disabling the acceleration-sensitive means from controlling the craft and bringing the means controlled by vane 211'' into full operation, thus insuring that the craft will properly follow a compass course just as an airplane does.

One advantage of having the change from position "1" or "2" to position "3" made manually instead of automatically in response to the forward airspeed of the craft as in FIGURE 9, is that it may at times be wished to land the craft heading into a wind of greater velocity than the minimum airspeed at which banking of turns is required and under such circumstances it may be especially desirable to have the advantage of the means sensitive to lateral acceleration and also possible that sensitive to lateral velocity for automatically steadying the craft relative to the ground in landing it. Alternatively the switch-over might be made automatically under a means responsive to forward air speed, as in the FIGURE 9 embodiment, but a manual over-ride provided by which the control means may be held in its "hovering" setting when landing into a head wind of sufficient velocity to normally cause a change-over to "cruising" setting. With the arrangement illustrated in FIGURE 10, the operator may, if he wishes leave lever 264 in its "3" or "Cruise" position most of the time including taking off and landing, and only switch to the "1" or "2" position in case that especially gusty weather or other irregular conditions makes it desirable to bring into operation the acceleration-sensitive means for steadying the craft laterally relative to the ground.

During operation of the craft with lever 264 in any of its three positions gyro 250 controls motor 201'' to resist lateral tilting of the craft and, if the linkages are proportioned as previously outlined, to maintain the rotor normally horizontal in spite of lateral tilting of the craft, as by eccentric loading. Also if the forward airspeed is sufficient, steering wheel 124 will, through the mechanism comprising lever 245 and vane 240' cause the proper banking of the craft on all turns. Also by tilting lateral control lever 220 to one side or the other and correspondingly displacing link 219'' the operator may cause the craft to move laterally relative to the air either combined with or without longitudinal movement of the craft.

It is to be particularly noted that automatic cyclic control of rotor pitch through means such as shown in FIGURE 6, FIGURE 9, or FIGURE 10 would not be feasible in an articulated rotor without some such mechanism as that shown in FIGURE 2, whereby such controls may be applied to the rotor at any desired speed and a proportionate response of the rotor in the desired control direction instantly obtained. In articulated rotors without such mechanism as that of FIGURE 2, it would be impossible to secure satisfactory results from such automatic cyclic controls as those herein disclosed, because of the long delay required to secure true response, and the intervening presence of responses in false directions in those rotors.

3. Longitudinal Control

Two alternative forms of longitudinal control are disclosed herein. One of these is manual, and the other automatic. In either case longitudinal control of the craft is exercised in whole or in part by fore and aft rocking of control column 120 (FIGS. 6 and 7), which as previously mentioned is rockable on the transverse pivot 121. Pivotally connected to an arm extending downwardly from control column 120 is a link 122 which serves as an interponent for transmitting longitudinal control movement from column 120.

In the direct manual control embodiment this link 122 is directly connected to longitudinal control link 122a of FIGURE 2, thus acting through the previously described mechanism to control cyclic pitch changes in the rotor to set up pitching moments on the craft to control its longitudinal attitude. The mechanism illustrated in FIGURE 2 serves to transmit the movements of control column 120 to tilt control rods 36 and 37 in such a manner that regardless of how rapidly the movements are made, the craft response to such movements will be true in direction, substantially instantaneous in appearing, and substantially in constant proportion to the angular displacement of control column 120 on its pivot 121, thus rendering the control of the craft much easier and more satisfactory than the longitudinal controls of the prior art.

As an alternative to this manual control arrangement an automatic longitudinal control may be employed utilizing the mechanism schematically illustrated in FIGURE 11. When the craft moves forward the vane 240', which as previously mentioned is exposed in the airstream and normally held laterally of the craft by spring 241', is selectively rocked counter-clockwise from the position shown by an amount indicative of the forward airspeed of the craft. Vane 240' is integrally attached to the vertical shaft 506a with which the trolley 506 is also integral. The trolley 506 is thus brought into selective co-operation with contacts 107a and 107b mounted on segment 507 to control reversible electric motor 508 and longitudinally displace rack 509 in exactly the manner previously described in connection with the motors and racks disclosed in connection with automatic lateral control (motor 201 and rack 200, FIG. 6 for instance). Rack 509 is directly connected to link 122a (FIG. 2) to displace that link just as it is displaced by link 122 of FIGURE 7 in the manual control arrangement previously described, while in this automatic control arrangement link 122 of FIGURE 7 is directly connected to link 114 of FIGURE 11, so that link 114 is moved upward by forward rocking of column 120 and downward by backward rocking thereof.

Rack 509 is connected through lever 510 and link 511 to segment 507 to rock that segment with a follow-up action exactly like that previously described in connection with lateral control. Lever 510 is also connected to link 114 through a link 112 and lever 113, so that the raising of link 114 causes counterclockwise rocking of segment 507 and energizing of contact 107b to cause lowering of rack 509 and the exercising of a forward control on the craft, while lowering of link 114 energizes contact 107a for a backward controlling effect. Lever 113 transmits movement to link 112 by virtue of the fact that pin 113a at its right end normally rests on the fixed frame member 116, being held against it by a yieldable spring (not shown).

If link 114 (FIG. 11) is held out of its normal neutral position by holding column 120 (FIG. 7) angularly displaced from its normal position the tilting of the rotor and tilting of the craft will be automatically controlled in such a selective manner that the craft will finally settle down to maintaining that particular longitudinal speed which will cause vane 240' to be rocked through exactly the same angle through which the displacement of link 114 has rocked segment 507. For instance, if with the craft hovering the control column is rocked and held forward, raising link 114 and rocking segment 507 through a corresponding counterclockwise angle, contact 107b, will be energized causing motor 508 to lower rack 509 and tilt the rotor forward relative to the craft. As soon as rack 509 has been lowered the same amount that link 114 raised link 112 segment 107 is restored to neutral and further forwarding tilting of the rotor is stopped. This forward tilting of the rotor is, however, causing the craft to tilt forward and gain forward speed, which in turn causes counterclockwise rocking of vane 240' and the energizing of contact 107a to decrease the tilt of the rotor relative to the craft. Before the craft attains the forward speed corresponding to the displacement of link 114 it may have tilted further forward than the tilt required to maintain that particular forward speed, but if so this will merely reduce the time required to accelerate, and permit the craft to temporarily exceed the speed for which link 114 is set, thereby rocking vane 240' further counterclockwise than segment 507, energizing contact 107a and rocking the rotor backward relative to the craft to bring the craft back to the proper forward tilt for the set speed. The final result, thus rather promptly reached, is for the craft to tend to maintain the proper forward tilt for the set speed and for the rotor to tend to average its normal neutral angle relative to the craft, which means that rack 509 will on the average maintain its normal neutral position. If the craft for any reason tends to exceed or fall short of this set speed trolley 506 will be displaced to energize either contact 107a or 107b and temporarily tilt the rotor backward or forward relative to the craft so as to alter the tilt of the craft in a direction adapted to bring it back to the selected speed.

Because of the inconvenience of holding column 120 (FIG. 7) in a displaced position, and the difficulty of judging the speed corresponding to any given position of the column I prefer to provide auxiliary means settable to the desired speed. FIGURE 11 illustrates this means as comprising the lever 264, previously described as utilized to convert the automatic lateral control mechanism from conditions particularly useful in hovering to the conditions required for cruising. As previously described this conversion is effected by moving said lever from position "1" or "2" to position "3." Lever 264 is, however, so constructed that it may be moved a considerable distance beyond position "3," and in so moving does not alter the condition of the mechanism which it was previously described as controlling. When lever 264 reaches position "3" a pointer 264d integral with the lever comes into co-operation with a fixed scale 517 graduated in accordance with craft speed. In this position and all positions beyond it the pointer 264d points to the craft speed on scale 117 to which lever 264 adjusts the automatic longitudinal control mechanism if control column 120 is in its neutral position and longitudinal trim knob 373 (shown in FIGS. 14 and 18 and hereinafter described) is also in its normal neutral position. This adjustment is effected by link 115, pivotally attached to arm 264c integral with lever 264. Link 115 is provided with a slot 115a embracing pin 113a, and the slot is of such length that moving lever 264 from position "1" to position "2" does not rock lever 113, but moving it on to position "3" lifts pin 113a away from the fixed member 116 on which it normally rests and rocks segment 107 counterclockwise through the same angle that vane 240 is rocked in response to the craft moving forward at the minimum speed indicated by scale 517, and further clockwise rocking of lever 264 raises pin 113a correspondingly higher.

By setting lever 264 so as to bring pointer 264d to the desired forward speed, the longitudinal control of the craft may be automatically exercised in the manner above described, and the operator may leave control column 120 in its neutral position, in which position it may be yieldably held by a centralizer such as that shown in FIGURES 14 and 18, and hereinafter described. At any time that the operator may for any reason wish to override the automatic longitudinal control he only needs to rock column 120 in the direction of the desired change, without stopping to reposition lever 264, and through link 114 (FIGURE 11) this movement readjusts the position of segment 507 to instantly exercise the desired change in control. Alternatively the operator may utilize a resetting of the longitudinal trim knob 373 (FIGS. 14 and 18) instead of positioning the lever 264 to condition the craft for automatically maintaining a desired forward speed with the control column in neutral, for as hereinafter described a resetting of this knob produces the same controlling effect as a rocking of column 120.

As with the automatic lateral control this automatic longitudinal control can only be satisfactorily exercised in controlling an articulated rotor by interposing between the rotor and the mechanism schematically shown in FIGURE 11 some such mechanism as that illustrated in FIGURE 2 for eliminating the "gyroscopic effects" and the delays in normal response to control movements which are otherwise characteristic of such rotors.

4. Pitch Control

As previously described, vertical displacement of pitch control rod 27 (FIG. 1) produces a substantially identical change of pitch simultaneously on all blades, thereby altering the total thrust exerted by the rotor at any given speed of rotation. It is the customary practice in helicopters to link the pitch control member of the rotor (such as rod 27) to a manually positioned lever so that the operator may directly alter the pitch of the rotor blades by manual displacement of the lever.

As schematically illustrated in FIGURES 7 and 6, I provide a manually adjustable pitch control lever 270, which for convenience is pivoted coaxially with the steering wheel 124 a short distance in back of the steering wheel. As schematically indicated in FIGURE 6, the rocking of lever 270 causes reciprocation of link 271 to which it is pivotally connected. Link 271 is guided near its other end by link 268, pivotally mounted on fixed pin 269 and the downward movement of link 268 and hence of link 271 is limited by the fixed lug 267. It would be possible to mechanically connect link 271 to the pitch control member 27 of FIGURE 1 so that the rocking of arm 270 would physically effect the desired changes of rotor pitch, and the general objectives of my invention would be obtainable with such an arrangement, but because of the fact that considerable load is ordinarily involved in effecting such changes of pitch, and that such load is frequently so irregular as to make it difficult to smoothly effect pitch changes, and in view of the fact that I prefer to keep lever 270 reasonably short and to move it through a reasonably short stroke, I prefer to provide a servo-motor under control of lever 270 for actually supplying the power to effect the pitch changes.

Because of the necessity for very promptly decreasing blade pitch into the auto-rotational range in case of engine failure and the possibility that the servo-motor might simultaneously fail, the use of a servo-motor in this connection would not be feasible except in conjunction with emergency means (to be hereinafter described) for manually changing pitch, and more particularly with an arrangement, such as illustrated in FIGURE 1 and previously described, whereby the pitch control arm 20, associated with each blade, is located far enough outboard of the flapping hinge 13 so that the amount of rocking up of the blades about their drag hinges that takes place as an incident to a reasonably small decrease in rotor speed will decrease the pitch of the blades into the autorotational range. In combination with both the emergency means for manually changing pitch and the rotor construction mentioned, it becomes perfectly safe and feasible to utilize a servo-motor for pitch control, for if with the blades operating at pitch angles in excess of the autorotational range of pitch angles both the main engine of the craft and the pitch control servo-motor should both simultaneously fail the rotor arrangement would insure the rotor against stalling, but would keep it rotating at a speed sufficiently below its normal power operated speed so that the flapping angle of the blades will be increased sufficiently to raise the trailing end of each arm 20 (FIG. 1) sufficiently to reduce the pitch of such blade to an autorotational angle. At this lowered rotational speed the craft will gradually attain a greater speed of descent than desirable, but by utilizing the manual pitch control means to lower the leading end of arm 20 the autorotational speed may be increased to one that will correspondingly lower the trailing end of arm 20 thereby gradually lowering the speed of descent, or if the manual adjustment is executed soon enough preventing the craft from attaining such higher rate of descent. Without the emergency manual pitch adjusting means the craft would be in danger of attaining too high a rate of descent for complete safety, while without the particular rotor arrangement described there would be serious danger of the rotor becoming completely stalled under the particular circumstances outlined, before the pilot could get the mechanism switched over to emergency manual control and get the pitch setting lowered, but with both the manual arrangement and the rotor construction referred to, it becomes not only perfectly safe to employ a servo-motor for effecting pitch change, but the entire arrangement becomes safer than the present conventional helicopter construction.

Most of the means previously proposed for insuring against stalling of the rotor in case of engine failure have been objectionable because they prevented the operator from thereafter exercising control over pitch and particularly from increasing pitch above the autorotational range just prior to contact with the ground in order to render a large part of the knitetic energy of the rotor available in checking the rate of descent at the moment of contact. My arrangement, however, provides this safety without interfering with the operator thus controlling pitch. For instance if the engine and servo-motor have failed at the time of a high rotor pitch setting, the operator may bring into operation the manual control arrangement after engine failure, as above suggested, and lower the pitch control setting so as to reduce the coning angle effective at a given autorotational pitch thereby increasing autorotational speed. In any case, if the pitch control lever is below its maximum position, the operator may at any time raise the pitch of all blades above autorotational pitch, but for a given displacement of the pitch control lever the increase in pitch above the autorotational range will only remain effective until the rotor slows down sufficiently to decrease the coning angle sufficiently to raise the blade axis in line with arm 20 sufficiently to restore autorotational pitch. Thus the use of the emergency manual pitch control with the blade hinging and pitch arm arrangement shown makes it possible for the operator to secure an exceptionally high autorotational speed and to utilize most of the kinetic energy thus stored in the rotor for sharply checking descent without at any time being in danger of completely stalling the rotor.

A servo-motor arrangement for controlling rotor blade pitch is schematically illustrtaed in FIGURE 6. In this arrangement link 271, which is reciprocated by rocking of the pitch control lever 270, instead of being connected by direct linkage to the pitch control member of the rotor (rod 27, FIG. 1) as in present known helicopters, controls the operation of servo-motor 272, which through appropriate gearing drives output shaft 273, which shaft is connected through further reduction gearing to rotor pitch control rod 27 (FIG. 1), so that rotation of shaft 273 in the one or the other direction serves to raise or lower said rod. Servo-motor 272 is a reversible electric motor, like motors 141 and 201 previously described, and its circuit is essentiallyy the same as theirs, the negative side of power source 274 being connected to one terminal of the motor, and the positive side of said source being connected through switch 275 and lead 276 selectively to one or the other of the two remaining motor terminals to cause the motor to operate in the one or the other direction. This selectivity of connection is brought about by carrying lead 276 to the contact member 277 integrally mounted on link 271, which contact member is designed to selectively cooperate with two contact members 278 and 279 carried by the carriage 280, which carriage is mounted as a nut on threaded shaft 281, which shaft is geared to and driven by shaft 273 in proportion to its rotation. Thus carriage 280 is fed up or down on shaft 281 in proportion ot the rotation of shaft 273 and its vertical position is at all times indicative of the current pitch adjustment of the rotor.

If the operator raises the right end of lever 270 to increase pitch, this lowers contact member 277 substantially in proportion, bringing it into contact with contact member 278 and thereby starting motor 272 operating to increase pitch and to lower carriage 280. As soon as carriage 280 has been lowered a distance equal to that by which lever 270 lowered member 277, member 278 moves out of contact with member 277 thus stopping the motor. The rocking of lever 270 in the opposite direction brings contact members 277 and 279 into contact and operates the motor in the opposite direction, the amount of motor movement always being proportional to the travel of contact member 277 and follow-up travel of carriage 280. The motor speed may be great enough to very quickly follow each readjustment of pitch control lever 270, and there may either be a yield such as schematically indicated by the flexible tip of member 277 to permit the movement of lever 270 to proceed in advance of the follow-up movement, or if the motor speed is great enough it will prove almost equally satisfactory to omit the yield in which case lever 270 will be physiblocked from moving faster than the motor can change pitch.

5. *Engine Control*

I prefer to provide for the control of the speed of the engine and rotor through an adjustable speed governor 285 (FIG. 6).

While it would be equally possible to apply my invention either to a governor arranged to selectively adjust load to meet manually controlled engine power (as by selectively adjusting total pitch of the rotor, for instance), or to a governor arranged to selectively adjust engine power to meet manually controlled load, I have specifically shown only the latter, wherein the governor selectively readjusts the engine throttle setting so as to maintain the engine at substantially the speed for which the governor is set, regardless of such readjustments of rotor blade pitch and consequent changes in load as the operator may effect. Such adjustable speed governors are well known and therefore I shall only schematically indicate the governor and its input, output, and control members. The governor is driven by shaft 286 which leads directly from the engine and is always rotated in proportion to the engine crankshaft. In a manner corresponding to that well known in governors it operates to readjust the engine throttle setting by appropriate angular repositioning of shaft 185 on which segment 184 is integrally mounted. As previously described link 183, pivotally attached to segment 184 transmits this movement to the engine throttle and thereby effects the control of engine speed.

The speed at which the governor thus controls the engine may be adjusted within a desired range of speeds by the rocking of arm 287 integrally mounted on shaft 288, clockwise rocking of these parts setting the governor to control for higher engine speeds. Aircraft engines are ordinarily designed to give the most satisfactory and economical performance if they are operated at somewhat lower speeds under light load than under heavy load, and most such engines are capable of an especially high output (usually referred to as "take-off" rating) when operated at a still higher speed, which high output is intended only to be employed for short periods of time (for instance not in excess of five minutes at a time) when airplane take-off or other special or emergency conditions require an extra measure of power for a short period. Also the helicopter rotor may be designed to operate more efficiently at lower speeds under light load.

Since rotor blade pitch is the principal factor affecting load, the load always being comparatively heavy when blade pitch is high and comparatively light when it is low, I prefer to provide means for automatically readjusting the controlling speed for which the governor is set in accordance with the change of rotor blade pitch. The mechanism for accomplishing this, as schematically shown in FIGURE 6, comprises a lever 290, one end of which is pivotally attached to pitch control link 271 and the other end of which is pivotally attached by means of pin 291 to link 292, which in turn is pivotally attached by pin 293 to foot pedal 294. Pedal 294 normally stands in the position indicated, so that pin 291 normally acts as a substantially fixed pivot for lever 290. Lever 290 is pivotally attached near the middle of its length to link 295, which in turn is pivotally attached to box cam lever 296 which is pivotally mounted on fixed pivot 297. Lever 296 is provided with a cam slot 298 which embraces the pin 299 integrally mounted in lever 287, which lever as previously mentioned controls the speed setting of the governor 285. As pitch control lever 270 is rocked up to increase rotor blade pitch it will lower link 271, thus carrying link 295 down proportionally, rocking lever 296 clockwise causing cam slot 298 to rock lever 287 clockwise and thereby set the governor for a higher speed. Slot 298 may be so shaped that for each particular pitch setting it will bring the governor speed setting to the ideal speed for a given engine and rotor even though the relationship between blade pitch and desired speed be an irregular one. All of the rocking which may be thus imparted to lever 296 causes pin 299 to traverse only the right portion of the length of slot 298, the maximum pitch setting of lever 270 bringing pin 299 to a position in the slot slightly to the right of point 303, in which position lever 287 will have been rocked far enough clockwise to bring the engine to maximum normal operating speed. The parts reach this position only when the rotor blades have been set to maximum pitch and fixed ear 267 blocks link 268 and prevents link 271 from imparting any further clockwise rocking to lever 296.

However, in connection with take-off or to meet some other special or emergency condition the operator may wish to bring the engine up to the still higher speed of operation which is required for developing the full take-off power of the engine, and to maintain such engine speed for an appropriately short period of time. Since the need for such extra power and speed may appear suddenly the means for securing it should be quickly and readily operable at any time, and since it would be very bad for the engine to operate under these peak conditions for any long period of time the means should be such that even an inexperienced or casual operator could not accidentally leave them unnoticed in their emergency setting. In order to meet these requirements I provide the foot pedal 294 as the means by which the operator may at will bring the engine up to its maximum take-off speed of operation or to any other chosen speed in excess of its currently governed speed. This pedal is pivotally mounted on shaft 300 which is integrally supported above floor 301, and the pedal is normally held in the raised position illustrated by compression spring 302. If the operator presses down on pedal 294 he thereby lowers link 292 and through lever 290 and link 295 rocks lever 296 further clockwise than the position normally associated with the current position of lever 271 thus increasing the engine speed above that normally associated with the current rotor blade pitch setting. The depressing of pedal 294 clear to the floor rocks lever 296 clockwise through a slightly greater angle than the total range of movement imparted to it by link 271, thus serving to bring stud 299 to at least the position 303 in slot 298, beyond which point the slot is concentric with pivot stud 297. When stud 299 reaches point 303 and stands anywhere in the concentric portion of the slot, arm 287 is rocked to its furthest clockwise position which sets the governor for the take-off speed of the engine regardless of the current pitch setting of the rotor blades. Since it would be dangerous to operate the engine or the rotor in excess of the speeds to which this adjustment brings them, the governor will automatically open the engine throttle by the maximum amount safe under current conditions whenever pedal 294 is depressed to the floor. If the governor over-ride were connected directly to the engine throttle, instead of to the governor speed control as disclosed, then a maximum opening of throttle with a relatively low setting of blade pitch might result in the operator speeding the engine and rotor up to dangerously high speeds in an emergency. As it is the engine will be held at take-off speed only so long as the operator holds the pedal 294 depressed, so that if he is informed of the maximum time for which it is safe to keep the engine at such a speed he can readily avoid exceeding the time limit as he might be in danger of doing if something other than a spring returned member were utilized for securing this extra performance from the engine.

As previously indicated, it would be equally possible to apply my invention to an arrangement in which the operator manually controls the engine throttle and the governor automatically readjusts blade pitch to maintain the desired engine and rotor speed. With either arrangement the manual control lever may be connected to the governor speed setting mechanism to readjust the speed for which the governor is set in accordance with the changing load values for which the manual lever is set, and the over-ride mechanism (pedal 294) may be arranged to reset the governor speed control for speeds higher than this up to and including the "take-off" speed of the engine, just as shown in FIGURE 6 and above described.

6. *Automatic Adjustment of Vertical Fin*

It has been mentioned that the rudder 75 (FIG. 3) and the vertical fin 76 are automatically adjusted to provide the proper amount of counter-torque effect at all

37 higher forward speeds. It has also been described how the rotation of shaft 163 (FIGS. 6 and 8) serves to rock shaft 165 and thereby angularly position rudder 75 in the manner required for establishing the desired balance of torques, but the mechanism for repositioning the vertical fin 76 has not as yet been described.

This mechanism is schematically illustrated in FIGURES 12 and 13. It serves to automatically align the fin with the average rudder position. In FIGURE 12 the fin 76 and rudder 75 are shown substantially as though sectioned along lines 12—12 of FIGURE 3. As indicated in FIGURE 12 they are each pivotally mounted on a common substantially vertical pivot shaft 310. The means for displacing the fin 76 about this shaft is schematically indicated as comprising a reversible electric motor 311 which is geared to the pulley 312 to selectively displace the flexible cord 313 in the one or the other direction. Cord 313 is attached to pin 314, integrally mounted in fin 76 near the leading edge thereof, so that its displacement serves to angularly position fin 76 about its pivot shaft 310. Motor 311 is operated from power source 315 the negative terminal of which is connected through lead 316 with one terminal of motor 311 while the positive terminal of the power source is connected by lead 317 to a switch mechanism 318 which selectively connects it to either lead 319 or lead 320, which are so connected to the motor as to operate it in the one or the other direction as the one or the other of leads 319 and 320 is energized.

The switch mechanism 318, which is more particularly shown in FIGURE 13, is selectively operated by angular displacement of the rudder 75 relative to the fin 76. Integrally mounted in fin 76 by means of a stack of insulating blocks 322 are two pairs of flexible switch leaves 323 and 324 carrying contact points so that each pair forms an electrical switch, closure of switch 323 serving to connect lead 317 to lead 319, and closure of switch 324 serving to connect lead 317 to lead 320. To selectively effect such closure I provide the switch closing lever 325 made of insulating material, pivotally mounted on pin 326 fixed in vane 76, and carrying two rollers 327 and 328 designed to co-operate with the cam 329 which is integral with rudder 75 and is displaced about shaft 310 in unison with the rudder. If the rudder 75 is in alignment with fin 76, that is if they both are set at the same angle with the longitudinal axis of the craft, cam 329 and lever 325 stand symmetrically located with respect to the fin axis 330, as shown in FIGURE 13. However, if the rudder be then displaced clockwise the clockwise rotation of cam 329 will cause clockwise rocking of lever 325 pressing it against the lower leaf of switch 323, closing that switch and thereby starting motor 311 operating so as to cause clockwise displacement of fin 76. Similarly counter-clockwise displacement of the rudder relative to the fin causes counter-clockwise rocking of lever 325, closure of switch 324 and operation of the motor 311 to produce counter-clockwise displacement of the fin 76. In either case whenever the fin comes into alignment with the rudder, due to the displacement of either the fin or the rudder, operation of the motor and further displacement of the fin ceases until the rudder is again displaced.

Because of the size and shape of the rudder it is much easier to effect a quick displacement of the rudder than of the fin, and the rudder is therefore employed as the means which is immediately responsive to every momentary change in counter-torque requirements whenever craft speed is great enough so that the tail surfaces are utilized for controlling counter-torque. However, as craft speed changes the general average effective angularity of the tail surfaces required for counteracting torque changes vary markedly. For instance as a typical example, at approximately one half of cruising speed the tail surfaces may come into control of counter-torque at any angularity of some 15°, while at cruising speed this angularity may be reduced to about 4° and at top speed to about 2°. It is desirable that the tail fin be readjusted to supply the principal changes in counter-torque setting required on account of changes in craft speed and/or engine power, thus leaving the majority of the rudder movement available for correcting sudden or short time variations in torque at each particular craft speed and engine power condition.

If the motor 141 (FIG. 6) which positions the rudder is relatively rapid in its response and readjustment of rudder position, while the motor 311 (FIG. 12) readjusts vane 76 much more slowly, but still more rapid than changes in craft speed and/or engine power are likely to alter average torque requirements, the mechanism schematically shown in FIGURES 12 and 13 act substantially in accordance with the condition indicated as desirable in the preceding paragraph. For instance assume that the craft is accelerating with both the vane and rudder set in their 15° counter-torque positions. As the craft passes the speed at which these surfaces will supply the total counter-torque required the rudder will be automatically eased back in the counterclockwise direction, which will close switch 324 and start displacing vane 76 counter-clockwise until it catches up with the rudder. The rudder may be moved back and forth to balance minor variations in torque requirements and when it is so moved the vane stands practically stationary, but if the craft continues to accelerate the average position of the rudder will have to be displaced further counter-clockwise to keep the counter-torque down, and as long as the rudder continues to occupy an average position further counter-clockwise than the vane, the vane continues to be displaced in the counter-clockwise direction. When the craft ceases accelerating and maintains a fairly constant speed the average torque requirements remain fairly constant, and though the rudder may be displaced each way from its average position to smooth out the torque balance each such displacement will under these conditions be of very short duration which combined with the fact that the displacements will be more or less equal in the two directions will result in the vane remaining substantially stationary, for neither switch 323 nor switch 324 will be closed long enough to effect much displacement of the vane. When the craft decelerates the condition will be essentially the same as above described in connection with acceleration except that the various displacements will be in the opposite direction. Similarly in case of torque changes due to changes in engine power the rudder will first be displaced to meet the new requirement, and if a different average amount of counter-torque continues to be required the vane automatically comes around to such a position that, in combination with the rudder aligned with it, it will supply the new average counter-torque requirement.

E. PREFERRED EMBODIMENT OF CONTROLS (FIGS. 14 to 18 incl.)

1. *Pivotal Mounting and Centralizing of Control Column*

While the control members which the operator moves to exercise the necessary control over the operation of the craft are schematically illustrated in FIGURES 6 and 7, a preferred physical embodiment of these members is shown in FIGURES 14 to 18, inclusive, together with the means by which the proper movement is transmitted from each of these members to exercise the desired control.

Control column 120' and the longitudinal control link 122' positioned by it, steering wheel 124', lateral control lever 220' and pitch control lever 270' of this embodiment correspond to the parts designated 120, 122, 124, 220 and 270, respectively, in the schematic showing of FIGURES 6 and 7.

As indicated in FIGURE 14 and shown in greater detail in FIGURE 18, integrally attached to the base of column 120' are two tubes 340 and 341, extending laterally in the two opposite directions at right angles to column 120'. These two tubes are rockably supported in the frame plates 342 and 343 of the craft. Arm 344 which is normally held in fixed relation to column 120', but adjustable relative thereto as will be hereinafter described, is pivotally attached to link 122', as particularly indicated in FIGURE 15 and also shown in FIGURES 14 and 18, so that any rocking of the column forward or back on its pivotal support in plates 342 and 343 reciprocates link 122', thereby exercising longitudinal control of the craft as hereinbefore described. Column 120' is normally yieldably held in its centralized position, through the pressure of roller 346 (FIGS. 14 and 18) into an appropriately shaped notch in centralizer arm 347, which arm is normally fixed relative to column 120', but also adjustable relative thereto as will be hereinafter described. Roller 346 is mounted on one end of a lever 348 which lever is pivotally mounted near its opposite end on the fixed pin 349, and the end of the lever carrying the roller is spring urged upwardly by spring 350.

2. Adjustment of Centralized Position of Column

Since a small or short-armed individual will ordinarily wish to have the control column with its various control members closer to him than will a long-armed individual means are provided so that the position in which the column is normally centralized may be adjusted to suit the operator's convenience, this means being further arranged so that such readjustment will not alter the position of link 122' (FIG. 15) or of the longitudinal tilt control mechanism of the craft which is positioned by said link. This adjusting means comprises a knob 353 rotatably mounted on the right side of column 120' beneath the steering wheel, as shown in FIGURE 14. As shown in FIGURE 18 a bevel gear 354 located inside the column is integrally attached to knob 353 and meshes with a bevel pinion 355 integrally attached to the upper end of shaft 356 to the lower end of which is attached bevel pinion 357 meshing with bevel segment 358, which is pivotally mounted coaxially with tubes 340 and 341. Therefore, rotation of knob 353 will angularly displace segment 358 relative to column 120'. Integrally mounted in segment 358 is pin 359 which extends through a mating hole in segment 360, which latter segment is pivotally mounted on pin 361 which extends integrally out from the right end of shaft 362 which is rotatably mounted coaxially in and supported by tube 340. Hence segment 360 is constrained by pin 359 to always rock in unison with segment 358, which as we have seen is positioned relative to column 120' by knob 353. Segment 360 carries on its two opposite faces two sets of bevel gear teeth meshing respectively with planetary bevel gears 364 and 365 which are pivotally mounted, respectively, on pins 366 and 367, which pins form integral parts of arms 344 and 347, respectively, as indicated in section in FIGURE 18 and partially shown in side view in FIGURE 15. Bevel gear 365, in addition to meshing with segment 360 as above described also meshes with bevel segment teeth 369, which teeth form an integral part of column 120' concentrically with the pivotal mounting thereof. Bevel gear 364 similarly meshes with bevel segment 370, which for the present purpose may be considered as being integral with column 120', being normally fixed in relation thereto but displaceable relative thereto as hereinafter described. Arms 344 and 347 are pivotally mounted coaxially with the pivotal mounting of column 120' and are normally held in fixed relation thereto by bevel gears 364 and 365, which are normally held fixed since they each mesh at two diametrically opposite points with bevel gears which are normally held fixed relative to column 120'. However, if segment 360 is rocked on its pivotal mounting by rotation of knob 353 both of the bevel gears 364 and 365 are fed around as bevel planetary gears, displacing their pivotal centers in the same direction that segment 360 is rocked, and through half the angle relative to column 120' through which the segment rocks relative thereto. Since, as previously mentioned, the pivotal centers of gears 364 and 365 form integral parts of arms 344 and 347, respectively, the rotation of knob 353 will displace these two arms simultaneously through the same angle relative to column 120' thereby altering by any desired amount the centralized position of the column but not altering the position which arm 344 assumes when the column is centralized. Hence when the centralized position of the column is altered by the turning of knob 353 displacement of the column in either direction from the new centralized position will have the same effect in controlling the craft as was previously exercised by similar displacements of the column from its former centralized position.

3. Adjustment of Longitudinal Trim of Craft

It may, however, be desired to alter the neutral position of arm 344 in order to better maintain the desired longitudinal attitude of the craft under given operating conditions. For instance, a fore or aft shift in the center of gravity of the craft due to change in loading may render it desirable to alter the position in which the longitudinal tilt controls of the craft are normally held.

Also as previously described, when the craft is equipped with automatic longitudinal control mechanism the adjustment of the longitudinal control means may be utilized to condition the craft for automatically maintaining the proper amount of forward tilt to propel the craft at a preselected speed. Means are therefore provided for angularly displacing arm 344 relative to arm 347. This means comprises adjusting knob 373 located on column 120' opposite knob 353 (FIGS. 14 and 18). Integral with knob 373 is the bevel gear 374 which meshes with the bevel pinion 375 integral with shaft 376, which shaft carries integrally attached to its lower end the bevel pinion 377 which meshes with an upper segment portion of the previously mentioned segment 370. Therefore, rotation of knob 373 rocks segment 370 on its pivotal center thereby rocking arm 344 through half as great an angle relative to column 120', but not displacing arm 347.

4. Steering, Lateral, and Pitch Controls

Steering wheel 124', lateral control lever 220', and pitch control lever 270' (FIGS. 14 and 15) are each rotatably or rockably mounted on column 120', and are arranged to rotatably displace respective trains of mechanism comprising bevel gears, shafts, and sleeves, and including in each case a horizontal sleeve extending outwardly from the column concentrically through tube 340 or 341 to transmit the desired control movement to parts located in other parts of the craft by rotation of said horizontal sleeve. Special means are provided to arrange it so that the horizontal sleeves referred to will not be displaced relative to the craft by rocking of column 120' on its transverse pivots.

As indicated in FIGURE 16, steering wheel 124' is integrally attached to bevel gear 380 which meshes with bevel pinion 381 integral with the sleeve 382 which is rotatably supported longitudinally of the column 120'. Integrally mounted on the lower end of sleeve 382 is the bevel pinion 383 (FIG. 18) which meshes with bevel gear 384, which gear is integral with shaft 385 to which bevel gear 386 is also integrally attached. Pivotally mounted on shaft 385 and extending downwardly at right angles thereto is the planetary carrier shaft 387 upon which is rotatably mounted the planetary bevel pinion 388 which meshes on one side with the previously mentioned bevel gear 386 and on the other side with bevel gear 389 integral with sleeve 390, which is also rotatably mounted on shaft 385. Shaft 387 is normally held stationary by bevel gear 392 rotatably mounted on said shaft and meshing on one side with bevel segment 393 which is permanently fixed to the frame of the craft, and meshing on the other side with bevel segment teeth 394 integrally mounted on column 120'. Therefore if, with column 120' stationary, steering wheel 124' is angularly displaced in one direction or the other, it will cause a proportional angular displacement of sleeve 382 and its attached gears and hence of shaft 385 and its attached gears. With shaft 387 stationary bevel gear 386 will rotate pinion 388 on shaft 387 and hence cause bevel gear 389 and sleeve 390 to be rotated equally and oppositely to shaft 385, and therefore in proportion to the displacement of the steering wheel 124' relative to the column 120'. As previously described column 120' may be rocked forward or back by rocking sleeves 340 and 341 in their mating bearings in frame plates 342 and 343. This will however, cause bevel gear 392 to be fed as a planetary pinion, causing it to displace its pivot shaft 387 relative to the frame of the craft in the same direction and through half the angle that column 120' is displaced relative to said frame. With the steering wheel held stationary, bevel gears 384 and 386 will rock in unison with column 120' and through the same angle, causing the left hand pitch line of planetary bevel pinion 388 to be moved correspondingly while its pivot center, as above described, will be rocked through half this distance by the same rocking of column 120' acting through bevel gear 392. Therefore the right hand pitch line of planetary bevel pinion 388 will remain stationary, and since it meshes with bevel gear 389 it will hold that gear and sleeve 390 stationary relative to the craft.

Perhaps the operation of the foregoing mechanism for preventing sleeve 390 from being rotated by the rocking of column 120' may be more simply and clearly visualized by noting that as long as gear 386 is held stationary relative to column 120' the bevel gear teeth 394 on the column form, in effect, an extension of the teeth of gear 386. They will therefore cause bevel pinion 388 to rotate on its shaft 387 as though it formed an integral extension of bevel gear 392, thereby causing bevel gear 389 to act as though its lower teeth were extensions of the teeth of the bevel segment 393. Since bevel segment 393 is permanently fixed to the craft bevel gear 389 will, under these circumstances, be held fixed relative to the craft regardless of the rocking of column 120'. However, if steering wheel 124' is rotated relative to the column, bevel gear 389 and sleeve 390 will be displaced relative to the craft by an amount solely dependent on the angular displacement of the steering wheel and independent of the rocking of the column. Sleeve 390 may be connected to the steering gyroscope so that the angular displacement of the sleeve will cause precessing of the gyroscope in a manner well known in the art and schematically indicated in FIGURE 6.

In order to hold steering wheel 124' normally centralized in its neutral position I provide a notched disc 396 integral with bevel gear 380 (FIG. 16) into the notch of which is spring pressed roller 397 mounted on the end of lever 398, the opposite end of which is pivotally attached to column 120'.

The movement of lateral control lever 220' (FIGS. 14, 15 and 16) is fed out through tube 340 in a manner essentially the same as that in which the movement of steering wheel 124' is fed out through tube 341. Integrally attached to lateral control lever 220' (FIG. 16) is bevel gear 400 meshing with bevel pinion 401 integral with shaft 402 to the lower end of which is integrally attached bevel pinion 403 (FIG. 18) meshing with bevel gear 404 which is integrally attached to shaft 362, as is also bevel gear 406 which meshes with planetary pinion 407 and drives bevel gear 408 and sleeve 409 integral therewith, just as sleeve 390 is driven by displacement of the steering wheel. Shaft 410 on which pinion 407 is rotatably mounted is angularly displaced by the rocking of column 120' in just the same manner that shaft 387 is displaced, this being effected by bevel gear 411 which meshes on one side with the fixed segment 412 and on the other with the segment 413 integral with column 120'. Hence sleeve 409 is displaced relative to the craft through angles proportional to the angular displacements of lateral control lever 220' independently of any rocking of column 120'. Sleeve 409 is connected to the mechanisms which automatically exercise lateral control of the craft in a manner corresponding to that in which link 219 is schematically shown as connected in FIGURE 6, or to that in which link 219' is schematically shown as connected in FIGURE 9, or link 219" in FIGURE 10. Lever 220' is thereby enabled to control the automatic lateral control mechanism directly and independently of the rocking of column 120'.

Lateral control lever 220' is normally held in its centralized position by roller 415 (FIG. 16) mounted on lever 416 which is spring pressed downwardly about its pivotal support on stud 417 by means of spring 418, the roller 415 engaging a notch in centralizer disc 419 integral with lever 220'.

In a similar manner angular displacements of pitch control lever 270' (FIGS. 14, 15, 16 and 17) cause identical angular displacements of bevel gear 420 (FIG. 16) which acting through mating bevel pinion 421, sleeve 422, bevel pinion 423 (FIG. 18) bevel gear 424 and sleeve 425 cause proportional angular displacements of bevel gear 426, which through planetary pinion 427 cause equal and opposite displacements of bevel gear 428 and sleeve 429 integral therewith. Planetary bevel pinion 427 is mounted on the same shaft 410 as the previously described pinion 407, and therefore the respositioning of this shaft by the rocking of column 120', as previously described, serve to remove the effect of the rocking of this column from the displacement of sleeve 429 just as it removes it from the displacement of sleeve 409. Sleeve 429 is connected to the control for the pitch changing servo-motor and to the governor speed regulator in a manner corresponding to that schematically indicated for link 271 in FIGURE 6.

Instead of providing means for centralizing pitch control lever 270' to a fixed position, as was the case with the steering wheel and lateral control lever, means are provided for holding pitch control lever 270' in any angular position to which it may be brought. This means is arranged to hold the lever rather firmly in the desired position and yet is such that the operator may readily displace the lever as desired without any resistance from the holding means. To this end lever 270', instead of being integral with gear 420 is pivotally mounted by means of pins 433 on the sleeve 434 which is integral with gear 420 (see FIGS. 16 and 17). As shown in FIGURE 17 these pins are located substantially at right angles to the lever 270' and the lever is urged rearwardly about the pins by a spring 435 seated in a socket in sleeve 434 and pressing against lever 270'. On the opposite side of pins 433 from the main lever 270' there is provided integral with said lever a nose 436. This nose includes a V-edge which is normally spring pressed by spring 435 into mating grooves in the serrated outer diameter of the hardened bushing 437 integral with the main outer casing of column 120'. The faces of the V-edge and serrations are so angled that if sufficient angular pressure is exerted on lever 270' it may be made to rasp over them, but the preferable method of operation is for the operator to pull lever 270' slightly toward him when he wishes to alter pitch, thereby removing nose 436 from contact with bushing 437. By releasing his forward pressure on the lever as it reaches the desired pitch setting, spring 435 is permitted to bring the V-edge of nose 436 into one of the serrations on the face of bushing 437 thereby effectually holding lever 270' against displacement until the operator again wishes to change its setting.

F. EMERGENCY MANUAL CONTROL
(FIGS. 19 and 20)

Since servo-motors are extensively used in the control of my craft, as hereinabove outlined, and since there is always some danger that such motors will fail, it is highly desirable to provide for direct manual control of each function that would be disabled in case of such a motor failure. In order to keep the entire control of the craft as convenient as possible under such circumstances I prefer to have the emergency manual positioning of the parts which are normally motor positioned effected through the same control member which the operator normally utilizes for controlling the automatic positioning. For instance the counter-torque means are normally repositioned as required to secure the desired steering effect by motor 141 (FIG. 6) under control of gyroscope 131 as precessed by the operator through steering wheel 124 of FIGURE 6, or steering wheel 124' in the FIGURE 14 embodiment. However, if due to failure of any of this motor or gyroscope mechanism the automatic steering fails to perform its function, I provide means for disconnecting the counter-torque controls from motor 141 and conencting them directly to steering wheel 124 (or 124') so that the operator may still use the steering wheel to effect the steering of the craft, although of course the steering will be more difficult and less satisfactory in this direct manual form. Similarly in case of need the pitch control rod 27 (FIG. 1) may be disconnected from motor 272 directly connected to pitch control lever 270 of FIGURE 6 (or 270' in case of the FIGURE 14 embodiment), or the lateral tilt control rod 37 (FIG. 1) may be disconnected from motor 201 of FIGURE 6 (or 201' of FIGURE 9, or 201" of FIGURE 10) and directly connected to lateral control lever 220 of FIGURE 6 (220' of FIG. 14).

In arranging for such change-over from automatic to manual control it is however, important to arrange the change-over control member so that there will be no danger that an individual might accidentally disable the automatic control by hitting against it while getting in or out of the craft or moving around the control cabin, for one of the purposes of my invention is to render the craft easy for relatively inexperienced personnel to operate, and such personnel might be likely to fail to notice such a displaced change-over control member before taking off. It is equally important, however, for the change-over member to be located where the operator can instantly operate it in case of failure of the automatic mechanism while in flight. With these ends in view I provide a novel form of change-over member in the form of a knob located under the operator's seat, and normally standing an inch or so above the floor but subject to being pulled up by the operator to change over from automatic to manual control. Three such knobs are shown in FIGURE 19 standing in their fully depressed position. Pulling up the rightmost knob 440 (that is the knob furthest to the operator's right) converts the rightmost control lever 270' of FIGURE 14 from automatic to manual control. The center knob 441 similarly co-operates with the central control member 220', while the left knob 442 co-operates with the steering wheel 124' which is adapted for left-hand operation. These knobs are largely protected from accidental contact by being located under the operator's seat 443, and normally standing in their fully depressed positions it is substantially impossible for them to be accidentally raised to their manual control positions.

FIGURE 20 illustrates the mechanism for effecting change-over from automatic to manual control of steering, and it is typical of the other change-over mechanisms. There is shown in FIGURE 20 the sleeve 390 which is also shown in FIGURE 18 and was described as being directly connected to steering wheel 124' so as to be angularly displaced in proportion to the angular displacement of the steering wheel. As shown in FIGURE 20 sleeve 390 drives shaft 444 which integrally carries box cam 445 rotation of which serves to rock arm 446 and shaft 447, on which shaft arm 446 is integrally mounted, in proportion to the radial rise or fall of the portion of box cam slot 449 which is thus brought into co-operation with roller 450 on arm 446. It will be noted that roller 450 is illustrated as being in the middle of a long gradually rising portion of the cam slot which constitutes the normal working portion thereof and that the slot has a rather steep return slope between points 451 and 452. Roller 450 is normally prevented from entering this steep portion of the slot by pin 455 (integrally mounted in drum 456 which is keyed to shaft 444) engaging one side or the other of the fixed lug 457, the steering wheel thus being normally limited in its range of displacement each way from its centralized neutral position. Shaft 447 is connected to the precessing mechanism for the gyroscope so that the rocking of shaft 447 one way or the other from its mean position causes the gyroscope to precess in one or the other direction.

FIGURE 20 also shows essentially the same power train for readjusting the counter-torque mechanism as that schematically shown in FIGURE 6, namely the motor 141, the switch 159 controlling the current to the motor, the worm 161 driven by the motor and the worm gear 162 on shaft 163 driven by the worm. Shaft 163 operates the counter-torque mechanisms through means schematically indicated in FIGURE 8, but that means is preferably driven from shaft 163 of FIGURE 20 through further reduction gearing. Whereas in the schematic showing it was assumed that worm gear 162 was integral with shaft 163, and it is normally so connected as to be in effect integral, I prefer to arrange it so that, as indicated in FIGURE 20, worm gear 162 is rotatably free on shaft 163 but is integrally attached to the splined clutch member 460 which is normally meshed with the mating clutch member 461 which latter member is keyed to shaft 163. Worm gear 162 and clutch member 460 are prevented from moving longitudinally of shaft 163 by appropriate guide means (not shown), while clutch member 461 is longitudinally slidable on shaft 163 but normally held in mesh with clutch member 460 by pins 462 of shifting fork 469, which pins fit between two flanges on clutch member 461.

In order that the manual drive from sleeve 390 may be transmitted directly to shaft 163 in case of emergency change-over, there is provided freely rotatable on shaft 444 the gear 463 retained against endwise sliding by guide bracket 464. Gear 463 meshes with gear 465 integral with shaft 163. A clutch member 466 is integrally mounted on gear 463 and designed to cooperate with clutch member 467 which is integrally attached to drum 456 and is normally maintained out of contact with clutch member 466 by guide pins 468 of shifting fork 469, which pins fit in a circumferential groove in drum 456. Clutch member 467 is keyed to shaft 444 so as to always rotate with it, but since it is not normally in contact with clutch member 466 it normally transmits no drive.

When the operator wishes to change from automatic to manual steering he pulls up on knob 442, which raises plunger 470 and rocks bell crank 471 clockwise on its fixed pivot 472. Bell crank 471 is yieldably maintained in the one or the other extreme of its range of movement by cooperation with nose 474 on lever 475 which lever is urged upwardly about its fixed pivot 476 by spring 477. The clockwise rocking of bell crank 471 is transmitted through link 479 to shifting fork 469, rocking the shifting fork clockwise on its fixed vertical pivot pin 480. This brings clutch member 467 into engagement with clutch member 466, thereby in effect keying gear 463 to shaft 444 and thereby directly connecting sleeve 390 to shaft 163. It also carries clutch member 461 out of contact with clutch member 460 thereby breaking the connection from motor 141 to shaft 163. Also through insulated tip 482 integrally mounted on shifting fork 469 it opens switch 159 and stops operation of motor 141 in case the difficulty is of such a nature that the motor has continued to operate. Also the rightward shifting of drum 456 carries pin 455 out of line with lug 457 thereby freeing the steering wheel for unlimited operation. The unlimited operation will cause no damage to the gyroscope mechanism for it cannot cause shaft 447 to rock through more than its normal angle of rock.

When the difficulty responsible for the emergency change-over to manual control has been corrected the system can be restored to automatic operation by merely depressing knob 442, thereby restoring the parts moved by it to the positions illustrated in FIGURE 20. Should such a change back be attempted with the steering wheel outside its normal range of movement pin 455 will run directly into lug 457 and prevent the depression of knob 442, but if the knob is depressed with the steering wheel within its normal range of movement the steering wheel will be brought back into its proper control of the automatic steering mechanism regardless of how many times the steering wheel may have been turned in either direction, providing the gear ratios are such that box cam 445 rotates in 1 to 1 relationship with the steering wheel, which constitutes my preferred arrangement. This is true because box cam 445 and shaft 447 are never disconnected from the steering wheel and return to the same control positions for the same position of the steering wheel in each revolution.

In this same manner motor 201 (FIG. 6) may be mechanically disconnected and stopped by opening switch 204, and lateral control lever 220 connected directly to link 200a of FIGURE 2. In case the craft is equipped with the automatic lateral control arrangement schematically shown in FIGURE 10 the same movement which opens switch 204" may also open switch 261a (FIG. 10) thereby disabling motor 261 as well as motor 201". An arrangement similar to that schematically shown in FIGURE 20 may also be employed to mechanically disconnect servo-motor 272 (FIG. 6) and stop it by opening switch 275 and to connect pitch control lever 270 directly to pitch control rod 27 (FIG. 1). Alternatively a wheel may be employed in place of lever 270 and/or lever 220, so that the extra stroke desirable in order to permit a favorable ratio of movement in emergency hand operation may the more readily be established. An arrangement similar to that of FIGURE 20 may also be employed for disabling and disconnecting motor 311 (FIG. 12) from vane 76, and connecting the vane to an emergency hand wheel (not shown). Such an arrangement is not as essential on this control however, as on the other automatic controls because of the degree of control available by connecting steering wheel 124 to rudder 75. In case of a craft equipped with the automatic longitudinal control arrangement schematically shown in FIGURE 11 an arrangement similar to that of FIGURE 20 may be employed for disabling and disconnecting the automatic control mechanism and connecting column 120 (FIG. 7) to link 122a) as it is connected in case of the craft without automatic longitudinal control.

G. OPERATION OF CONTROLS

The primary control members which are referred to in the schematic showing of FIGURES 6 and 7 by simple numbers, and in the embodiment of FIGURES 14 to 18 by these same numbers followed by a prime (') mark, will be referred to in the following by the simple numbers, but such references are intended to be generic to the corresponding members of the two showings.

With the controls as above described, connected to function as previously schematically outlined, the control of the helicopter which has heretofore required great skill and extensive training, becomes simple and easy. As previously outlined the increasing of forward flight speed on a conventional helicopter of the prior art requires expert and exact co-ordination of five controls. In a craft controlled in accordance with my invention at least three of these five and optionally a fourth, are automatically positioned as follows:

(1) The engine throttle is automatically readjusted by governor 285 (FIG. 6).

(2) The counter-torque controls of the craft are automatically readjusted under control of gyroscope 131 (FIG. 6) so that changes in engine torque and/or forward flight speed will not require the operator to make any readjustment of the steering controls.

(3) The lateral controls of the craft are automatically readjusted by mechanism comprising vane 211 (FIG. 6), vane 211' (FIG. 9) or vane 211" (FIG. 10) so as to substantially prevent side-slip of the craft, or are automatically readjusted by other mechanism shown in FIGURE 9 or FIGURE 10 to substantially prevent lateral tilt and/or lateral acceleration of the craft.

(4) In a craft equipped with automatic longitudinal control mechanism, such as schematically shown in FIGURE 11, a fourth one of the five controls is automatically positioned.

Therefore to increase forward speed in a craft equipped with my inventon but without automatic longitudinal control, the operator only need be concerned with two of the five controls which he previously had to co-ordinate, namely he must rock lever 270 upwardly enough to provide the necessary increase in pitch and must temporarily rock column 120 forward sufficiently to increase the forward tilt of the craft to the proper tilt for the increased forward speed. The proper co-ordination of two controls is much easier and more feasible for the ordinary operator to contemplate than the proper co-ordination of five controls, in addition to which the two controls which I leave for the operator to co-ordinate at such that highly exact co-ordination is not essential. For instance, if the operator were first to increase the pitch without paying attention to rocking the column, the only departure from the desired maneuver would be that thte craft would gradually commence to climb at an easy angle until the operator rocked the column to bring it back to the original inclination of the flight path, whereas executing the column rocking ahead of the pitch change would only result in a slight temporary downward angling of the flight path.

For most maneuvers a craft equipped with this same arrangement of my invention requires only a single simple control movement on the part of the operator. For instance to impart an upward or a downward acceleration to the craft it is only necessary to respectively raise or lower pitch control lever 270. All the necessary concomitant changes in engine throttle setting, counter-torque setting and lateral control are automatically taken care of. To impart to the craft an acceleration in any desired horizontal direction it is only necessary to move lever 220 in the general direction desired, so that the longitudinal component of its movement will impart appropriate rocking to column 120, and the lateral component locking of lever 220 on its pivotal mounting on column 120. All the necessary changes in counter-torque and throttle settings follow automatically.

My invention particularly eases the demand on the operator under cruising conditons. In the conventional helicopter the operator must continually manipulate the counter-torque and the lateral controls of the craft, but under cruising conditions his manipulation of them is aimed solely at eliminating yawing and side-slipping displacement of the craft. All of this is automatically taken care of in my invention and steering wheel 124 and lateral control lever 220 are each provided with a centralizer so that during cruising the operator may forget about them and entirely leave go of them except for occasionally moving the steering wheel to correct for slight gradual departures from the desired course. Similarly the control column 120 is normally centralized, and the trim knob 373 (FIG. 14) may be so adjusted that with the control column centralized the craft will tend to substantially hold unchanged any desired angularity of flight path. Hence by properly adjusting knob 373 the operator may forget about longitudinal control of the craft during cruising, except for very occasional movement to correct for gradual departure from desired flight path. Also means are provided for holding pitch control lever 270 at the setting which serves to automatically maintain the desired cruising speed of the craft. Hence during cruising the operator may let go of all controls for considerable periods of time, and when he does handle the controls he may, with a single hand on the steering wheel, apply any necessary correction to the vertical flight path by occasional fore and aft movements, and by occasional rotary movements of the steering wheel impart any necessary correction to the course flown, and these are the only movements normally required of the operator during cruising.

In a craft equipped with the automatic longitudinal control mechanism of FIGURE 11 the control of the craft is even simpler, for the craft will then be automatically maintained at the proper longitudinal attitude for maintaining flight at the preselected air speed. The setting of the craft for any cruising condition will then require the setting of lever 264 (FIG. 11) to indicate the desired speed on scale 117 and the setting of pitch control lever 270 to the pitch which will enable the craft to maintain altitude or climb or descend as desired at that flight speed. Under such conditions cruising may become completely automatic for periods limited only by the accuracy of gyro 250 (FIG. 10).

The entire control arrangement of a craft embodying any form of my invention herein disclosed is such that, not only in cruising but in all operation of the craft, there is at all times conveniently available to the operator a manually moveable control member for effecting each alteration that may be desired in the performance of the craft. Also automatic and semi-automatic control mechanisms are provided which respond either directly or indirectly to the movement of each control member in such a manner and combination that the movement of a single control member, or at most of two control members, by the operator will bring about any complete single change that may be desired in the condition of operation of the craft, whereas most such changes have, in the past, required the carefully co-ordinated movement of four or five separate control members by the operator.

This may be illustrated by outlining the control movements necessary for a typical flight.

It will be assumed that, except as otherwise noted, the craft being described is not equipped with automatic longitudinal control. After the engine is warmed up and the rotor is being driven by the engine, all that is necessary in order to take off is to raise pitch control lever 270 gradually until the craft is climbing at the desired rate. The pitch setting servo-motor responds directly to this movement of control lever 270, while the engine throttle, the counter-torque means, and the lateral control means all respond indirectly to it, coming into operation in response to conditions set up either directly or indirectly as a result of the change of rotor pitch to maintain proper engine and rotor speed, proper craft heading and substantial freedom from lateral movement relative to the ground or to the air as the operator may elect, thus eliminating the need for co-ordinated manipulation by the operator of the throttle control, counter-torque, and lateral control lever, as in present known craft.

If as the craft leaves the ground he notices that it begins to drift in any undesired direction he merely moves lever 220 in the generally opposite direction, thereby bringing into play proper longitudinal and lateral cyclic rotor pitch controls to resist the unwanted movement and indirectly automatically readjusting the counter-torque means to correspond, and the throttle to maintain desired engine speed in spite of the resulting changes in the resisting torque of the rotor and in the power required by the counter-torque means. As the craft gains sufficient altitude the operator may use the steering wheel to head the craft in the desired direction as determined either by observation or compass. The readjustments of counter-torque means required to turn the craft and to stop its turning, the balancing readjustments of the lateral controls, and the proper adjustments of engine throttle all take place automatically in direct or indirect response to this single control movement. Then in order to start the craft moving off in the required direction he merely rocks the column 120 temporarily forward and readjusts it until the craft attains the desired attitude of flight and forward speed, or if the craft is equipped with automatic longitudinal control he merely moves lever 264 to indicate the desired forward speed. This change from hovering to forward flight will ordinarily involve a reduction in rotor torque, a consequent easing back on throttle setting to avoid excessive rotor and engine speed, a consequent change in counter-torque setting and a balancing change in the lateral thrust of the rotor, all of which occur automatically in indirect response to the rocking of column 120 in my craft. To settle down to a more economical cruising speed in the craft without longitudinal control, pitch control lever 270 may be somewhat lowered, and in case substantially the full horizontal speed attainable with the previous pitch setting had already been attained, column 120 may be rocked temporarily rearward. In the craft with automatic longitudinal control the only further adjustment that may be required is a resetting of pitch control lever 270 to bring the craft onto the desired vertical angularity of flight path. In either case these adjustments require changes in throttle setting, counter-torque setting, and lateral control, but all these are again supplied automatically in indirect response to the control movements mentioned. In approaching a destination and landing the control operations are substantially the reverse of these described above in connection with taking off and getting the craft under way, and in each instance my craft requires the movement of only one, or at the most two, control members to effect the proper adjustment of the four or five control means which must in each instance be readjusted and the separate manual readjustment of which renders the operation of present-day helicopters so difficult. Furthermore, since these results may be accomplished with only an ordinary engine governor, a commercial tolerance gyroscope, and some wind vanes as the primary controlling means, they are accomplished in a manner suitable for use in a relatively low-cost, quantity production craft.

What I claim is:

1. In a rotary wing aircraft having a rotor comprising a hub and a plurality of adjustable blades attached thereto, cyclic pitch control means for cyclically controlling the pitch of the respective blades, collective pitch setting means for simultaneously imparting similar pitch changes to all blades to effect change in altitude, an engine for driving the rotor, and counter-torque means for exerting a lateral force on the craft to counteract the torque set up by said engine in driving said rotor; the combination of a governor for automatically varying the power output of said engine in response to changes in load on said engine including that due to changes in the adjustment of said pitch setting means, a heading change sensing device selectively displaced relative to the craft by changes in the heading of the craft, means controlled thereby and also responsive to the changes in engine power effected by the governor for altering the lateral force set up by said counter-torque means to maintain heading and further means responsive to changes in the lateral movement of the craft including those caused by said altering of the lateral force set up by the counter-torque means and connected to the cyclic pitch control means for automatically adjusting the cyclic pitch control means to alter the lateral attitude of the craft.

2. The invention set forth in claim 1 in combination with a manually movable member for controlling said further means, and means for normally holding said member yieldably centralized.

3. In rotating wing aircraft having a sustaining rotor, means for setting up and altering the amount of torque between the craft and the rotor tending to change craft heading including a prime mover and a power control member selectively positionable to control the power output of the prime mover, and counter-torque means for exerting an opposing torque on the craft resisting changes in craft heading; the combination of steering mechanism including an element and biasing means whereby said element is biased to a normal position and selectively positionable through a variable length link wherein changes in length are opposed by the biasing means to control said counter-torque means, and means connecting said power control member to said link of said steering mechanism to cause displacement of said element.

4. In a rotary wing aircraft having a sustaining rotor, means for setting up and altering the amount of a torque between the craft and the rotor including a prime mover driving said rotor and a power control member selectively positionable to control the power output of the prime mover, and counter-torque means for exerting an opposing or counter torque on the craft; the combination of automatic steering mechanism including a heading error angle sensing device pick-off having a stabilized part and a part movable relative to the craft and a counter-torque element connected to the counter-torque means automatically positionable to selectively increase or decrease said counter-torque in response to departure of the craft in one direction or the other from a given heading, and follow-up adjusting means in the mechanism and jointly responsive to said power control member and said counter-torque element for temporarily altering the position of the pick-off movable part relative to the craft.

5. In a rotary wing aircraft having a sustaining rotor, means for setting up and altering the amount of a torque between the craft and the rotor including a prime mover driving said rotor and a power control member selectively positionable to control the power output of the prime mover, and counter-torque means for exerting an opposing or counter torque on the craft; the combination of automatic steering mechanism comprising an element selectively positionable to control said counter-torque, motor means positioning said element, said motor means comprising two members, and means for displacing the two members relative to each other to control the positioning of said element by said motor means, means connecting said power control member to said displacing means so that movement of said power control member in the direction which increases torque causes relative displacement of said two members in one sense, and follow-up means connecting said element to said displacing means so that movement of said element in the direction which increases counter-torque causes relative displacement of said two members in the opposite sense.

6. In a rotary wing aircraft having a sustaining rotor to effect flight of said aircraft, a prime mover in the craft for driving the rotor, a power control member for said prime mover selectively positionable to control the torque between the craft and the rotor set up by said prime mover while the aircraft flight is effected, and counter-torque means for exerting an opposing torque on the craft; the combination of automatic steering mechanism comprising a counter-torque element connected to the counter-torque means selectively positionable to control said counter-torque means, and follow-up adjusting mechanism connected to the steering mechanism and jointly responsive to said power control member and to said element, said follow-up adjusting mechanism including a part normally acting as having a fixed dimension in its operative direction but having means coacting therewith to reduce said dimension over a period of time for altering the position of the follow-up mechanism from which operation of said counter-torque means is effected by said steering mechanism.

7. The invention set forth in claim 6 in which the follow-up adjusting mechanism includes a first member moved by the power control member substantially in proportion to changes in the power output of the prime mover, and motion transmitting means including a second member moved by the counter-torque element substantially in proportion to changes in the torque exerted by the counter-torque means divided by the component of the average percentage of power of the prime mover delivered to the counter-torque means at each current position of the counter-torque element.

8. In a rotary wing aircraft having a sustaining rotor, a prime mover in the craft for driving the rotor, a power control member for said prime mover selectively positionable to control the torque between the craft and the rotor set up by said prime mover tending to change heading, and counter-torque means for exerting an opposing torque on the craft; the combination of automatic steering mechanism comprising a counter-torque element selectively positionable to control said counter-torque means, means for automatically positioning said element, means for positioning the power control member, a differential having three interrelated links, mechanism connecting said positioning means for the power control member to a first one of said links to displace said link substantially in proportion to the torque exerted by the prime mover, mechanism connecting said counter-torque element to a second of said links to displace said second link substantially in proportion to the torque exerted by the counter-torque means, the differential including mechanism connecting said first and second links to the third of said links to displace said third link in proportion to the difference between the movements of said first two links, and mechanism connecting said third link to said means for positioning the counter-torque element to selectively control the operation thereof.

9. In a rotary wing aircraft having a sustaining rotor, and a prime mover in the craft for driving the rotor, counter-torque means, and a driving connection from the prime mover to said means; the combination of a clutch in said driving connection for selectively disconnecting said means from the prime mover, a member selectively displaced by changes in the airspeed of the craft, and means controlled by said member for selectively disengaging said clutch.

10. In a rotary wing aircraft, means for maintaining travel of the craft relative to the air in a fixed direction relative to the craft longitudinal axis, comprising means for automatically controlling rolling movements of the craft, mechanism including means selectively responsive to sideward velocity of the craft relative to the air for controlling said automatic means to maintain a sideward velocity, tail surfaces on the craft exposed to impact of the surrounding air during such velocity to control yawing movements of the craft during forward flight, and heading change responsive means for automatically controlling said tail surfaces to resist yawing movements of the craft to maintain a desired anggle between said axis and direction of sideward velocity.

11. In rotating wing aircraft having a sustaining rotor, flight position control apparatus for said craft comprising: selective means for setting up and altering the amount of the torque between the craft and the rotor including a prime mover; a governor operating said selective means for maintaining the speed of rotation of said prime mover and said rotor; a control member for adjusting the setting of the governor to vary the speed maintained; counter torque means for exerting an opposing torque on the aircraft; steering mechanism including an element variable in dimension in the direction of its operation for long time operation and selectively positionable to alter the setting of the counter torque means; and means connecting the governor setting control member to said steering mechanism to cause displacement of said element and variation in the dimension thereof and thus change in said counter torque which opposes the increased rotor torque due to increased rotor speed.

12. In a rotary wing aircraft having a rotor comprising a hub and a plurality of adjustable pitch blades attached thereto, collective pitch setting means simultaneously imparting similar pitch changes to all blades, additional means for setting up and altering the amount of a torque between the aircraft and the sustaining rotor including a prime mover, a governor operating said additional means for maintaining the speed of said prime mover, and a governor speed setting control member operatively connected to said governor and positionable to alter the speed maintained by the governor, and counter torque means for exerting an opposing torque on the craft, in combination: steering mechanism including an element selectively positionable and operatively connected to control the setting of said counter torque means, and further means including said governor connecting said governor speed setting control member both to said steering mechanism to cause displacement of said element and to said collective pitch setting means for simultaneously changing the governor setting and setting of said counter-torque means along with change in collective pitch, said further means including means compensating, for non-constant relationship of engine power and torque between the aircraft and rotor, said counter torque setting element.

13. In flight control apparatus for a rotary wing aircraft having a rotor comprising a hub and a plurality of blades attached thereto, collective pitch setting means for simultaneously imparting similar pitch changes to all blades, means for setting up and altering the amount of the torque between the craft and the rotor including a prime mover, a governor for maintaining the speed of said prime mover, and a governor setting control member selectively positionable to control the speed maintained by the governor, and counter torque means for exerting an opposing torque on the craft, in combination: steering mechanism including an element selectively positionable to control said counter torque means and thus vary the opposing torque on the craft; means operatively connecting said collective pitch setting means with said governor setting control member, means including the governor connecting the collective pitch setting means with said steering mechanism to cause simultaneous operation of collective pitch setting and governor setting with displacement of said element, and manually operable means for separately adjusting said governor setting control member.

14. In a rotary wing aircraft having a sustaining rotor to effect flight of the aircraft, a prime mover in the craft for driving the rotor, and counter torque means for exerting an opposing torque on the craft to that set up between the sustaining rotor and the craft while effecting flight of the aircraft in combination: a counter torque element selectively positionable and connected to vary the adjustment of the counter torque means, automatic steering motor means responsive to change in heading of the craft and connected to the element for altering the position of said counter torque adjusting element and counter torque means, a manual control member, means connecting said manual control member to said automatic steering motor means to alter the relative positions of said automatic steering motor means and said craft to effect change in heading, and selective means connected to the counter torque means operable at the will of the operator for establishing a direct mechanical connection from said manual control member to said counter torque adjusting element whereby the movement of said manual control member may effect direct mechanical positioning of said counter torque adjusting element.

15. In a rotary wing aircraft having a flight sustaining rotor, a prime mover in the craft for driving the rotor, and counter torque means for exerting an opposing torque on the craft to that set up between the sustaining rotor and craft, apparatus comprising: a counter torque adjusting element connected to the counter torque means and positionable to control said counter torque means; a manually operable steering drive including a manually operable steering wheel and a direct mechanical connection including a first hand operated clutch between said wheel and said counter torque adjusting element; a manually operable controller; a directional gyroscope; an electric steering drive controlled from said gyroscope including a motor adjacent the counter torque adjusting element; a second hand operated clutch adapted to connect and disconnect the motor and the adjusting element; means for precessing said gyroscope from said steering wheel; and means operating said clutches by said controller whereby operation of said first hand clutch to render said hand steering drive effective and ineffective render said second hand clutch ineffective and effective to disconnect or connect the motor and element respectively.

16. In flight control apparatus for a rotary wing aircraft having a sustaining rotor, a prime mover in the craft for driving the rotor, and counter torque means for exerting a torque opposing that due to the sustaining rotor, in combination: a counter torque adjusting element connected to the counter torque means and selectively positionable to control said counter torque means; a steering mechanism for positioning said element including an electric motor, a first hand operated clutch, and means for adjusting said element from said motor through said first hand operated clutch; a craft heading responsive gyroscope, an arm positioned by said gyroscope relative to contacts carried by said craft and connected to the motor for controlling said motor; manually operable means including a shaft operatively connected for precessing said gyroscope, a second hand operated clutch on said shaft having a part rotatable but slideable on said shaft and a second part rotatable on said shaft, means for positioning said counter torque adjusting element from said clutch second part, and means for simultaneously declutching said first hand operated clutch and clutching said second hand operated clutch to provide direct mechanical connection between said shaft and said counter torque adjusting element.

17. In a rotary wing aircraft having a sustaining rotor, a prime mover in the craft for driving the rotor, and counter torque means for setting up a torque opposing that between the rotor and said craft, flight control apparatus comprising in combination: a counter torque adjusting element connected to the counter torque means to control said counter torque means; an electrical controller having two parts relatively adjustable; an electric motor controlled from said controller; follow-up means interconnecting said electric motor to said controller; a normally closed clutch connecting said motor to said counter torque adjusting element; a heading responsive device connected to one part of said controller; means for changing the relative positions of said heading responsive device and craft and thus of the two parts of the controller to initiate operation of said motor; a hand steering wheel operating said means; and further means selectively rendering said hand steering drive effective to directly position said element, rendering said electric drive ineffective, and opening the circuit of said electric motor.

18. In control apparatus for a rotary wing aircraft having a sustaining rotor, a prime mover in the craft for driving the rotor, and counter torque means for exerting a torque opposing that from the sustaining rotor, in combination: an adjusting device connected to the counter torque means to control the counter torque; an electric motor; means interconnecting said device and motor for positioning said device from said motor; a motor controller; a heading responsive means operating said motor controller on change in heading; manually operable means controlling the heading responsive means for governing the position of said heading responsive means; a follow-up drive from said motor to said controller; a normally closed clutch between said motor and said adjusting device; a normally opened clutch between said manually operable means and said adjusting device; and selective means adapted to connect and disconnect the motor and adjusting device and to render ineffective and effective the manually operable means on said adjusting device.

19. In a rotary wing aircraft having a flight sustaining rotor, a prime mover in the craft for driving the rotor, and counter torque means for exerting a torque opposing that between the sustaining rotor and craft, in combination: a counter torque adjusting element connected to the counter torque means to control said counter torque, heading responsive means automatically positioning said counter torque adjusting element, manually operable means connected to be operative through said heading responsive means positioning said element, and selective means connected to the element, manually operable means, and to the responsive means rendering said heading responsive means ineffective to position said adjusting element and providing a direct mechanical connection between said manually operable means and said adjusting element.

20. In a rotary wing aircraft having a sustaining rotor, a prime mover in the craft for driving the rotor, and counter torque means for exerting an opposing or counter torque to that torque between the sustaining rotor and craft, in combination: a counter torque element connected to the counter torque means to control the magnitude of said counter torque; motor means connected to the element for positioning said counter torque element; manually operable means; heading responsive means; means for combining the operation of the manually operable means and the heading responsive means and controlling said motor means; means for rendering said motor means ineffective to position said element; and means operatively connecting said manually operable means and element to directly move said element in response to movement of said manually operable means when said motor is rendered ineffective.

21. Flight control apparatus for a rotary wing aircraft at substantially zero forward air speed, said aircraft having a sustaining rotor comprising a hub and a plurality of adjustable pitch blades attached thereto, cyclic pitch control means for cyclically controlling the pitch of the respective blades, collective pitch setting means for simultaneously imparting similar pitch change to all blades to alter the lift of the sustaining rotor, an engine for driving the rotor, and counter torque means for exerting a lateral force on the craft to counteract the torque set up by said engine, said apparatus comprising: means for controlling vertical movement of the craft in substantially a vertical plane including, means for operating said pitch setting means to apply a collective pitch change to the plurality of blades, means for simultaneously adjusting the setting of the counter torque means with the change in collective pitch to oppose change in heading due to change in engine torque, lateral control means including sensing means biased to a central position responsive to changes in the relative lateral movement of the craft and surrounding air including those caused by the altering of the lateral force set up by the counter torque means for automatically adjusting the cyclic pitch control means to alter the lateral attitude of the craft.

22. In flight control means for a rotary wing aircraft at substantially zero forward airspeed, said aircraft having an engine driven sustaining rotor comprising a hub and a plurality of blades attached thereto, a cyclic pitch control means for cyclically controlling the pitch of the respective blades, collective pitch setting means for simultaneously imparting similar pitch changes to all blades, propeller counter torque means for exerting a lateral force on the craft to counteract the torque set up by said engine, apparatus for controlling flight of the craft in a substantially vertical plane, said apparatus comprising: a heading responsive device displaced relative to the craft by changes in craft heading; means controlled by said heading responsive device for altering the lateral force set up by said propeller counter torque means; means for simultaneously effecting change in collective pitch setting of the propeller counter torque means to prevent change in heading due to the change in torque of said sustaining rotor; and means biased to a central position responsive to lateral relative velocity of said aircraft in its supporting medium due to change in counter torque for automatically adjusting the cyclic pitch control means to alter the lateral attitude of the craft.

23. In flight control apparatus for a rotary wing aircraft having an engine driven sustaining rotor comprising a hub and a plurality of adjustable pitch blades attached thereto, in combination: collective pitch setting means for simultaneously imparting similar pitch changes to all blades; counter torque means for exerting a lateral force on the craft to counteract the torque set up by said engine driving said rotor; a governor for automatically varying the power output of said engine in response to changes in load including changes in the adjustment of said collective pitch setting means; first means for changing the setting of said governor and simultaneously operating said collective pitch changing means; second means adjusting the speed of the governor and rendering the first means ineffective thereon; and means for adjusting said counter torque means for modifying the lateral force on the craft derived therefrom to counteract the torque set up by said change in collective pitch of said sustaining rotor.

24. In flight control apparatus for a rotary wing aircraft at substantially zero forward airspeed, said aircraft having a flight sustaining rotor comprising a hub and a plurality of adjustable pitch blades attached thereto, means for cyclically controlling the pitch of the respective blades to vary direction of tilt of the rotor lift vector; counter torque means for setting up a torque opposite to that exerted on the aircraft by the sustaining rotor; in combination: means for operating said counter torque means for maintaining the heading of the craft, means including a vane biased to a central position responsive to lateral movement rate of the craft relative to the surrounding air including that caused by change in counter torque, control means operated by said lateral movement rate responsive device for operating said cyclic pitch control means to effect a tilt of the vector opposite to the direction of lateral movement of the craft relative to the air caused by such change in counter torque.

25. Control apparatus for a rotary wing aircraft while said craft is hovering said craft having a sustaining rotor comprising a hub and a plurality of adjustable pitch blades attached thereto, said apparatus comprising: means for cyclically controlling the pitch of the respective blades; means for driving the rotor; means for steering the craft, including means for setting up and regulating a counter torque opposite to that exerted on the craft by the driving of the rotor; heading responsive means adjusting the setting of the counter torque means; an accelerometer means comprising a normal pendulum and an inverted pendulum yieldably connected therewith responsive to lateral tilt and lateral accelerations of said craft due to the lateral force on said craft from said counter torque means; and means for operating said cyclic pitch controlling means from said accelerometer means to alter the lateral attitude of the craft to oppose said lateral tilt and accelerations.

26. In flight control apparatus for a rotary wing aircraft having a sustaining rotor comprising a hub and a plurality of adjustable pitch blades attached thereto to provide a lift force for sustaining said craft, cyclic pitch control means for cyclically controlling the pitch of the respective blades, collective pitch setting means for simultaneously imparting similar pitch changes to all blades, an engine for driving the rotor, counter torque means for exerting a lateral force on the craft to counteract the torque set up by said engine, a governor for automatically maintaining the speed of said engine and thus of said sustaining rotor, in combination: an actuator; means responsive to operation of said actuator firstly operating said collective pitch setting means, secondly altering the setting of said governor to change the speed at which said engine is maintained, and thirdly adjusting the counter torque means to alter the lateral force exerted on the craft thereby; and means responsive to the air pressure caused by relative sideward movement of the craft to the surrounding air including the movement caused by altering the lateral force set up by the counter torque means for automatically adjusting the cyclic pitch control means to alter the lateral attitude of the aircraft to oppose said sideward movement.

27. In a rotaary wing aircraft having a sustaining rotor comprising a hub and a plurality of adjustable pitch blades attached thereto, control apparatus comprising: cyclic pitch control means cyclically controlling the pitch of the respective blades; collective pitch setting means simultaneously imparting similar pitch changes to all blades; an engine driving the sustaining rotor; a governor maintaining the speed of the driving engine; counter torque means exerting a lateral force on the craft to counteract the torque set up by said sustaining rotor; manually operable means adjusting the cyclic pitch control means to alter the longitudinal attitude of the craft to change forward speed thereof; means responsive to the forward speed of said craft relative to the surrounding medium; further means, controlled by said forward speed responsive means and said manually operable means for operating said cyclic pitch control means to alter the longitudinal attitude of the aircraft; means operating said collective pitch setting means to alter the total lift component of said rotary wing to prevent change in altitude on change in forward speed; and means responsive to the adjustment of said collective pitch setting means to adjust said counter torque means for changing the lateral force on the craft provided thereby to oppose change in direction of the forward speed.

28. The invention set forth in claim 27, in combination with lateral control means responsive to changes in the lateral movement of the craft including those caused by said altering of the lateral force set up by the counter torque means for automatically adjusting further the cyclic pitch control means to alter the lateral attitude of the craft to oppose change in lateral movement.

29. In flight control apparatus for a rotary wing aircraft having a rotor comprising a hub and a plurality of adjustable pitch blades attached thereto, cyclic pitch control means for cyclically controlling the pitch of the respective blades, collective pitch setting means for simultaneously imparting similar pitch changes to all blades, an engine for driving the rotor, a governor for automatically maintaining the speed of operation of said engine, and counter torque means for exerting a lateral force on the craft to counteract the torque due to rotation of said sustaining rotor, in combination: manually operable means operating the cyclic pitch control means for altering the longitudinal attitude of the craft to impart forward speed thereto; means operating the collective pitch setting means to alter the pitch of the blades of the sustaining rotor to maintain the lift of the sustaining rotor despite forward speed of the craft; means operable in response to change of said collective pitch for adjusting the speed setting of said governor for the engine and altering the counter torque means to oppose change in direction of said forward speed; lateral control means responsive to lateral accelerations of the craft including those caused by alteration of the lateral force set up by the counter torque means for automatically adjusting the cyclic pitch control means to alter the lateral attitude of the craft to oppose the lateral movement tending to add a lateral component to the forward speed; and means responsive to forward speed of the craft for modifying the effect of said means responsive to lateral accelerations on the cyclic pitch control means.

30. The invention set forth in claim 29 in combination with a vane responsive to relative lateral velocity of the craft and surrounding air for additionally controlling said lateral control means.

31. In a rotary wing aircraft having a sustaining rotor comprising a hub and a plurality of adjustable pitch blades attached thereto, cyclic pitch control means for cyclically controlling the pitch of the respective blades, collective pitch setting means for simultaneously imparting similar pitch changes to all blades, an engine for driving the sustaining rotor, and counter torque means for exerting a lateral force on the craft to counteract the torque set up by rotation of said sustaining rotor, in combination: means for maintaining movement of the craft relative to the air in a lateral direction fixed with respect to the craft comprising, manually operable means for operating said cyclic pitch control means to change lateral attitude and initiate lateral movement of the craft relative to the surrounding air, means responsive to lateral velocity of the aircraft relative to the surrounding air for opposing the control exercised by the manually operable means, means for adjusting the collective pitch setting means to alter the total lift vector of the sustaining rotor to prevent change in altitude due to the change in lateral attitude of the craft, and means responsive to the change in collective pitch setting for adjusting the counter torque means which opposes the torque set up by rotation of said sustaining rotor.

32. In flight control apparatus for a rotary wing aircraft having a sustaining rotor comprising a hub and a plurality of adjustable pitch blades attached thereto, cyclic pitch control means for cyclically controlling the pitch of the respective blades, an engine for driving the sustaining rotor, and counter torque means for exerting a lateral force on the craft to counteract the torque set up by rotation of said rotor, in combination: a device displaced relative to the craft in response to changes in heading thereof, means controlled by said heading responsive device altering the lateral force set up by said counter torque means by adjusting the setting thereof, and combination pendulum means comprising a regular pendulum and an inverted pendulum resiliently connected thereto responsive in the same direction to both leftward lateral tilt and to increased leftward changes of the lateral movement of the craft including those caused by said altering of the lateral force set up by the counter torque means for adjusting the cyclic pitch control means to alter the lateral attitude of the craft.

33. The apparatus set forth in claim 32 in combination, with collective pitch setting means for simultaneously imparting similar pitch changes to all the rotor blades, and means for simultaneously operating said means for altering the adjustment of the counter torque means to change the lateral force on the craft.

34. The apparatus set forth in claim 32 in combination with a governor for maintaining the speed of said engine, and means for simultaneously adjusting the setting of said governor to vary the speed maintained by said engine and to vary the adjustment of said counter torque means for altering the lateral force of the craft exerted thereby.

35. The apparatus set forth in claim 34 in combination with collective pitch setting means for simultaneously imparting similar pitch changes to all blades, and means for simultaneously adjusting the collective pitch setting means with change in governor setting and counter torque means setting.

36. In a rotary wing aircraft having a sustaining rotor comprising a hub and a plurality of adjustable pitch blades attached thereto, cyclic pitch control means for cyclically controlling the pitch of the respective blades, an engine for driving the sustaining rotor, and counter torque means for exerting a lateral force on the craft to counteract the torque set up by said sustaining rotor, in combination: manually operable means adjusting the cyclic pitch control means to alter the longitudinal attitude of the craft to change the forward speed thereof; a device responsive to lateral accelerations of said craft; a device responsive to lateral velocity of said craft; control means responsive to said devices adjusting the cyclic pitch control means to alter lateral attitude; means operable by said manually operable means for shifting lateral attitude control from said accelerometer to said velocity responsive means; a heading responsive device responsive to change in heading due to variation in sustaining rotor torque due to said forward speed readjusting said counter torque means; and means operated by said velocity responsive means, in response to lateral movement of the craft including that due to change in counter torque, operating said cyclic pitch control means to alter the lateral attitude of the craft to resist adding lateral speed to craft forward speed.

37. A turn control for a helicopter having a sustaining rotor with adjustable pitch blade and with cyclic pitch control means and counter-torque means opposing the torque from the sustaining rotor, in combination: means operating the counter-torque means including a heading reference, means operating the cyclic pitch control means to alter lateral attitude including a lateral tilt reference, a manually operable turn controller controlling said counter-torque means operating means and said cyclic pitch control means operating means, said turn controller being adjustable to cause the craft to turn at a predetermined rate with a predetermined tilt about its longitudinal axis; and means responsive to lateral movement of said helicopter relative to its supporting medium additionally controlling the cyclic pitch control means operating means to change the rate of turn of the craft.

38. Turn control means for a helicopter while in forward flight said helicopter having a sustaining rotor having adjustable pitch blades with cyclic pitch control mechanism controlling blade pitch to vary the lateral attitude thereof and counter-torque means for opposing the torque from the sustaining rotor, in combination: a first servo means controlling said cyclic pitch mechanism; a second servo means controlling the counter-torque means; a manually operable turn controller including means controlling said first servo means for providing a desired lateral attitude and controlling said second servo means for varying the counter torque; and air pressure operated means responsive to persistent lateral movement of said helicopter relative to the air for automatically modifying the lateral attitude of the craft to coordinate the rate of turn and lateral attitude of the craft.

39. In apparatus for controlling change in heading of a helicopter having a sustaining rotor provided with adjustable pitch blades and cyclic pitch change mechanism positioning said blade for altering the lateral attitude of the craft and counter-torque means for opposing the torque of the sustaining rotor, in combination: a first motor means operating the cyclic pitch change mechanism, a second motor means controlling the counter-torque means; a manually operable turn controller controlling said first and second motor means and settable to cause the craft to turn at a predetermined rate with a predetermined lateral tilt; means responsive to the forward speed of the craft varying the relative control of said first motor means by said turn controller; and means responsive to lateral movement of the helicopter relative to the air connected to the first motor means for further operating the first motor means to alter the lateral attitude of the craft.

40. Control apparatus for a helicopter having a sustaining rotor with adjustable pitch blades and also having cyclic pitch mechanism for varying the pitch of the blades of said rotor and counter-torque means for opposing the torque from said sustaining rotor, in combination: a heading reference means; a lateral attitude reference means; servo means controlled from both said reference means operating said counter-torque means and said cyclic pitch control mechanism for applying corrective moments to the helicopter; manually operable means altering the base of control of both said heading and lateral attitude responsive means to initiate a banked turn of the helicopter; and means responsive to the forward speed of the helicopter altering the relative change of said heading and lateral attitude references from their original base.

41. In a rotary wing aircraft having mechanism for controlling the longitudinal tilt of the lift vector of the rotary wing to cause forward motion of the craft relative to the air in the direction of craft heading, heading stabilizing means including a member holding a direction despite change in craft heading for controlling heading and resisting the counter torque of the rotary wing tending to change heading, manual means for controlling the stabilizing means to change the direction being held by said member to effect change in heading, and means responsive to the forward speed of the craft to also cause lateral tilt of the lift vector of the rotary wing upon operation of said manual means.

42. In a rotary wing aircraft having means controlling the longitudinal tilt of the lift vector of the rotary wing to cause movement of said craft in the direction of its heading, operable means effective about the vertical axis of the craft opposing the tendency of said rotary wing craft to change heading, a heading or course sensitive gyroscope controlling said operable means to maintain craft heading, manual means operatively connected to said gyroscope for precessing said gyroscope to alter craft heading, and means responsive jointly to the manual means and to the forward movement of the craft to cause lateral tilt of the lift vector upon operation of said manual means to provide banked changes in heading during longitudinal rotor tilt.

43. In a rotary wing aircraft having a sustaining rotor comprising a plurality of blades, means for altering the pitch of each blade comprising a pitch control ring vertically displaceable to simultaneously similarly alter the pitch of all blades and angularly tiltable to introduce cyclic changes of pitch in each blade, manual means connected to the control ring for tilting the control ring to effect cyclic pitch change to thereby cause movement of the craft in the direction of its longitudinal axis, further means connected to the control ring for displacing said ring to reduce the cyclic pitch of the blades during such movement, and means responsive to the forward speed of the craft operating said further means to modify the tilting position of said ring to maintain a selected forward speed.

44. In a rotary wing aircraft having a rotor comprising a hub having a central opening defined by a circular wall of said hub and a plurality of adjustable pitch blades attached thereto, a pitch control ring substantially concentric with the rotational axis of said hub and connected to said blades and vertically displaceable to simultaneously alter the pitch of all the blades in the same direction and tiltable out of perpendicular relation to the axis of the hub to introduce cyclic changes of pitch in said blades to cause movement of the craft relative to the air, control apparatus comprising: collective pitch setting means including a reciprocable operating rod central of the circular wall for displacing said ring vertically; a prime mover for operating the said rotor; rudder means angularly displaced transverse to the relative air movement while in forward flight for exerting a torque or turning moment opposing that from the rotary wing; heading or course responsive means controlling the rudder means to stabilize heading; means also operated by said collective pitch setting means to control said rudder means to alter its position to vary the opposing torque on said craft for change in sustaining rotor torque due to any collective pitch change; means for tilting said ring while said rod remains in its assumed position to effective cyclic pitch changes in said rotor blades to cause the craft to move in a forward direction; said heading responsive means on change in craft heading due to the displaced rudder causing a decrease in the angular displacement of said rudder during increase in forward speed of said craft caused by said cyclic pitch changes whereby the turning moment of said rudder does not increase with air speed.

45. In a rotary wing aircraft having a flight sustaining rotor and a prime mover in the craft for driving the rotor; the combination of a first counter-torque means opposing reactive torque of said rotor, a driving connection from the prime mover to said counter torque means, a clutch in said driving connection for selectively disconnecting said first counter torque means from the prime mover, a second counter-torque means, a control member having two portions and adjustable over a range of movement, mechanism interconnecting said control member and counter-torque means operated by one of said portions of said control member for selectively adjusting the torque set up by said first counter-torque means, and mechanism connected to be operated by the other portion of said control member for selectively adjusting the torque set up by said second counter-torque means and for selectively controlling the engagement of said clutch.

46. In a flight control system for aircraft of the type capable of sustained flight at substantially zero forward airspeed: including a bank signal responsive means and a craft turn signal responsive means for providing outputs respectively indicative of required changes of craft attitude about its bank and its turn axes to cause the craft to approach and maintain a desired heading, the craft attitudes about the bank and turn axes being independent of each other at zero airspeed but dependent on each other at airspeeds greater than zero, comprising means for supplying a turn signal for altering craft attitude from an existing attitude, means connected to receive said signal for supplying control signals to said bank and turn signal responsive means whereby to respectively control the outputs thereof in accordance with said signal, and flight condition responsive means for continuously varying the relative magnitudes of said control signals supplied to said two signal responsive means in accordance with the flight condition.

47. In a flight control system for aircraft capable of sustained flight at substantially zero forward airspeed, including at least a bank and turn signal responsive means for providing outputs respectively indicative of required changes in craft attitude about its bank and turn axes to cause a craft to approach and maintain a desired craft attitude about one of said axes, the craft attitude about the bank and turn axes being independent of each other at zero forward airspeeds but dependent on each other at airspeeds greater than zero, comprising: means for supplying a signal for altering craft attitude from an existing attitude, means connected to receive said signal for supplying control signals to said two signal responsive means whereby to respectively control the outputs thereof in accordance with said signal, and aircraft speed responsive means for continuously varying the relative magnitudes of said control signals supplied to said two signal responsive means in accordance with craft airspeed.

48. In a flight control system for aircraft capable of sustained flight at substantially zero forward airspeed two signal responsive means, one comprising a vertical gyroscope for maintaining roll attitude, the second comprising a heading gyro for maintaining direction of flight, the craft attitudes about said two axes being independent of each other at zero forward airspeeds but dependent on each other at airspeeds greater than zero; means for supplying a signal for altering craft heading from an existing heading; means connected to receive said signal for supplying control signals to said two signal responsive means whereby to repectively control the output thereof in accordance with said signals; an air speed responsive means for continuously varying the relative magnitudes of said control signals supplied to said two signal responsive means in accordance with craft forward airspeed.

49. A navigation system for an aircraft capable of sustained flight including substantially zero forward airspeed said system having bank attitude controlling means and rudder control means enabling the craft to be caused to approach and thereafter maintain a selected heading comprising: means for supplying a signal through both said control means to effect a banked heading change from the present heading of said craft to a selected heading; means for supplying a signal corresponding to the roll angle of said aircraft to one of said control means; means in said one control means for combining said signals for supplying an output for operation of said one control means corresponding to the algebraic sum of said heading change and roll angle signals; and means responsive to the forward airspeed of the craft for varying the magnitude of one of said signals supplied to said combining means.

50. A navigation system for aircraft for enabling the craft to be caused to approach and thereafter maintain a desired heading comprising means for supplying a signal to effect a change from the present heading of said craft to a desired heading; means for supplying a signal corresponding to roll angle; means for combining said two signals for supplying an output dependent in part on the algebraic sum thereof; and means responsive to the forward airspeed of the craft for continuously varying the magnitude of one of said signals supplied to said combining means.

51. A navigation system for aircraft having bank control means and rudder control means for enabling the craft to be caused to approach and thereafter maintain a desired heading comprising: means for supplying a heading signal to both control means to effect a banked heading change from the present heading of said craft to a desired heading; means for supplying a signal corresponding to roll angle; means in one control means receiving both signals for combining said signals in opposition for supplying an output for operation of said one control means corresponding to the algebraic sum thereof; and means responsive to forward airspeed of the craft for varying the magnitude of one of said signals supplied to said combining means over at least a part of said speed change of the craft.

52. A navigation system for aircraft having a first attitude changing means and a second attitude changing means, comprising: a source of signal to alter craft attitude from a present attitude to a desired attitude; a first servomotor operated by said signal positioning one attitude changing means; a second servomotor responsive to said signal operating said second attitude changing means; control means to vary the rate of response of one of said attitude changing means to said signal; and airspeed responsive means for operating said control means so as to vary said rate of response in direct relation to the change in the airspeed of the craft.

53. A navigation system for aircraft enabling the craft to be caused to approach and thereafter maintain a selected heading comprising means for supplying a signal to effect a change from the present heading of the craft to a selected heading, means for supplying a signal corresponding to the roll angle; means for combining said signals in opposition for supplying an output corresponding to the algebraic sum thereof; and means responsive to the airspeed of said craft for varying directly the magnitude of the first signal supplied to said combining means.

References Cited in the file of this patent

UNITED STATES PATENTS

| | | |
|---|---|---|
| 1,889,273 | Avery | Nov. 29, 1932 |
| 2,137,974 | Fischel | Nov. 22, 1938 |
| 2,369,652 | Avery | Feb. 20, 1945 |
| 2,415,148 | Sikorsky | Feb. 4, 1947 |
| 2,450,907 | Newton | Oct. 12, 1948 |
| 2,473,299 | Pitcairn | June 14, 1949 |
| 2,479,549 | Ayres | Aug. 23, 1949 |
| 2,623,598 | Martin | Dec. 30, 1952 |

Disclaimer 3,081,966.—*Harold T. Avery*, Oakland, Calif. ROTATING WING AIRCRAFT. Patent dated Mar. 19, 1963. Disclaimer filed Sept. 30, 1971, by the assignee, *Honeywell Inc.*

Hereby enters this disclaimer to claims 50, 51, 52 and 53 of said patent.

[*Official Gazette December 14, 1971.*]